United States Patent
Sasaki et al.

(10) Patent No.: US 7,518,824 B2
(45) Date of Patent: Apr. 14, 2009

(54) MAGNETIC HEAD FOR PERPENDICULAR MAGNETIC RECORDING THAT HAS A POLE LAYER HAVING A SHAPE FOR EASY FORMING, REDUCING TRACK WIDTH AND IMPROVED WRITING CHARACTERISTICS

(75) Inventors: Yoshitaka Sasaki, Milpitas, CA (US); Hiroyuki Itoh, Milpitas, CA (US); Hironori Araki, Milpitas, CA (US); Takehiro Horinaka, Milpitas, CA (US); Shigeki Tanemura, Milpitas, CA (US)

(73) Assignee: Headway Technologies, Inc., Milpitas, CA (US)

(*) Notice: Subject to any disclaimer, the term of this patent is extended or adjusted under 35 U.S.C. 154(b) by 589 days.

(21) Appl. No.: 11/213,863

(22) Filed: Aug. 30, 2005

(65) Prior Publication Data

US 2006/0198049 A1 Sep. 7, 2006

Related U.S. Application Data

(63) Continuation-in-part of application No. 11/073,225, filed on Mar. 7, 2005, now abandoned.

(51) Int. Cl.
G11B 5/147 (2006.01)
G11B 5/127 (2006.01)

(52) U.S. Cl. .............. 360/125.09; 360/125.13; 360/123.38

(58) Field of Classification Search ............ 360/123.38, 360/119.03, 125.07, 125.09, 125.1, 125.11, 360/125.13, 125.14, 125.15
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 6,952,325 B2 * | 10/2005 | Sato et al. | 360/125.08 |
| 7,193,816 B2 * | 3/2007 | Sasaki et al. | 360/125.12 |
| 7,293,345 B2 * | 11/2007 | Matono et al. | 29/603.13 |
| 7,333,296 B2 * | 2/2008 | Sasaki et al. | 360/125.03 |

(Continued)

FOREIGN PATENT DOCUMENTS

JP A 2003-203311 7/2003

(Continued)

Primary Examiner—Brian E Miller
(74) Attorney, Agent, or Firm—Oliff & Berridge, PLC

(57) ABSTRACT

A magnetic head includes an encasing layer made of a nonmagnetic material and having a groove that opens in the top surface; a nonmagnetic metal layer made of a nonmagnetic metal material, disposed on the top surface of the encasing layer, and having a penetrating opening that is contiguous to the groove; and a pole layer made of a magnetic metal material and encased in the groove of the encasing layer and in the opening of the nonmagnetic metal layer. The pole layer has an end face located in a medium facing surface, the end face having a first portion and a second portion that is located farther from a substrate than the first portion and connected to the first portion. The first portion has a width that decreases as the distance from the substrate decreases. The second portion has a uniform width that defines the track width. In the medium facing surface, the nonmagnetic metal layer exists on both sides of the second portion, the sides being opposed to each other in the direction of track width.

17 Claims, 56 Drawing Sheets

U.S. PATENT DOCUMENTS

| | | | |
|---|---|---|---|
| 7,375,925 B2 * | 5/2008 | Sasaki et al. | 360/125.01 |
| 7,417,825 B2 * | 8/2008 | Sasaki et al. | 360/125.07 |
| 7,436,627 B2 * | 10/2008 | Sasaki et al. | 360/125.09 |
| 2002/0080523 A1 * | 6/2002 | Sato et al. | 360/126 |
| 2003/0151850 A1 | 8/2003 | Nakamura et al. | |
| 2003/0193744 A1 * | 10/2003 | Takahashi et al. | 360/126 |
| 2005/0117251 A1 * | 6/2005 | Matono et al. | 360/126 |
| 2005/0259357 A1 * | 11/2005 | Kameda | 360/126 |

FOREIGN PATENT DOCUMENTS

| | | |
|---|---|---|
| JP | A 2003-242607 | 8/2003 |

* cited by examiner

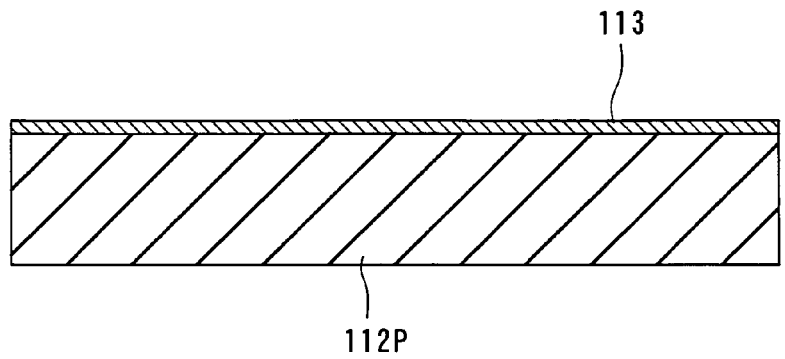
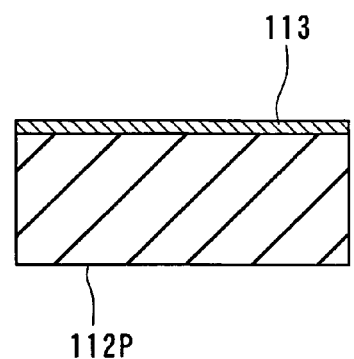
FIG. 51A   FIG. 51B
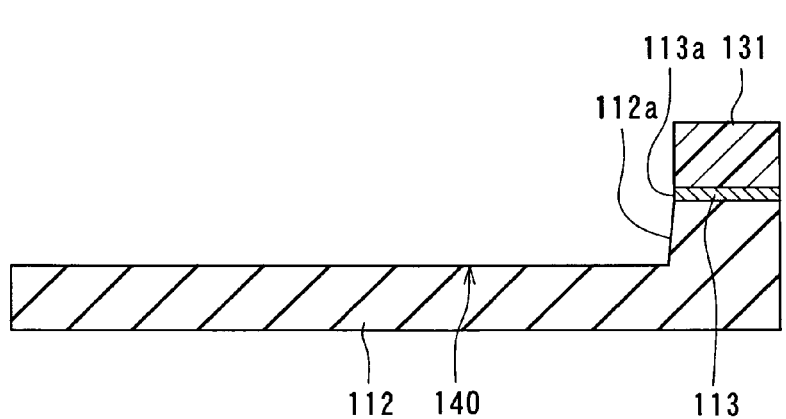
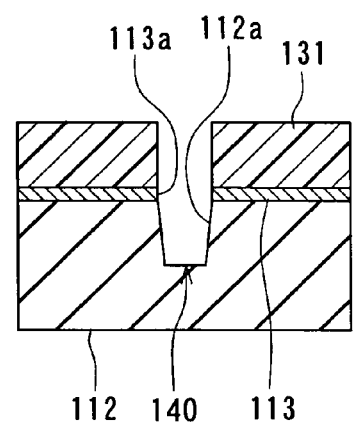
FIG. 52A   FIG. 52B

MAGNETIC HEAD FOR PERPENDICULAR MAGNETIC RECORDING THAT HAS A POLE LAYER HAVING A SHAPE FOR EASY FORMING, REDUCING TRACK WIDTH AND IMPROVED WRITING CHARACTERISTICS

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are affected. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique for preventing the problems resulting from the skew as described above is disclosed in, for example, U.S. Patent Application Publication No. US 2003/0151850 A1, Published Unexamined Japanese Patent Application 2003-203311, and U.S. Pat. No. 6,504,675 B1. According to the technique, the end face of the track width defining portion located in the medium facing surface is made to have a shape in which the side located backward in the direction of travel of the recording medium (that is, the side located closer to the air inflow end of the slider) is shorter than the opposite side. Typically, in the medium facing surface of a magnetic head, the end farther from the substrate is located forward in the direction of travel of the recording medium (that is, located closer to the air outflow end of the slider). Therefore, the shape of the end face of the track width defining portion located in the medium facing surface mentioned above is such that the side closer to the substrate is shorter than the side farther from the substrate.

As a magnetic head for perpendicular magnetic recording, a magnetic head comprising a pole layer and a shield is known, as disclosed in U.S. Pat. No. 4,656,546, for example. In the medium facing surface of this magnetic head, an end face of the shield is located forward of an end face of the pole layer along the direction of travel of the recording medium with a specific small space therebetween. Such a magnetic head will be hereinafter called a shield-type head. In the shield-type head, the shield prevents a magnetic flux from reaching the recording medium, the flux being generated from the end face of the pole layer and extending in directions except the direction orthogonal to the surface of the recording medium. The shield-type head achieves a further improvement in linear recording density.

U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components orthogonal to the surface of the recording medium among components of the magnetic field generated from the medium-facing-surface-side end of the middle magnetic layer.

Consideration will now be given to a method of forming a pole layer having a track width defining portion whose end face located in the medium facing surface has a shape in which a side closer to the substrate is shorter than a side farther from the substrate as described above. It is frame plating that has been often used in prior art for forming such a pole layer. In a method of forming the pole layer by frame plating, an electrode film is first formed on a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, the electrode film except a portion located below the pole layer is removed. Next, an insulating layer made of alumina, for example, is formed to cover the pole layer. Next, the insulating layer and the pole layer are polished by chemical mechanical polishing (hereinafter referred to as CMP), for example. Through the polishing, the top surface of the pole layer is flattened, and the thickness of the pole layer is controlled to be of a desired value.

The foregoing method of forming the pole layer has a problem that, if the polishing is stopped at a level other than a desired level, the thickness of the pole layer is made other than a desired thickness and the track width defined by the length of the above-mentioned side farther from the substrate is thereby made other than a desired value.

U.S. Patent Application Publication No. US 2003/0151850 A1 discloses a technique in which the end face of the track width defining portion in the medium facing surface is formed into a shape having a first portion and a second portion. The first portion has a width that continuously increases from the air-inflow-end-side end to the air-outflow-end-side end. The second portion is located on the air-outflow-end side of the first portion and has a uniform width that is equal to the width of the end of the first portion on the air-outflow-end side. This technique is capable of reducing variations in track width.

However, the technique disclosed in this publication has the following problem. According to the technique, the pole layer is encased in a groove formed in an inorganic insulating film. The groove is formed by etching, and has a tapered portion and a portion having an inner wall orthogonal to the top surface of the inorganic insulating film. However, it is not easy to form the groove having these two portions in the inorganic insulating film by etching. U.S. Patent Application Publication No. US 2003/0151850 A1 discloses that the two portions are formed by changing conditions for etching.

According to the technique disclosed in this publication, the top surfaces of the pole layer and the inorganic insulating film are flattened by CMP or etching. However, the rate at which polishing by CMP proceeds and the etching rate are different between the magnetic metal material making the pole layer and the inorganic insulating material making the inorganic insulating film. Typically, the rate at which polishing proceeds or the etching rate of the magnetic metal material is higher than that of the inorganic insulating material under the conditions suitable for polishing or etching of the magnetic metal material. Therefore, according to the technique disclosed in the above-mentioned publication, even though an attempt is made to flatten the top surfaces of the pole layer and the inorganic insulating film by CMP or etching, it is likely in practice that the top surface of the pole layer is made recessed more deeply than the top surface of the inorganic insulating film. It is therefore difficult to form the pole layer having a desired shape through this technique.

The above-mentioned publication also discloses a method of forming the pole layer as will now be described. In the method, first, a first magnetic film is formed on the inorganic insulating film and in the groove formed in the inorganic insulating film. Next, the first magnetic film is removed by CMP or etching, so that the top surface of the first magnetic film is recessed more deeply than the top surface of the inorganic insulating film. Next, a second magnetic film is formed on the first magnetic film and the inorganic insulating film. The top surface of the second magnetic film is then flattened to form the pole layer made up of the first and second magnetic films. However, this method has a problem that the number of steps is increased.

Reference is now made to FIG. 67 to describe a basic configuration of the shield-type head. FIG. 67 is a front view of a portion of the medium facing surface of an example of the shield-type head. The shield-type head comprises: the medium facing surface that faces toward a recording medium; a coil (not shown) for generating a magnetic field corresponding to data to be written on the medium; a pole layer 316 having an end face located in the medium facing surface, allowing a magnetic flux corresponding to the field generated by the coil to pass, and generating a write magnetic field for writing the data on the medium by means of the perpendicular magnetic recording system; a shield layer 320 having an end face located in the medium facing surface and having a portion located away from the medium facing surface and coupled to the pole layer 316; and a gap layer 318 provided between the pole layer 316 and the shield layer 320. In this example, the pole layer 316 is disposed on an insulating layer 314. An insulating layer 317 is provided around the pole layer 316. The pole layer 316 and the insulating layer 317 have flattened top surfaces on which the gap layer 318 is disposed. The shield layer 320 is further disposed on the gap layer 318.

The end face of the pole layer 316 located in the medium facing surface has a shape of trapezoid in which the side closer to the gap layer 318 is longer than the opposite side.

Problems of the shield-type heads such as the one shown in FIG. 67 will now be described. In FIG. 67, the physical track width PTW is determined by the width of a portion of the end face of the pole layer 316 located in the medium facing surface, the portion being in contact with the gap layer 318. However, a magnetic flux 321 starting from the pole layer 316 across the gap layer 318 and reaching the shield layer 320 extends wider than the physical track width PTW. Consequently, the effective track width ETW is greater than the physical track width PTW. For example, if the physical track width PTW is 0.12 micrometer (μm), the thickness of the pole layer 316 is 0.3 μm, and the thickness of the gap layer 318 is 50 nanometers (nm), the effective track width ETW is greater than the physical track width PTW by no less than 0.08 to 0.12 μm, according to conventional devices.

If the effective track width ETW is much greater than the physical track width PTW as described above, problems arises, such as adjacent track erasing and unwanted writing performed between adjacent two tracks. If the physical track width PTW is reduced to reduce the effective track width ETW, such problems arise that it is difficult to control the physical track width PTW and that the overwrite property is degraded.

If the thickness of the gap layer 318 is reduced, it is possible to suppress expansion in the direction of track width of the magnetic flux starting from the pole layer 316 across the gap layer 318 and reaching the shield layer 320. In this case, however, the overwrite property is degraded.

OBJECT AND SUMMARY OF THE INVENTION

It is a first object of the invention to provide a magnetic head for perpendicular magnetic recording that allows a pole layer having a desired shape to be formed with accuracy, and to provide a method of manufacturing such a magnetic head.

It is a second object of the invention to provide a magnetic head for perpendicular magnetic recording that has a structure in which a pole layer and a shield layer are opposed to each other with a gap layer disposed in between and that is capable of reducing a difference between the physical track width and the effective track width, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer made of a magnetic metal material, having an end face located in the medium facing surface, allowing a magnetic flux corresponding to the field generated by the coil to pass therethrough, and generating a write magnetic field for writing the data on the recording medium through the use of a perpendicular magnetic recording system; an encasing layer made of a nonmagnetic material and having a groove that opens in a top surface of the encasing layer; a metal layer made of a metal material, disposed on the top surface of the encasing layer, and having a penetrating opening that continues to the groove; and a substrate on which the encasing layer, the metal layer, the pole layer and the coil are stacked.

In the magnetic head of the invention, at least a portion of the pole layer is placed in the groove of the encasing layer and in the opening of the metal layer. The end face of the pole layer located in the medium facing surface incorporates a first portion and a second portion that is located farther from the substrate than the first portion and connected to the first portion. The first portion has a side located away from the substrate. The first portion has a width that decreases as the distance from the substrate decreases. The second portion has a uniform width that is equal to the length of the side of the first portion located away from the substrate and that defines a track width. In the medium facing surface, the metal layer exists on both sides of the second portion, the sides being opposed to each other in the direction of the track width.

In the magnetic head of the invention, the opening of the metal layer may have an inner wall that is orthogonal to the top surface of the substrate.

In the magnetic head of the invention, in the medium facing surface, the top surface of the pole layer may be located at a height that falls within a range between the height at which the top surface of the metal layer is located and the height at which the bottom surface thereof is located.

The magnetic head of the invention may further comprise a nonmagnetic film made of a nonmagnetic material and disposed between the pole layer and each of the encasing layer and the metal layer in the groove of the encasing layer and in the opening of metal layer.

A portion of the nonmagnetic film disposed in the opening of the metal layer may have an inner wall that is orthogonal to the top surface of the substrate.

The nonmagnetic film may have a portion located above the top surface of the metal layer, and, in the medium facing surface, the top surface of the nonmagnetic film may be located at a height the same as the height at which the top surface of the pole layer is located.

The magnetic head of the invention may further comprise a seed layer made of a nonmagnetic conductive material and disposed between the nonmagnetic film and the pole layer in the groove of the encasing layer and in the opening of the metal layer.

A portion of the seed layer disposed in the opening of the metal layer may have an inner wall that is orthogonal to the top surface of the substrate.

The seed layer may have a portion located above the top surface of the metal layer, and, in the medium facing surface, the top surface of the seed layer may be located at a height the same as the height at which the top surface of the pole layer is located.

The magnetic head of the invention may further comprise a joining film that is disposed between the nonmagnetic film and the seed layer in the groove of the encasing layer and in the opening of the metal layer and that joins the nonmagnetic film to the seed layer.

In the magnetic head of the invention, the metal layer may be made of a nonmagnetic metal material.

The magnetic head of the invention may further comprise: a main shield layer made of a magnetic material, having an end face located in the medium facing surface, and having a portion located away from the medium facing surface and coupled to the pole layer; and a gap layer made of a nonmagnetic material, having an end face located in the medium facing surface, and provided between the pole layer and the main shield layer. In addition, the end face of the main shield layer may be located forward of the end face of the pole layer along the direction of travel of the recording medium with a specific space created by the thickness of the gap layer. In this case, the metal layer may be made of a magnetic metal material and coupled to the main shield layer, and may have two end faces located in the medium facing surface on both sides of the end face of the pole layer, the sides being opposed to each other in the direction of the track width. In addition, the magnetic head may further comprise a nonmagnetic film made of a nonmagnetic material and disposed between the pole layer and the metal layer.

In this case, both ends of the end face of the gap layer that are opposed to each other in the direction of the track width may be located at positions along the direction of the track width outside ends of the end faces of the metal layer, the ends being closer to the pole layer. The metal layer may have a thickness that is 15 to 70% of that of the pole layer. The metal layer may have a saturation flux density that is lower than that of the pole layer. The nonmagnetic film may be also located between the metal layer and the gap layer. The metal layer may touch the gap layer.

A method of manufacturing the magnetic head for perpendicular magnetic recording of the invention comprises the steps of: forming a nonmagnetic layer that will be formed into the encasing layer by forming the groove therein later; forming the metal layer on a top surface of the nonmagnetic layer; forming the groove in the nonmagnetic layer by selectively etching a portion of the nonmagnetic layer exposed from the opening of the metal layer, so that the nonmagnetic layer is formed into the encasing layer; forming the pole layer so that at least a portion of the pole layer is placed in the groove of the encasing layer and in the opening of the metal layer; and forming the coil.

According to the method of the invention, the opening of the metal layer may be made to have an inner wall that is orthogonal to the top surface of the substrate.

According to the method of the invention, the step of forming the pole layer may include the steps of: forming a magnetic layer to be the pole layer such that the groove of the encasing layer and the opening of the metal layer are filled with the magnetic layer and that a top surface of the magnetic layer is located higher than the top surface of the metal layer; and etching at least a portion of the top surface of the magnetic layer so that the magnetic layer is formed into the pole layer.

According to the method of the invention, any of ion beam etching, sputter etching, and reactive ion etching may be employed in the step of etching the at least portion of the top surface of the magnetic layer.

In the method of the invention, in the step of etching the at least portion of the top surface of the magnetic layer, etching may be performed so that, in the medium facing surface, the top surface of the pole layer is located at a height that falls within a range between the height at which the top surface of the metal layer as initially formed is located and the height at which the bottom surface thereof is located. In this case, in the step of etching the at least portion of the top surface of the magnetic layer, at least a portion of the metal layer may be etched together with the at least portion of the top surface of the magnetic layer. Furthermore, in the step of etching the at least portion of the top surface of the magnetic layer, etching may be performed so that, in the medium facing surface, the top surface of the pole layer is located at a height that falls within a range between the height at which the top surface of the metal layer is located after this step is completed and the height at which the bottom surface thereof is located.

The method of the invention may further comprise the step of polishing the top surface of the magnetic layer that is performed after the step of forming the magnetic layer and before the step of etching the at least portion of the top surface of the magnetic layer. In this case, chemical mechanical polishing may be employed in the step of polishing.

The method of the invention may further comprise the step of forming a polishing stopper layer that is disposed above the metal layer and indicates a level at which the polishing is stopped in the step of polishing, the step of forming the polishing stopper layer being performed after the step of forming the metal layer and before the step of forming the magnetic layer. In this case, the magnetic layer may be formed such that the top surface of the magnetic layer is located higher than the top surface of the polishing stopper layer in the step of forming the magnetic layer. In addition, the top surface of the magnetic layer may be polished until a portion of the magnetic layer located higher than the top surface of the polishing stopper layer is removed in the step of polishing, and at least a portion of the polishing stopper layer may be etched together with the at least portion of the top surface of the magnetic layer in the step of etching the at least portion of the top surface of the magnetic layer. In the step of etching the at least portion of the top surface of the magnetic layer, etching may be performed so that, in the medium facing surface, the top surface of the polishing stopper layer is located at a height the same as the height at which the top surface of the pole layer is located.

The method of the invention may further comprise the step of forming a nonmagnetic film made of a nonmagnetic material and disposed between the pole layer and each of the encasing layer and the metal layer in the groove of the encasing layer and in the opening of the metal layer, the step being performed after the step of forming the groove in the nonmagnetic layer and before the step of forming the magnetic layer. A portion of the nonmagnetic film placed in the opening of the metal layer may be made to have an inner wall that is orthogonal to the top surface of the substrate. The nonmagnetic film may be made to have a portion located above the top surface of the metal layer, and at least a portion of the nonmagnetic film may be etched together with the at least portion of the top surface of the magnetic layer in the step of etching the at least portion of the top surface of the magnetic layer. The nonmagnetic film may be made to have a portion located above the top surface of the metal layer, and in the step of etching the at least portion of the top surface of the magnetic layer, etching may be performed so that, in the medium facing surface, the top surface of the nonmagnetic film is located at a height the same as the height at which the top surface of the pole layer is located.

The method of the invention may further comprise the step of forming a seed layer made of a nonmagnetic conductive material and disposed between the nonmagnetic film and the pole layer in the groove of the encasing layer and in the opening of the metal layer, the step of forming the seed layer being performed after the step of forming the nonmagnetic film and before the step of forming the magnetic layer. A portion of the seed layer disposed in the opening of the metal layer may be made to have an inner wall that is orthogonal to the top surface of the substrate. The seed layer may have a portion located above the top surface of the metal layer, and at least a portion of the seed layer may be etched together with the at least portion of the top surface of the magnetic layer in the step of etching the at least portion of the top surface of the magnetic layer. The seed layer may have a portion located above the top surface of the metal layer, and in the step of etching the at least portion of the top surface of the magnetic layer, etching may be performed so that, in the medium facing surface, the top surface of the seed layer is located at a height the same as the height at which the top surface of the pole layer is located.

The method of the invention may further comprise the step of forming a joining film that is disposed between the nonmagnetic film and the seed layer in the groove of the encasing layer and in the opening of the metal layer and that joins the nonmagnetic film to the seed layer, the step of forming the joining film being performed after the step of forming the nonmagnetic layer and before the step of forming the seed layer.

In the method of the invention, the metal layer may be made of a nonmagnetic metal material.

In the method of the invention, the magnetic head may further comprise: a main shield layer made of a magnetic material, having an end face located in the medium facing surface, and having a portion located away from the medium facing surface and coupled to the pole layer; and a gap layer made of a nonmagnetic material, having an end face located in the medium facing surface, and provided between the pole layer and the main shield layer. In addition, the end face of the main shield layer may be located forward of the end face of the pole layer along the direction of travel of the recording medium with a specific space created by the thickness of the gap layer. Furthermore, the metal layer may be made of a magnetic metal material and coupled to the main shield layer, and may have two end faces located in the medium facing surface on both sides of the end face of the pole layer, the sides being opposed to each other in the direction of the track width. The magnetic head may further comprise a nonmagnetic film made of a nonmagnetic material and disposed between the pole layer and the metal layer. In this case, the method may further comprise the steps of forming the nonmagnetic film between the step of forming the groove and the step of forming the magnetic layer; forming the gap layer on the pole layer; and forming the main shield layer on the gap layer.

In this case, both ends of the end face of the gap layer that are opposed to each other in the direction of the track width may be located at positions along the direction of the track width outside ends of the end faces of the metal layer, the ends being closer to the pole layer. The metal layer may have a thickness that is 15 to 70% of that of the pole layer. The metal layer may have a saturation flux density that is lower than that of the pole layer. The nonmagnetic film may be also located between the metal layer and the gap layer. The metal layer may touch the gap layer.

According to the magnetic head for perpendicular magnetic recording of the invention or the method of manufacturing the same, the metal layer is provided on the top surface of the encasing layer having the groove, the metal layer having the penetrating opening contiguous to the groove. At least a portion of the pole layer is placed in the groove of the encasing layer and in the opening of the metal layer. In addition, the metal layer exists on both sides of the second portion of the end face of the pole layer located in the medium facing surface, the sides of the second portion being opposed to each other in the direction of the track width. According to the invention, it is easy to form the groove of the encasing layer and the opening of the metal layer. Furthermore, according to the invention, the second portion has a uniform width that defines the track width. It is therefore possible to control the track width with precision. These features of the invention make it possible to form the pole layer having a desired shape with accuracy.

In the magnetic head of the invention, in the medium facing surface, the top surface of the pole layer may be located at a height that falls within the range between the height at which the top surface of the metal layer is located and the height at which the bottom surface thereof is located. In this case, it is possible to control the thickness of the pole layer with precision.

The magnetic head of the invention may further comprise the nonmagnetic film disposed between the pole layer and each of the encasing layer and the metal layer in the groove of the encasing layer and in the opening of the metal layer. In this case, it is possible to reduce the track width.

In the method of manufacturing the magnetic head for perpendicular magnetic recording of the invention, the step of forming the pole layer may include the steps of: forming a magnetic layer to be the pole layer such that the groove of the encasing layer and the opening of the metal layer are filled with the magnetic layer and that a top surface of the magnetic layer is located higher than the top surface of the metal layer; and etching at least a portion of the top surface of the magnetic layer so that the magnetic layer is formed into the pole layer. In this case, in the step of etching the at least portion of the top surface of the magnetic layer, etching may be performed so that, in the medium facing surface, the top surface of the pole layer is located at a height that falls within the range between the height at which the top surface of the metal layer as initially formed is located and the height at which the bottom surface thereof is located. In this case, it is possible by etching to control the thickness of the pole layer with precision.

In the method of the invention, the nonmagnetic film may be formed, which is disposed between the pole layer and each of the encasing layer and the metal layer in the groove of the encasing layer and in the opening of the metal layer. In this case, it is possible to reduce the track width.

According to the magnetic head for perpendicular magnetic recording of the invention or the method of manufacturing the same, the magnetic head may further comprise the main shield layer and the gap layer, and the end face of the main shield layer may be located forward of the end face of the pole layer along the direction of travel of the recording medium with a specific space created by the thickness of the gap layer. In addition, the metal layer may be made of a magnetic metal material and coupled to the main shield layer, and may have two end faces located in the medium facing surface on both sides of the end face of the pole layer, the sides being opposed to each other in the direction of the track width. The magnetic head may further comprise the nonmagnetic film made of a nonmagnetic material and disposed between the pole layer and the metal layer. In this case, it is possible to more greatly suppress a flux from extending in the direction of track width, the flux starting from the pole layer across the gap layer and reaching the main shield layer, compared with a case in which the metal layer is not provided. As a result, according to the invention, it is possible to reduce the difference between the physical track width and the effective track width.

Other and further objects, features and advantages of the invention will appear more fully from the following description.

BRIEF DESCRIPTION OF THE DRAWINGS

FIG. 51A and FIG. 51B are views for illustrating a step of a method of manufacturing the magnetic head of the seventh embodiment of the invention.

FIG. 52A and FIG. 52B are views for illustrating a step that follows the step shown in FIG. 51A and FIG. 51B.

DETAILED DESCRIPTION OF THE PREFERRED EMBODIMENTS

First Embodiment

Figure 2:
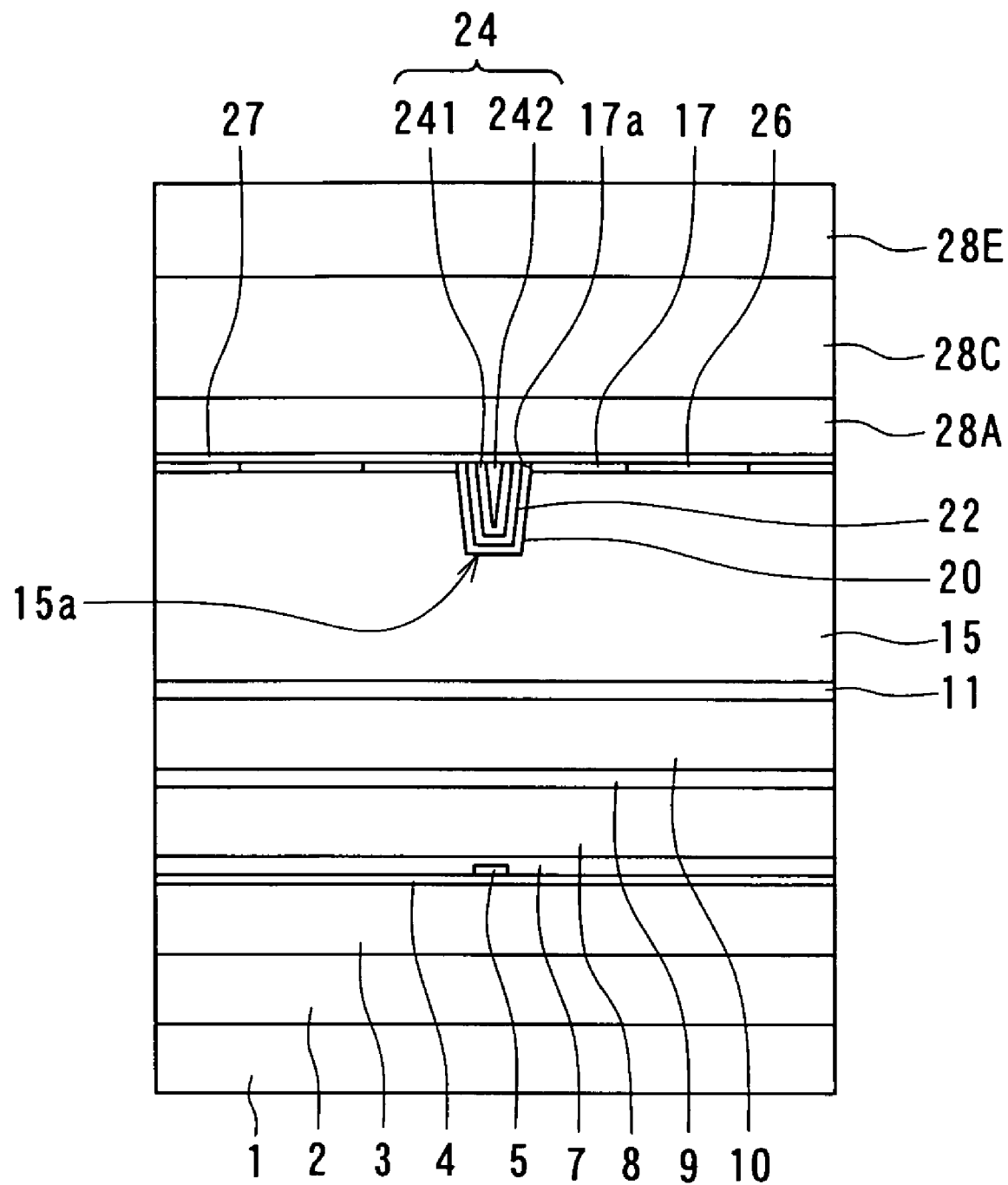
FIG. 2 is a front view of the medium facing surface of the magnetic head of the first embodiment of the invention.
Figure 3:
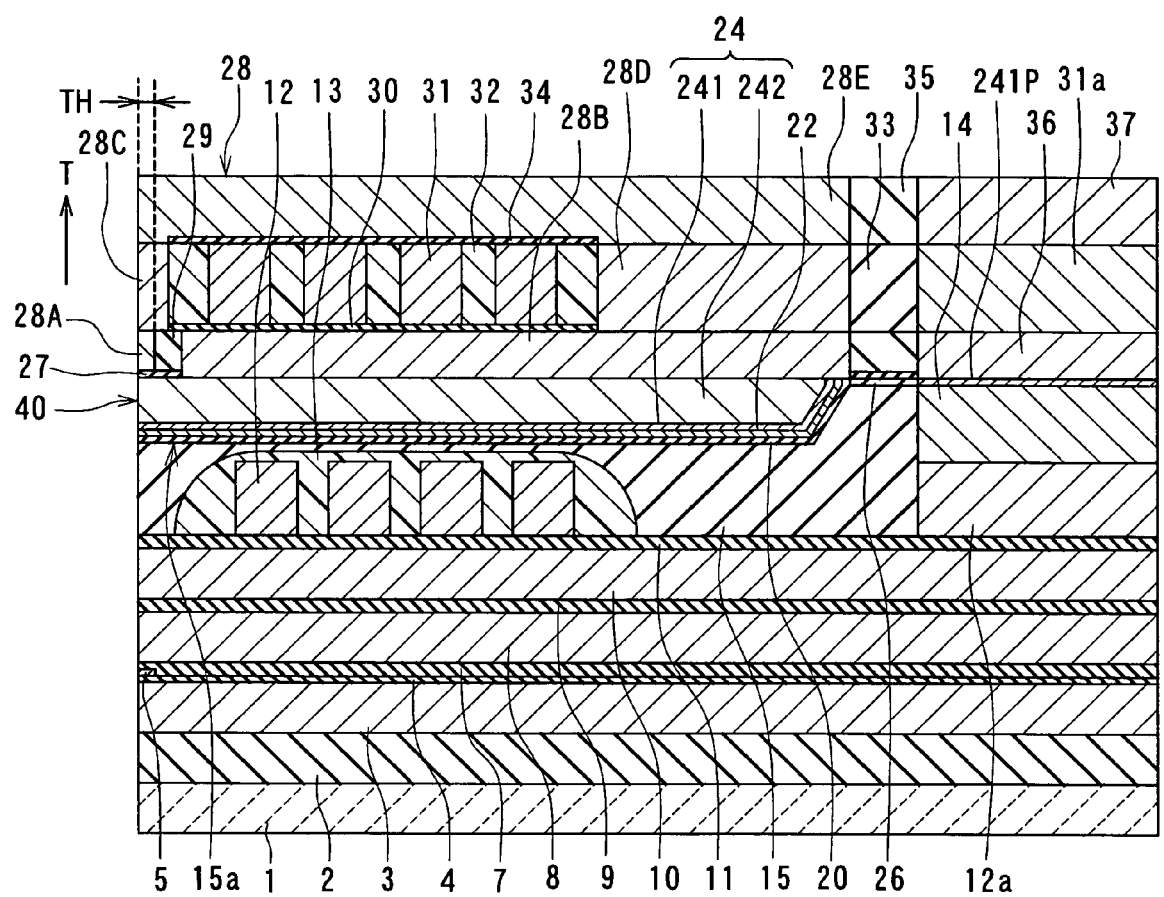
FIG. 3 is a cross-sectional view for illustrating the configuration of the magnetic head of the first embodiment of the invention.

Preferred embodiments of the invention will now be described in detail with reference to the accompanying drawings. Reference is now made to FIG. 2 and FIG. 3 to describe the configuration of a magnetic head for perpendicular magnetic recording of a first embodiment of the invention. FIG. 2 is a front view for illustrating the medium facing surface of the magnetic head of the embodiment. FIG. 3 is a cross-sectional view for illustrating the configuration of the magnetic head of the embodiment. FIG. 3 illustrates a cross section orthogonal to the medium facing surface and a surface of a substrate. The arrow indicated with T in FIG. 3 shows the direction of travel of a recording medium.

As shown in FIG. 2 and FIG. 3, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; and a top shield gap film 7 that is an insulating film disposed on the MR element 5.

The MR element 5 has an end that is located in the medium facing surface 40 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a first top shield layer 8, a nonmagnetic layer 9 and a second top shield layer 10 that are disposed on the top shield gap film 7 one by one. The first top shield layer 8 and the second top shield layer 10 are made of a magnetic material. The nonmagnetic layer 9 is made of a nonmagnetic material such as alumina. The portions from the bottom shield layer 3 to the second top shield layer 10 make up the read head.

The magnetic head further comprises: an insulating layer 11 disposed on the second top shield layer 10; a coil 12 disposed on the insulating layer 11; an insulating layer 13 disposed around the coil 12 and in the space between the respective adjacent turns of the coil 12; and a coupling layer 14 connected to the coil 12. The insulating layer 11 is made of an insulating material such as alumina. The coil 12 is flat-whorl-shaped and made of a conductive material such as copper. A connecting portion 12a is formed at an end of the coil 12. The coupling layer 14 is disposed on the connecting portion 12a. The insulating layer 13 is made of an insulating material such as photoresist. The coupling layer 14 is made of a conductive material.

The magnetic head further comprises an encasing layer 15 made of a nonmagnetic material and disposed to cover the insulating layer 13. The encasing layer 15 has a groove 15a that opens in the top surface thereof and that accommodates the pole layer described later. The encasing layer 15 may be made of any of alumina, silicon oxide ($SiO_x$), and silicon oxynitride (SiON), for example. The encasing layer 15 and the coupling layer 14 have flattened top surfaces.

The magnetic head further comprises a nonmagnetic metal layer 17 made of a nonmagnetic metal material and disposed on a portion of the top surface of the encasing layer 15. The nonmagnetic metal layer 17 has an opening 17a that penetrates, and the edge of the opening 17a is located directly above the edge of the groove 15a in the top surface of the encasing layer 15. The nonmagnetic metal layer 17 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example. The nonmagnetic metal layer 17 corresponds to the metal layer of the invention.

The magnetic head further comprises a nonmagnetic film 20, a polishing stopper layer 22 and the pole layer 24 that are disposed in the groove 15a and in the opening 17a. The nonmagnetic film 20 is disposed to touch the surface of the groove 15a. The pole layer 24 is disposed apart from the surface of the groove 15a. The polishing stopper layer 22 is disposed between the nonmagnetic film 20 and the pole layer 24. The polishing stopper layer 22 also functions as a seed layer used for forming the pole layer 24 by plating. The pole layer 24 incorporates: a first layer 241 located closer to the surface of the groove 15a; and a second layer 242 located farther from the surface of the groove 15a. The first layer 241 may be omitted.

The magnetic head further comprises a coating layer 26 disposed on a portion of the top surface of the encasing layer 15 in which the nonmagnetic metal layer 17 is not placed. The coating layer 26, the nonmagnetic metal layer 17, the nonmagnetic film 20, the polishing stopper layer 22, and the pole layer 24 have flattened top surfaces. Therefore, in the medium facing surface 40, the top surface of the nonmagnetic metal layer 17 and the top surface of the pole layer 24 are located at the same height. It suffices that the top surface of the pole layer 24 is located at a height within a range between the height at which the top surface of the nonmagnetic metal layer 17 is located and the height at which the bottom surface thereof is located. As long as this condition is satisfied, the top surface of the pole layer 24 may be located at a height lower than the height at which the top surface of the nonmagnetic metal layer 17 is located.

The nonmagnetic film 20 may be made of an insulating material or a semiconductor material, for example. The insulating material as the material of the nonmagnetic film 20 may be any of alumina, silicon oxide ($SiO_x$), and silicon oxynitride (SiON). The semiconductor material as the material of the nonmagnetic film 20 may be polycrystalline silicon or amorphous silicon.

The polishing stopper layer 22 is made of a nonmagnetic conductive material. The material of the polishing stopper layer 22 may be the same as that of the nonmagnetic metal layer 17.

Each of the first layer 241 and the second layer 242 is made of a magnetic metal material. The first layer 241 may be made of any of CoFeN, CoNiFe and NiFe, for example. The second layer 242 may be made of any of NiFe, CoNiFe and CoFe, for example.

The magnetic head further comprises a gap layer 27 disposed on the top surfaces of the nonmagnetic metal layer 17 and the pole layer 24. The gap layer 27 has an opening located at a distance from the medium facing surface 40. The gap layer 27 may be made of an insulating material such as alumina or a nonmagnetic metal material such as Ru, NiCu, Ta, W or NiB.

The magnetic head further comprises a shield layer 28. The shield layer 28 has: a first layer 28A disposed on the gap layer 27; a second layer 28C disposed on the first layer 28A; a yoke layer 28B disposed on a portion of the pole layer 24 where the opening of the gap layer 27 is formed; a coupling layer 28D disposed on the yoke layer 28B; and a third layer 28E disposed to couple the second layer 28C to the coupling layer 28D. The first layer 28A, the yoke layer 28B, the second layer 28C, the coupling layer 28D and the third layer 28E are each made of a magnetic material. These layers 28A to 28E may be made of any of CoFeN, CoNiFe and NiFe, for example.

The magnetic head further comprises a nonmagnetic layer 29 made of a nonmagnetic material and disposed around the yoke layer 28B. A portion of the nonmagnetic layer 29 is disposed on a side of the first layer 28A. The nonmagnetic layer 29 is made of an inorganic insulating material such as alumina or coating glass. Alternatively, the nonmagnetic layer 29 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: an insulating layer 30 disposed on regions of the top surfaces of the yoke layer 28B and the nonmagnetic layer 29 in which a coil described later is disposed; the coil 31 disposed on the insulating layer 30; an insulating layer 32 disposed around the coil 31 and in the space between the respective adjacent turns of the coil 31; and an insulating layer 34 disposed on the coil 31 and the insulating layer 32. The coil 31 is flat-whorl-shaped. A portion of the coil 31 passes between the second layer 28C and the coupling layer 28D. The coil 31 is made of a conductive material such as copper. The second layer 28C, the coupling layer 28D, the coil 31 and the insulating layer 32 have flattened top surfaces. The insulating layer 32 is made of photoresist, for example. The insulating layers 30 and 34 are made of alumina, for example.

The magnetic head further comprises a coupling layer 36 disposed on a magnetic layer 241P formed on the coupling layer 14. A connecting portion 31a is provided at an end of the coil 31. The connecting portion 31a is disposed on the coupling layer 36. The magnetic head further comprises: an insulating layer 33 disposed around the connecting portion 31a; a coupling layer 37 disposed on the connecting portion 31a; and an insulating layer 35 disposed around the coupling layer 37. Each of the coupling layers 36 and 37 is made of a conductive material. The coupling layer 36 may be made of a material the same as that of the first layer 28A and the yoke layer 28B. The coupling layer 37 may be made of a material the same as that of the third layer 28E. The insulating layers 33 and 35 are made of alumina, for example.

The portions from the coil 12 to the third layer 28E of the shield layer 28 make up the write head. Although not shown, the magnetic head further comprises a protection layer for covering the shield layer 28, and a plurality of terminals formed on the protection layer. The coupling layer 37 is connected to one of these terminals. The connecting portion 12a of the coil 12 and the connecting portion 31a of the coil 31 are thereby connected to the one of the terminals. An end of the coil 12 opposite to the connecting portion 12a and an end of the coil 31 opposite to the connecting portion 31a are connected to the other terminals.

As described so far, the magnetic head of the embodiment comprises the medium facing surface 40 that faces toward a recording medium, the read head, and the write head. The read head and the write head are stacked on the substrate 1. The read head is disposed backward in the direction T of travel of the recording medium (that is, disposed closer to the air inflow end of the slider). The write head is disposed forward in the direction T of travel of the recording medium (that is, disposed closer to the air outflow end of the slider).

The read head comprises the MR element 5 as the read element, and the bottom shield layer 3 and the first top shield layer 8 for shielding the MR element 5. Portions of the bottom shield layer 3 and the first top shield layer 8 that are located on a side of the medium facing surface 40 are opposed to each other, the MR element 5 being placed between these portions. The read head further comprises: the bottom shield gap film 4 disposed between the MR element 5 and the bottom shield layer 3; the top shield gap film 7 disposed between the MR element 5 and the first top shield layer 8; the second top shield layer 10 for shielding the read head and the write head from each other; and the nonmagnetic layer 9 disposed between the first top shield layer 8 and the second shield layer 10.

The write head comprises the coil 12, the encasing layer 15, the nonmagnetic metal layer 17, the nonmagnetic film 20, the polishing stopper layer 22, the pole layer 24, the gap layer 27, the shield layer 28, and the coil 31. The coils 12 and 31 generate a magnetic field corresponding to data to be written on the recording medium. The coil 12 is not a component requisite for the write head and may be omitted.

The pole layer 24 has an end face located in the medium facing surface 40. The pole layer 24 allows a magnetic flux corresponding to the field generated by the coil 31 to pass therethrough and generates a write magnetic field for writing the data on the medium by using the perpendicular magnetic recording system.

The shield layer 28 has an end located in the medium facing surface 40, and has a portion located away from the medium facing surface 40 and coupled to the pole layer 24. The gap layer 27 is made of a nonmagnetic material and provided between the pole layer 24 and the shield layer 28.

In the medium facing surface 40, the end face of the shield layer 28 is disposed forward of the end face of the pole layer 24 along the direction T of travel of the recording medium with a specific space created by the thickness of the gap layer 27. The gap layer 27 has a thickness that falls within a range of 30 to 60 nm inclusive, for example. At least part of the coil 31 is disposed between the pole layer 24 and the shield layer 28 and insulated from the pole layer 24 and the shield layer 28.

The pole layer 24 is disposed in the groove 15a of the encasing layer 15 and in the opening 17a of the nonmagnetic metal layer 17 with the nonmagnetic film 20 and the polishing stopper layer 22 disposed between the pole layer 24 and the groove 15a and between the pole layer 24 and the opening 17a. The nonmagnetic metal layer 17 is disposed on the top surface of the encasing layer 15. The nonmagnetic metal layer 17 has the opening 17a that penetrates, and the edge of the opening 17a is located directly above the edge of the groove 15a in the top surface of the encasing layer 15. The opening 17a has an inner wall that is orthogonal to the top surface of the substrate 1. A portion of the nonmagnetic film 20 disposed in the opening 17a of the nonmagnetic metal layer 17 has an inner wall that is. orthogonal to the top surface of the substrate 1, too. Furthermore, a portion of the polishing stopper layer 22 disposed in the opening 17a of the nonmagnetic metal layer 17 has an inner wall that is orthogonal to the top surface of the substrate 1, too. The nonmagnetic metal layer 17 has a thickness that falls within a range of 20 to 80 nm inclusive, for example. The nonmagnetic film 20 has a thickness that falls within a range of 10 to 50 nm inclusive, for example. The polishing stopper layer 22 has a thickness that falls within a range of 40 to 70 nm inclusive, for example.

The pole layer 24 incorporates: the first layer 241 located closer to the surface of the groove 15a; and the second layer 242 located farther from the surface of the groove 15a. The first layer 241 has a thickness that falls within a range of 50 to 70 nm inclusive, for example.

The shield layer 28 has: the first layer 28A disposed adjacent to the gap layer 27; the second layer 28C disposed on a side of the first layer 28A farther from the gap layer 27; the yoke layer 28B disposed on the portion of the pole layer 24 where the opening of the gap layer 27 is formed; the coupling layer 28D disposed on the yoke layer 28B; and the third layer 28E disposed to couple the second layer 28C to the coupling layer 28D. The second layer 28C is disposed between the medium facing surface 40 and the at least part of the coil 31.

The first layer 28A has: a first end located in the medium facing surface 40; and a second end opposite to the first end. The second layer 28C also has: a first end located in the medium facing surface 40; and a second end opposite to the first end. The second end of the first layer 28A defines the throat height TH. That is, as shown in FIG. 3, the throat height TH is the minimum distance between the first end and the second end of the portion of the first layer 28A facing toward the pole layer 24 with the pole layer 27 disposed in between. The throat height TH falls within a range of 0.1 to 0.3 µm inclusive, for example. The minimum distance between the first end and the second end of the portion of the second layer 28C facing toward the pole layer 24 with the gap layer 27 and the first layer 28A disposed in between falls within a range of 0.5 to 0.8 µm inclusive, for example. The first layer 28A and the yoke layer 28B have a thickness that falls within a range of 0.3 to 0.8 µm inclusive, for example. The second layer 28C and the coupling layer 28D have a thickness that falls within a range of 2.0 to 2.5 µm inclusive, for example. The third layer 28E has a thickness that falls within a range of 2.0 to 3.0 µm inclusive, for example. The coil 31 has a thickness that is equal to or smaller than the thickness of the second layer 28C and that falls within a range of 2.0 to 2.5 µm inclusive, for example.

Figure 1:
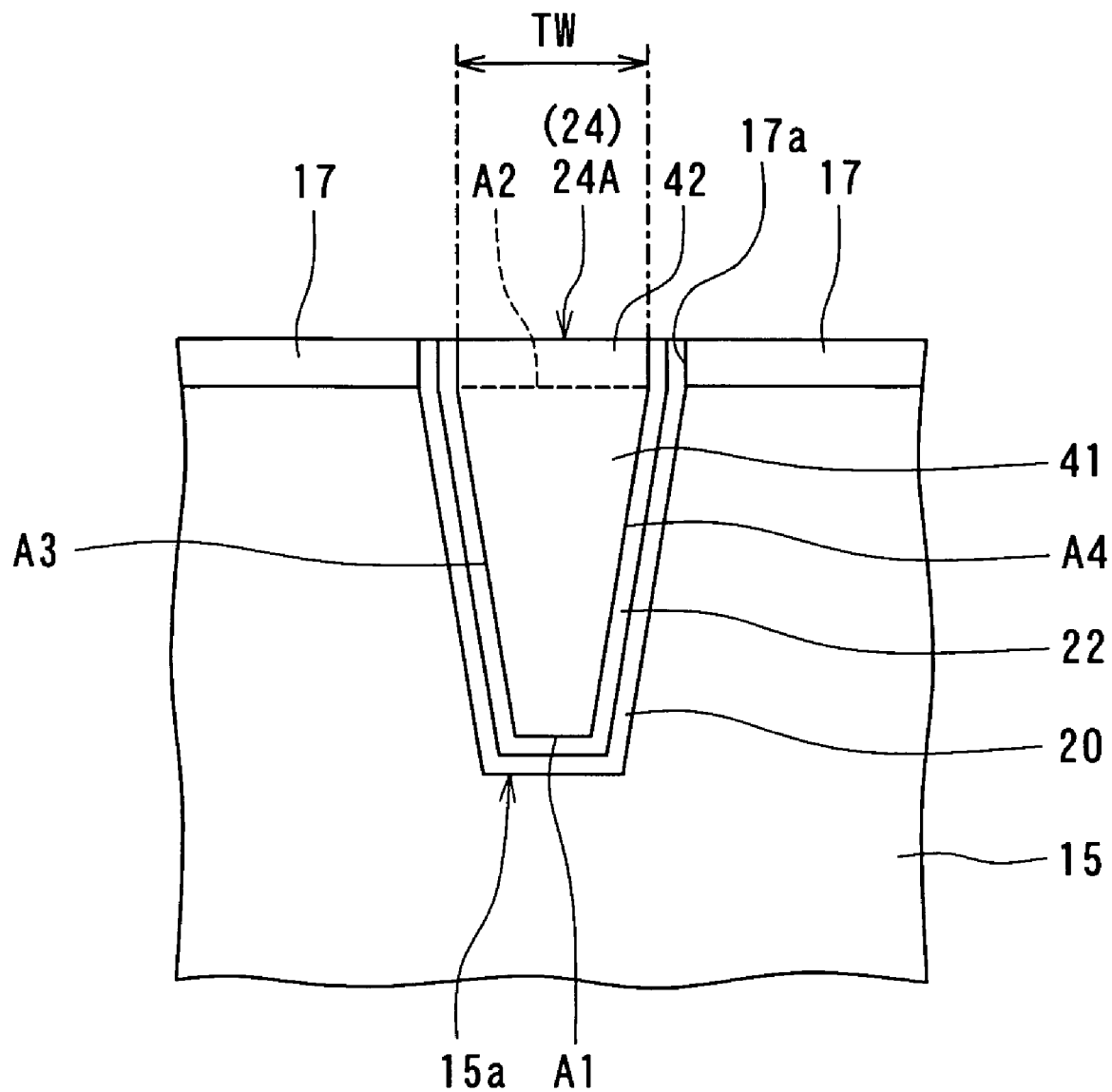
FIG. 1 is a front view of a pole layer and a neighborhood thereof in the medium facing surface of a magnetic head of a first embodiment of the invention.
Figure 4:
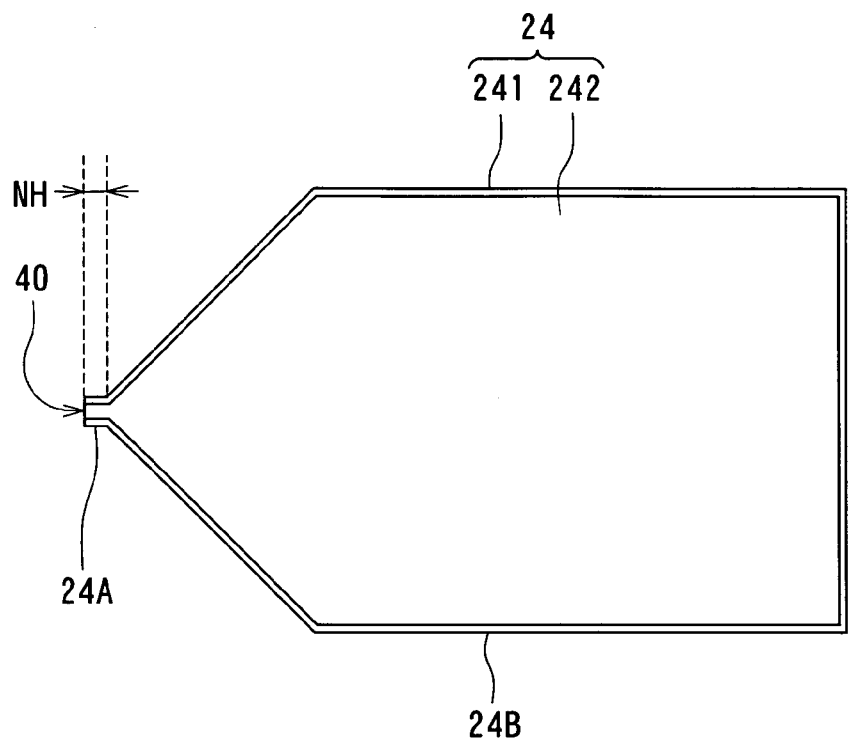
FIG. 4 is a top view of the pole layer of the magnetic head of the first embodiment of the invention.
Figure 5:
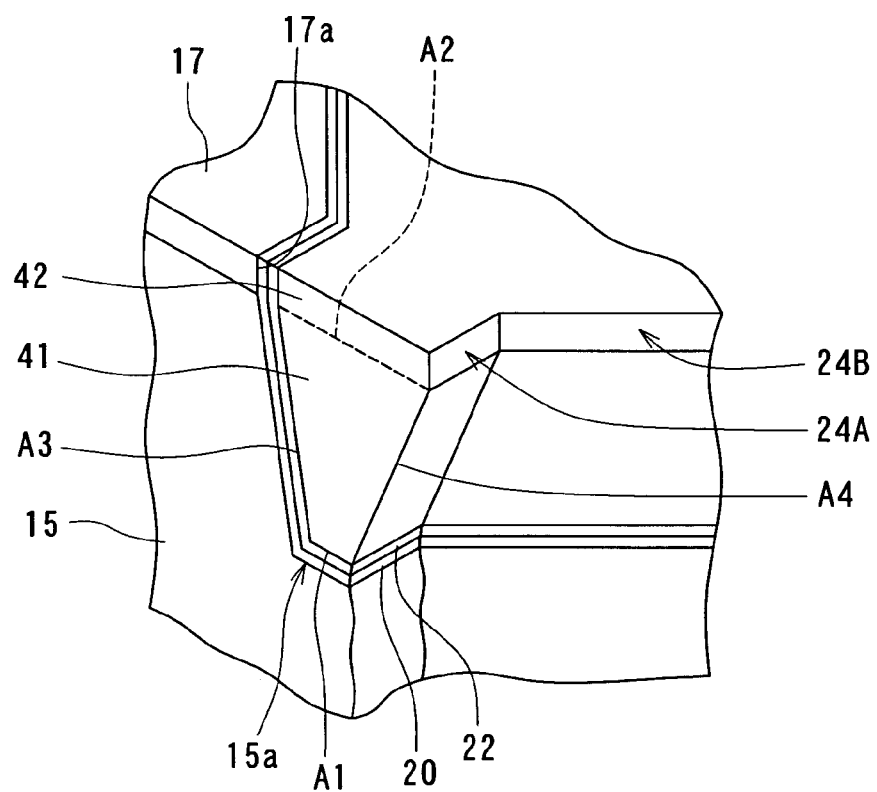
FIG. 5 is a perspective view illustrating a portion of the pole layer near the medium facing surface of the magnetic head of the first embodiment of the invention.

Reference is now made to FIG. 1, FIG. 4 and FIG. 5 to describe the shape of the pole layer 24 in detail. FIG. 1 is a front view of the pole layer 24 and a neighborhood thereof in the medium facing surface. FIG. 4 is a top view of the pole layer 24. FIG. 5 is a perspective view of a portion of the pole layer 24 near the medium facing surface 40. As shown in FIG. 4, the pole layer 24 incorporates a track width defining portion 24A and a wide portion 24B. The track width defining portion 24A has an end located in the medium facing surface 40 and has a uniform width. The wide portion 24B is coupled to the other end of the track width defining portion 24A and has a width greater than the width of the track width defining portion 24A. The wide portion 24B is equal in width to the track width defining portion 24A at the interface with the track width defining portion 24A, and gradually increases in width as the distance from the medium facing surface 40 increases and then maintains a specific width to the end of the wide portion 24B. Here, the length of the track width defining portion 24A taken in the direction orthogonal to the medium facing surface 40 is called a neck height NH. The neck height NH falls within a range of 0.1 to 0.3 µm inclusive, for example.

As shown in FIG. 1 and FIG. 5, the end face of the track width defining portion 24A located in the medium facing surface 40 has: a first portion 41; and a second portion 42 connected to the first portion 41 and located farther from the substrate 1 than the first portion 41. In FIG. 1 and FIG. 5, the broken lines indicate the boundary between the first portion 41 and the second portion 42. The width of the first portion 41 decreases as the distance from the substrate 1 decreases.

The first portion 41 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width TW. The width of the end face of the track width defining portion 24A located in the medium facing surface 40 decreases as the distance from the first side A1 decreases. Each of the third side A3 and the fourth side A4 forms an angle that falls within a range of 5 to 12 degrees inclusive, for example, with respect to the direction orthogonal to the top surface of the substrate 1.

The second portion 42 has a uniform width that is equal to the length of the second side A2 and that defines the track width TW. The two sides of the second portion 42 that are located on both sides opposed to each other in the direction of width are orthogonal to the top surface of the substrate 1. In the medium facing surface 40, the nonmagnetic metal layer 17 exists on both sides of the second portion 42 opposed to each other in the direction of track width. The thickness of the second portion 42 is equal to that of the nonmagnetic metal layer 17 and falls within a range of 20 to 80 nm inclusive, for example. The width of the second portion 42, that is, the track width TW, falls within a range of 0.08 to 0.12 µm inclusive, for example. The entire thickness of the pole layer 24 falls within a range of 0.20 to 0.30 µm inclusive, for example.

The magnetic head of the embodiment writes data on a recording medium by using the write head and reads data written on the recording medium by using the read head. In the write head, the coil 31 generates a magnetic field that corresponds to data to be written on the medium. The pole layer 24 and the shield layer 28 form a magnetic path through which a magnetic flux corresponding to the magnetic field generated by the coil 31 passes. The pole layer 24 allows the flux corresponding to the field generated by the coil 31 to pass and generates a write magnetic field used for writing the data on the medium through the use of the perpendicular magnetic recording system. The shield layer 28 takes in a disturbance magnetic field applied from outside the magnetic head to the magnetic head. It is thereby possible to prevent erroneous writing on the recording medium caused by the disturbance magnetic field intensively taken in into the pole layer 24.

According to the embodiment, in the medium facing surface 40, the end face of the shield layer 28 is disposed forward of the end face of the track width defining portion 24A along the direction T of travel of the recording medium (that is, closer to the air outflow end of the slider) with a specific small space created by the gap layer 27. The location of an end of the bit pattern written on the recording medium is determined by the location of the end of the pole layer 24 that is closer to the gap layer 27 and located in the medium facing surface 40. The shield layer 28 takes in a magnetic flux generated from the end face of the pole layer 24 located in the medium facing surface 40 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

According to the embodiment, as shown in FIG. 1 and FIG. 5, the end face of the track width defining portion 24A located in the medium facing surface 40 has a width that decreases as the distance from the first side A1 of the first portion 41 decreases. It is thereby possible to prevent the problems resulting from the skew.

According to the embodiment, the nonmagnetic metal layer 17 is provided on the top surface of the encasing layer 15 having the groove 15a, the nonmagnetic metal layer 17 having the penetrating opening 17a that is contiguous to the groove 15a. The pole layer 24 is encased in the groove 15a of the encasing layer 15 and in the opening 17a of the nonmagnetic metal layer 17. The end face of the track width defining portion 24A located in the medium facing surface 40 has the first portion 41 and the second portion 42. The nonmagnetic metal layer 17 exists on both sides of the second portion 42 opposed to each other in the direction of track width. It is easier to form the opening 17a in the nonmagnetic metal layer 17 by etching, the opening 17a having an inner wall orthogonal to the top surface of the substrate 1, compared with forming an opening having the same shape in a layer made of an inorganic insulating material. In addition, according to the embodiment, it is possible to etch the nonmagnetic metal layer 17 and the encasing layer 15 under the same conditions so as to form the tapered groove 15a and the opening 17a having the inner wall orthogonal to the top surface of the substrate 1. As a result, it is possible to easily form the groove 15a of the encasing layer 15 and the opening 17a of the nonmagnetic metal layer 17.

The etching rate of the pole layer 24 made of a magnetic metal material and that of the nonmagnetic metal layer 17 made of a nonmagnetic metal material are nearly equal. Therefore, according to the embodiment, it is possible to etch the top surfaces of the pole layer 24 and the metal layer 17 with precision. It is thereby possible to control the thickness of the pole layer 24 with precision.

According to the embodiment, the second portion 42 has a uniform width that defines the track width. It is therefore possible to control the track width with precision. These features of the embodiment make it possible to form the pole layer 24 having a desired shape with accuracy.

According to the embodiment, the pole layer 24 is disposed in the groove 15a of the encasing layer 15 and the opening 17a of the nonmagnetic metal layer 17 with the nonmagnetic film 20 and the polishing stopper layer 22 disposed between the pole layer 24 and each of the groove 15a and the opening 17a. As a result, it is possible to reduce the width of the second portion 42 and to thereby reduce the track width.

Reference is now made to FIG. 6 to FIG. 25 to describe a method of manufacturing the magnetic head of the embodiment. FIG. 6 to FIG. 25 are cross-sectional views of the layered structure obtained in manufacturing process of the magnetic head of the embodiment. FIG. 6, FIG. 8, FIG. 10, FIG. 12, FIG. 14, FIG. 16, FIG. 18, FIG. 20, FIG. 22 and FIG. 24 show cross sections orthogonal to the medium facing surface and the substrate. FIG. 7, FIG. 9, FIG. 11, FIG. 13, FIG. 15, FIG. 17, FIG. 19, FIG. 21, FIG. 23 and FIG. 25 show cross sections taken in the position in which the medium facing surface is to be formed.

Figure 6:
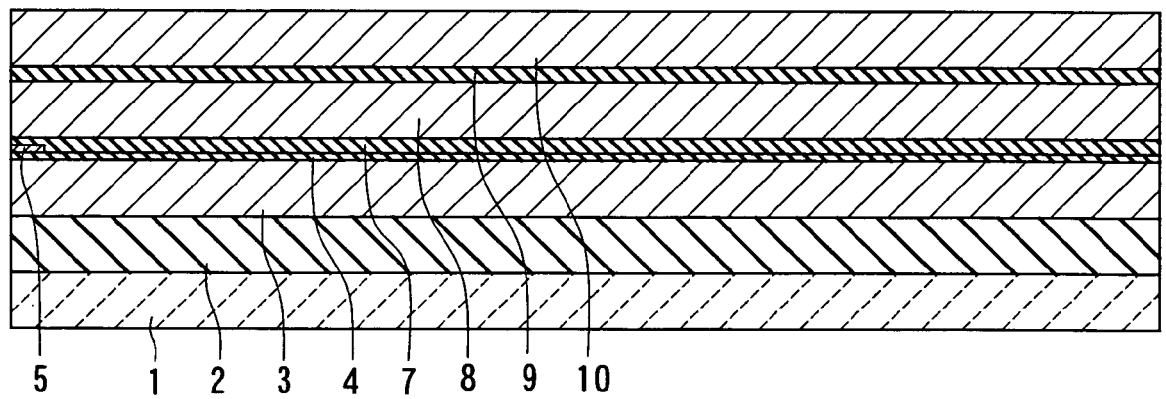
FIG. 6 is a cross-sectional view of a layered structure obtained in a step of a method of manufacturing the magnetic head of the first embodiment of the invention.
Figure 7:
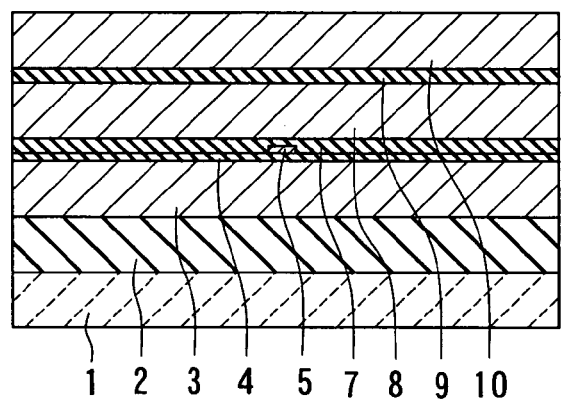
FIG. 7 is another cross-sectional view of the layered structure shown in FIG. 6.

According to the method of manufacturing the magnetic head of the embodiment, as shown in FIG. 6 and FIG. 7, the insulating layer 2, the bottom shield layer 3 and the bottom shield gap film 4 are first formed on the substrate 1 one by one. Next, the MR element 5 and leads (not shown) connected to the MR element 5 are formed on the bottom shield gap film 4. Next, the top shield gap film 7 is formed to cover the MR element 5 and the leads. Next, the first top shield layer 8, the nonmagnetic layer 9 and the second top shield layer 10 are formed one by one on the top shield gap film 7.

Figure 8:
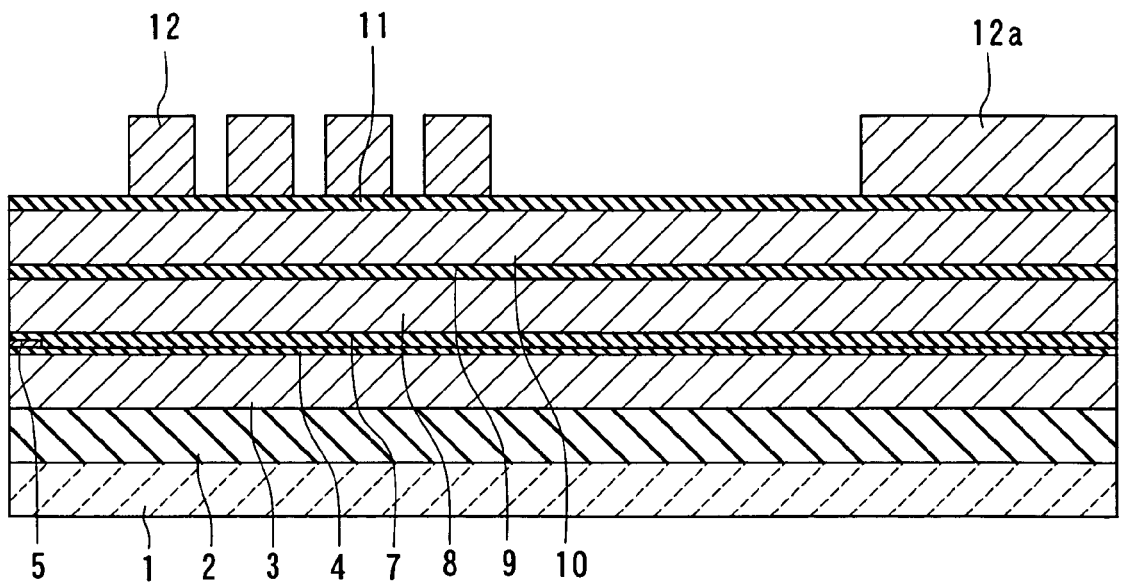
FIG. 8 is a cross-sectional view of the layered structure obtained in a step that follows the step shown in FIG. 6.
Figure 9:
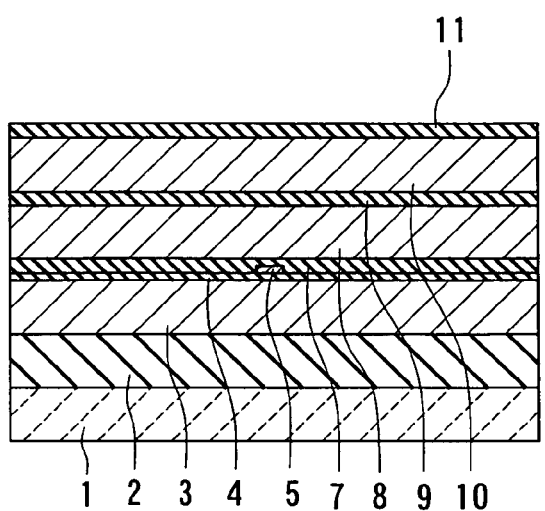
FIG. 9 is another cross-sectional view of the layered structure shown in FIG. 8.

FIG. 8 and FIG. 9 illustrate the following step. In the step, first, the insulating layer 11 is formed on the second top shield layer 10. Next, the coil 12 is formed on the insulating layer 11 by frame plating, for example.

Figure 10:
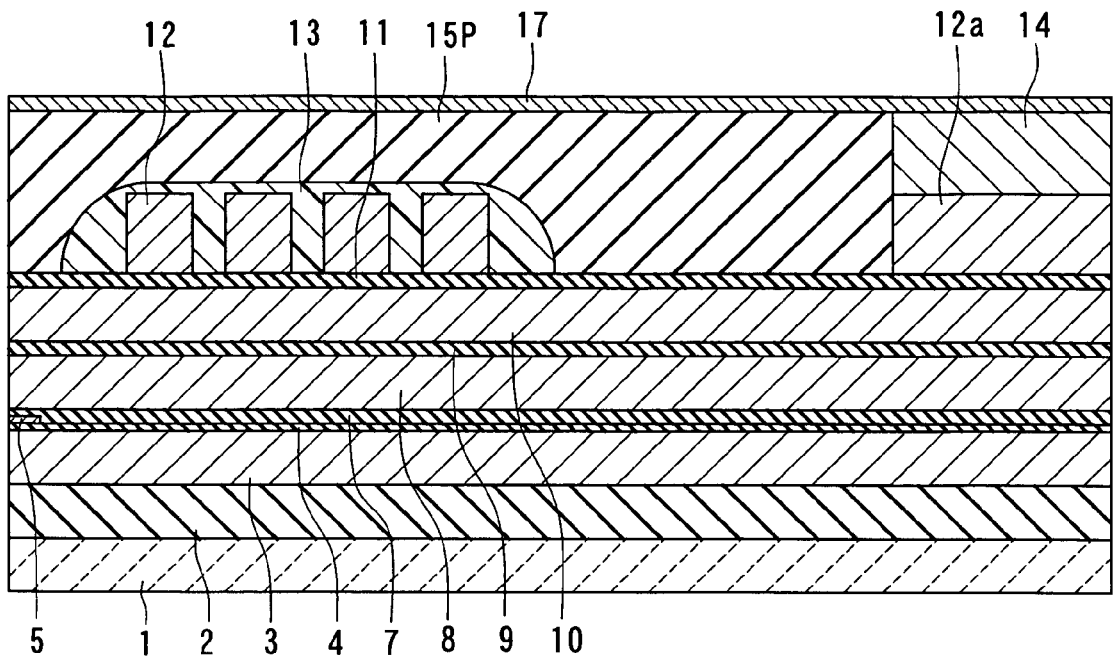
FIG. 10 is a cross-sectional view of the layered structure obtained in a step that follows the step shown in FIG. 8.
Figure 11:
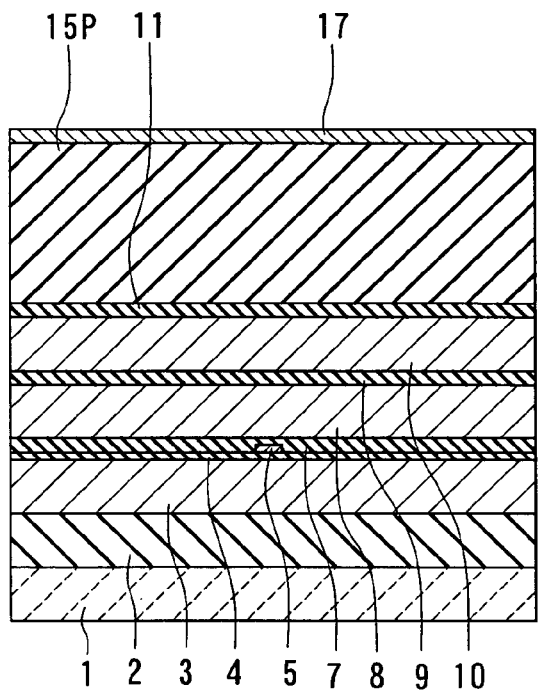
FIG. 11 is another cross-sectional view of the layered structure shown in FIG. 10.

FIG. 10 and FIG. 11 illustrate the following step. In the step, first, the insulating layer 13 is formed to cover the coil 12. Next, the coupling layer 14 is formed on the connecting portion 12a of the coil 12. Next, a nonmagnetic layer 15P having a thickness of 3 to 4 µm, for example, is formed on the entire top surface of the layered structure. Next, the nonmagnetic layer 15P is polished by CMP, for example, until the coupling layer 14 is exposed. The nonmagnetic layer 15P is a layer that will be the encasing layer 15 by forming the groove 15a therein later. Next, the nonmagnetic metal layer 17 having a thickness of 20 to 80 nm, for example, is formed by sputtering, for example, on the entire top surface of the layered structure.

Figure 12:
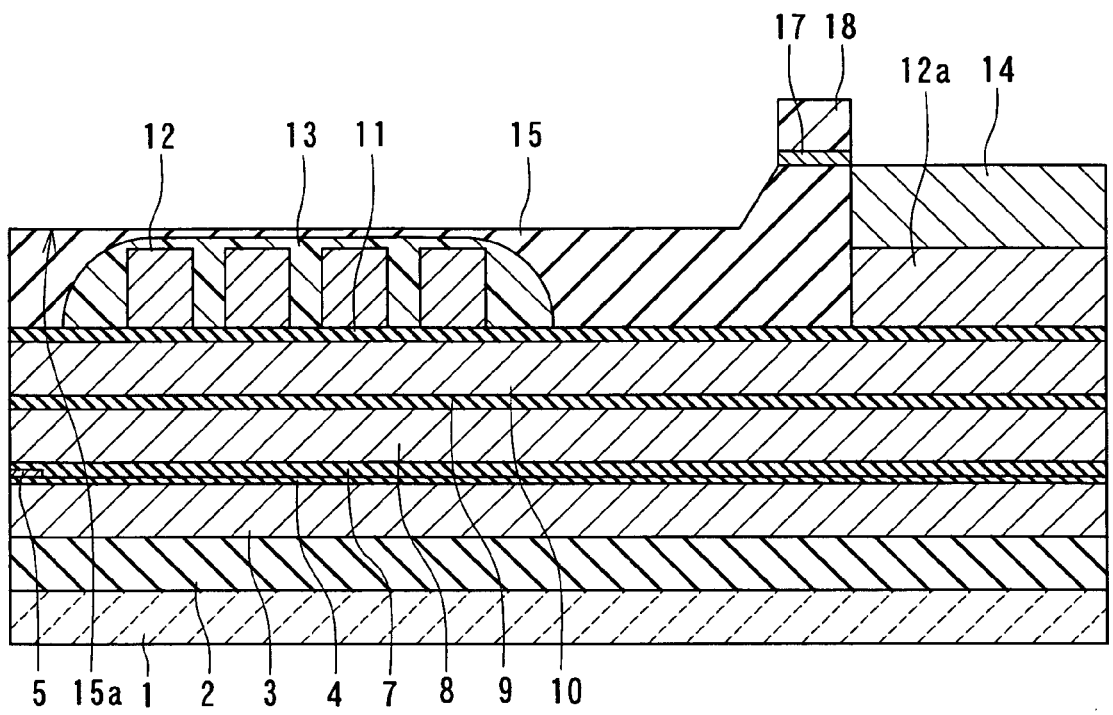
FIG. 12 is a cross-sectional view of the layered structure obtained in a step that follows the step shown in FIG. 10.
Figure 13:
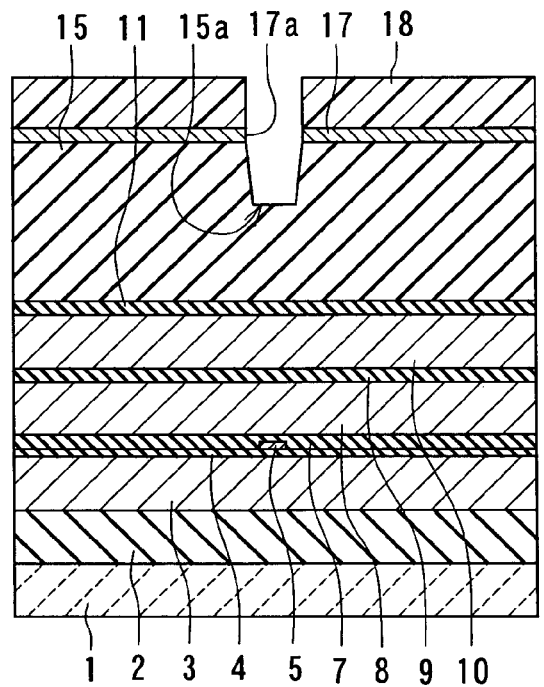
FIG. 13 is another cross-sectional view of the layered structure shown in FIG. 12.

FIG. 12 and FIG. 13 illustrate the following step. In the step, first, a photoresist layer having a thickness of 1.0 µm, for example, is formed on the nonmagnetic metal layer 17. The photoresist layer is then patterned to form a mask 18 for making the groove 15a. The mask 18 has an opening having a shape corresponding to the groove 15a. Next, the nonmagnetic metal layer 17 is selectively etched using the mask 18.

The opening 17a that penetrates is thereby formed in the nonmagnetic metal layer 17. The opening 17a has a shape corresponding to the plane geometry of the pole layer 24 to be formed later. Next, the nonmagnetic layer 15P is selectively etched using the mask 18. As a result, a portion of the nonmagnetic layer 15P exposed from the opening 17a of the nonmagnetic metal layer 17 is etched and the groove 15a is thereby formed in the nonmagnetic layer 15P. Next, the mask 18 is removed. The nonmagnetic layer 15P is formed into the encasing layer 15 by forming the groove 15a therein. The edge of the opening 17a of the nonmagnetic metal layer 17 is located directly above the edge of the groove 15a located in the top surface of the encasing layer 15.

The etching of each of the nonmagnetic metal layer 17 and the nonmagnetic layer 15P is performed by reactive ion etching or ion beam etching, for example. The etching for forming the groove 15a in the nonmagnetic layer 15P is performed so that the walls of the groove 15a corresponding to both sides of the track width defining portion 24A of the pole layer 24 each form an angle that falls within a range of 5 to 12 degrees inclusive, for example, with respect to the direction orthogonal to the top surface of the substrate 1.

Next, the opening 17a of the nonmagnetic metal layer 17 is observed by using an electron microscope. It is preferred to use a critical dimension measurement scanning electron microscope as the electron microscope. Since the edge of the opening 17a is located directly above the edge of the groove 15a located in the top surface of the encasing layer 15, the shape of the opening 17a coincides with the shape of the groove 15a taken in the top surface of the encasing layer 15. Therefore, it is possible to obtain the shape of the groove 15a taken in the top surface of the encasing layer 15 by observing the opening 17a.

As shown in FIG. 1, the track width TW is equal to the width of the second portion 42 taken in the end face of the track width defining portion 24A located in the medium facing surface 40. The track width TW is of a value obtained by subtracting twice the thickness of the nonmagnetic film 20 and twice the thickness of the polishing stopper layer 22 from the width of the opening 17a taken in the position in which the medium facing surface 40 is formed. It is possible to control the thicknesses of the nonmagnetic film 20 and the polishing stopper layer 22 with accuracy. Therefore, it is possible to obtain the track width TW by measuring the width of the opening 17a in the position in which the medium facing surface 40 is formed.

A case is now assumed wherein the nonmagnetic metal layer 17 is not disposed on the top surface of the encasing layer 15 and the encasing layer 15 is made of an insulating material such as alumina. In this case, if an attempt is made to observe the groove 15a in the top surface of the encasing layer 15 by an electron microscope, electric charges accumulate on the top surface of the encasing layer 15 and it is impossible to obtain a correct image. According to the embodiment, in contrast, the nonmagnetic metal layer 17 made of a conductive material is disposed on the top surface of the encasing layer 15. In addition, the edge of the opening 17a of the nonmagnetic metal layer 17 is located directly above the edge of the groove 15a located in the top surface of the encasing layer 15. As a result, a correct image is obtained when the nonmagnetic metal layer 17 is observed by an electron microscope, and it is thereby possible to measure the geometry of the opening 17a of the nonmagnetic metal layer 17 with accuracy. It is thereby possible to measure the geometry of the groove 15a in the top surface of the encasing layer 15 with accuracy.

When the width of the opening 17a taken in the position in which the medium facing surface is formed is measured by an electron microscope as described above, the width of the bottom of the groove 15a taken in the position in which the medium facing surface is formed may be measured at the same time. It is possible by calculation to obtain the angle formed by the wall of the groove 15a with respect to the direction orthogonal to the top surface of the substrate 1 if the depth of the groove 15a is obtained in addition to the width of the opening 17a and the width of the bottom of the groove 15a. Here, it is possible to obtain the depth of the groove 15a by preparing a sample for measuring the depth of the groove 15a, cutting the sample so that the cross section shown in FIG. 13 appears, and observing the cross section by a scanning electron microscope, for example. If the nonmagnetic layer 15P is etched by reactive ion etching, the etching rate of the nonmagnetic layer 15P is nearly constant. Consequently, as long as the etching period is constant, the depth of the groove 15a is nearly uniform, too. Therefore, if the depth of the groove 15a is measured in advance by using the sample for measuring the depth, the depth of the groove 15a is obtained without measuring in the course of manufacturing process of the magnetic head.

Figure 14:
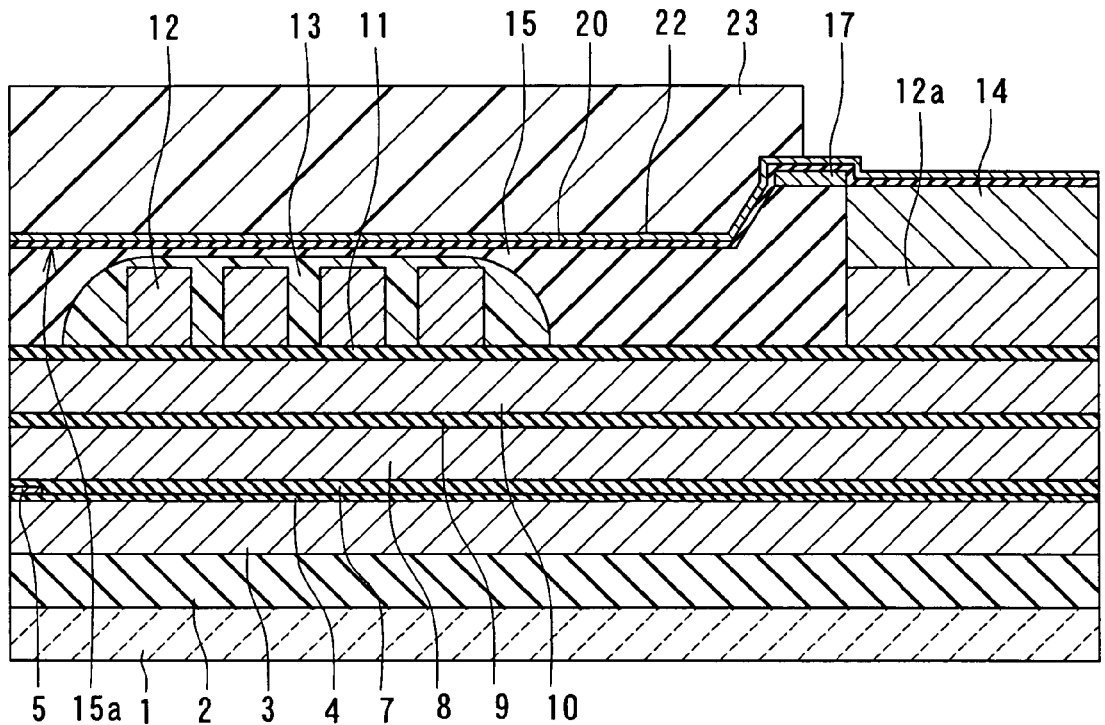
FIG. 14 is a cross-sectional view of the layered structure obtained in a step that follows the step shown in FIG. 12.
Figure 15:
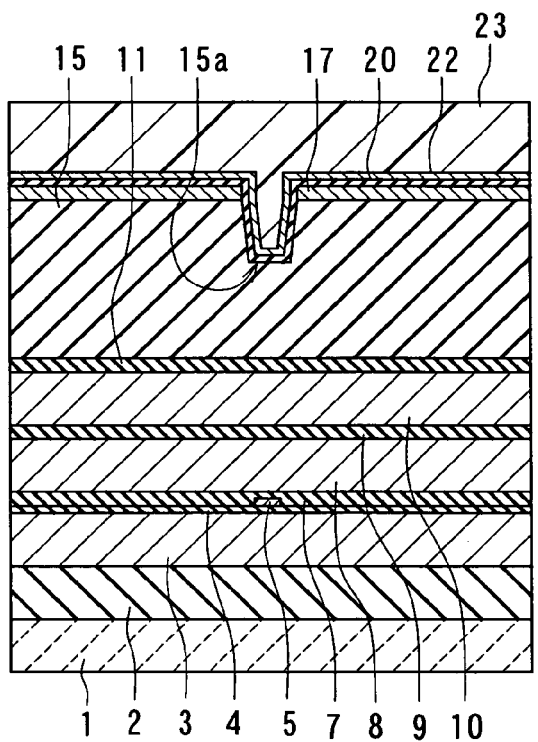
FIG. 15 is another cross-sectional view of the layered structure shown in FIG. 14.

FIG. 14 and FIG. 15 illustrate the following step. In the step, first, the nonmagnetic film 20 is formed on the entire top surface of the layered structure. The nonmagnetic film 20 is formed in the groove 15a of the encasing layer 15, too. The nonmagnetic film 20 may be formed by sputtering or chemical vapor deposition (hereinafter referred to as CVD), for example. It is possible to control the thickness of the nonmagnetic film 20 with precision. If the nonmagnetic film 20 is formed by CVD, it is preferred to employ a method called 'atomic layer CVD' (ALCVD) in which formation of a single atomic layer is repeated. In this case, it is possible to control the thickness of the nonmagnetic film 20 with higher precision. When ALCVD is employed to form the nonmagnetic film 20, it is preferred to use alumina as the material of the nonmagnetic film 20. When a semiconductor material is used as the material of the nonmagnetic film 20, it is preferred to form the nonmagnetic film 20 by ALCVD at a low temperature (around 200° C.) or by low-pressure CVD at a low temperature. The semiconductor material as the material of the nonmagnetic film 20 is preferably undoped polycrystalline silicon or amorphous silicon.

Next, the polishing stopper layer 22 is formed by sputtering, for example, on the entire top surface of the layered structure. The polishing stopper layer 22 is formed in the groove 15a of the encasing layer 15, too. The polishing stopper layer 22 indicates the level at which polishing is stopped in the step of polishing the magnetic layer that will be performed later. Next, a photoresist layer is formed on the polishing stopper layer 22. Next, the photoresist layer is patterned to form a mask 23. The mask 23 has an opening located above the coupling layer 14. Next, portions of the nonmagnetic metal layer 17, the nonmagnetic film 20 and the polishing stopper layer 22 that are located above the coupling layer 14 are selectively etched using the mask 23. This etching is performed by ion beam etching, for example. The top surface of the coupling layer 14 is exposed by this etching.

Figure 16:
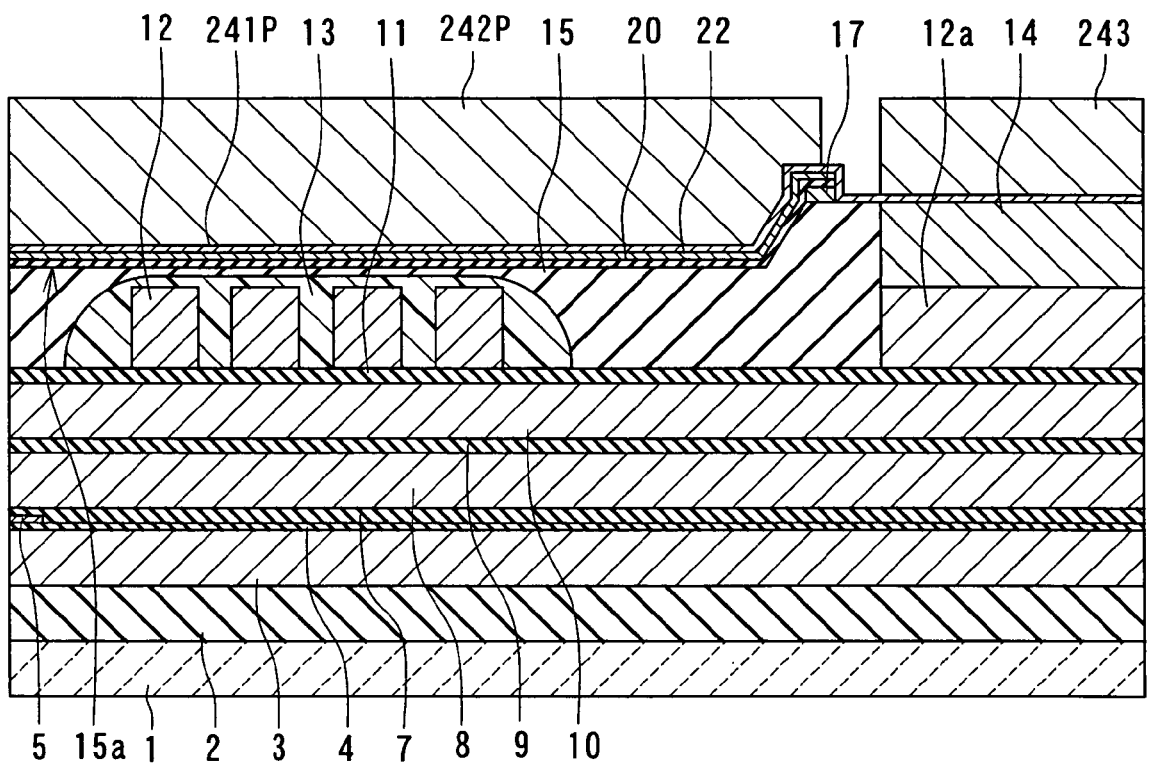
FIG. 16 is a cross-sectional view of the layered structure obtained in a step that follows the step shown in FIG. 14.
Figure 17:
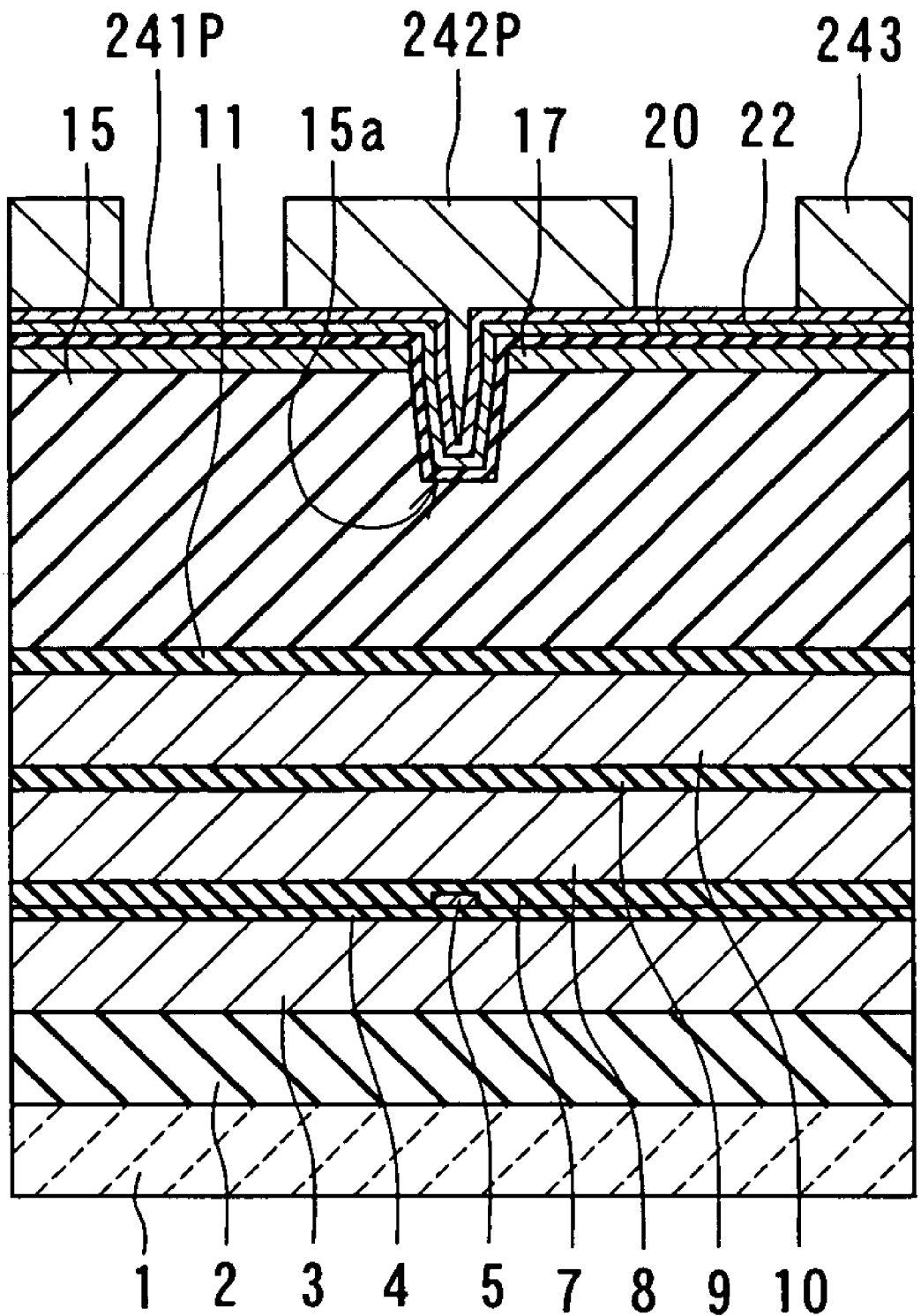
FIG. 17 is another cross-sectional view of the layered structure shown in FIG. 16.

FIG. 16 and FIG. 17 illustrate the following step. In the step, first, the magnetic layer 241P is formed on the entire top surface of the layered structure. The magnetic layer 241P will be the first layer 241 of the pole layer 24 later. The magnetic layer 241P is formed by sputtering or ion beam deposition (hereinafter referred to as IBD), for example. If the magnetic layer 241P is formed by sputtering, it is preferred to employ collimation sputtering or long throw sputtering. Next, a magnetic layer 242P is formed by frame plating on the magnetic layer 241P. In this case, the magnetic layer 241P and the polishing stopper layer 22 are used as electrodes for plating. In FIG. 16 and FIG. 17, numeral 243 indicates an unwanted plating layer formed outside the frame. The magnetic layer 242P will be the second layer 242 of the pole layer 24 later. In the manner thus described, the magnetic layers 241P and 242P to be the pole layer 24 are formed such that the groove 15a is filled with the magnetic layers 241P and 242P and that the top surfaces of the magnetic layers 241P and 242P are located higher than the top surface of the polishing stopper layer 22. Alternatively, the magnetic layer 241P may be omitted and only the polishing stopper layer 22 may be used as an electrode for plating to form the magnetic layer 242P.

Figure 18:
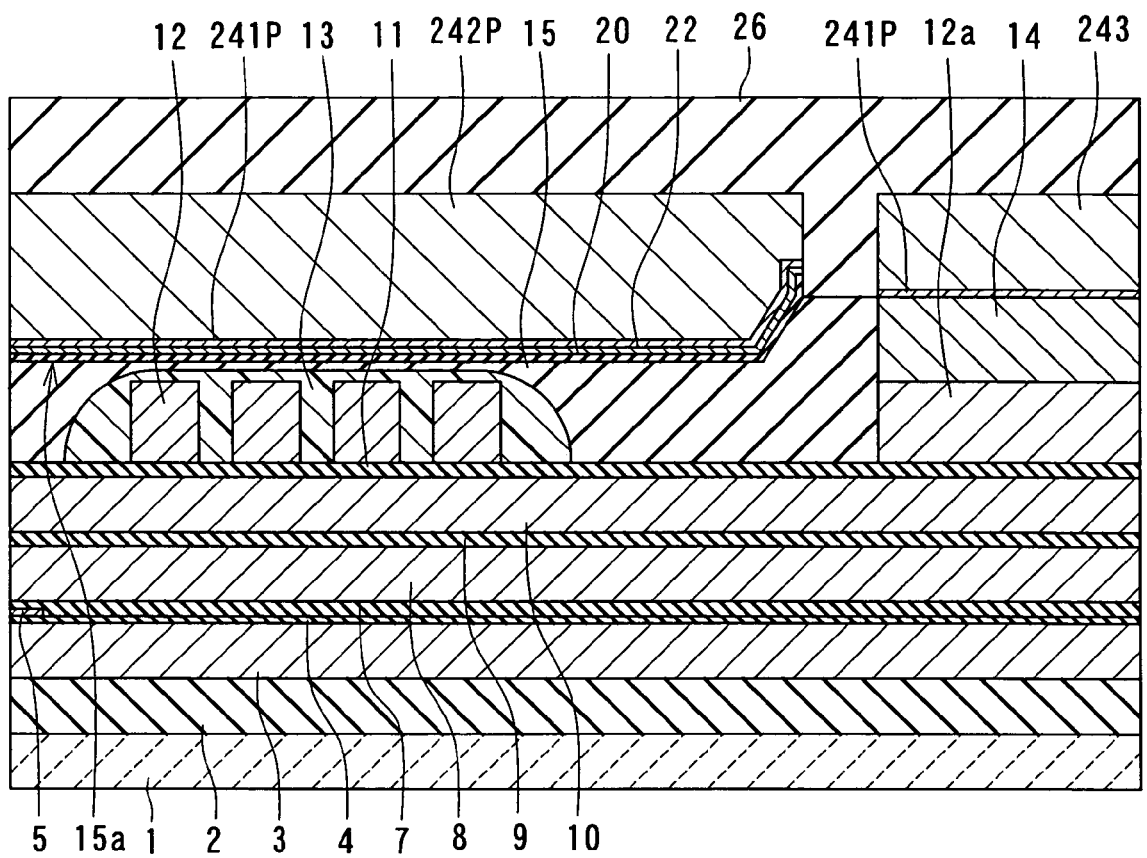
FIG. 18 is a cross-sectional view of the layered structure obtained in a step that follows the step shown in FIG. 16.
Figure 19:
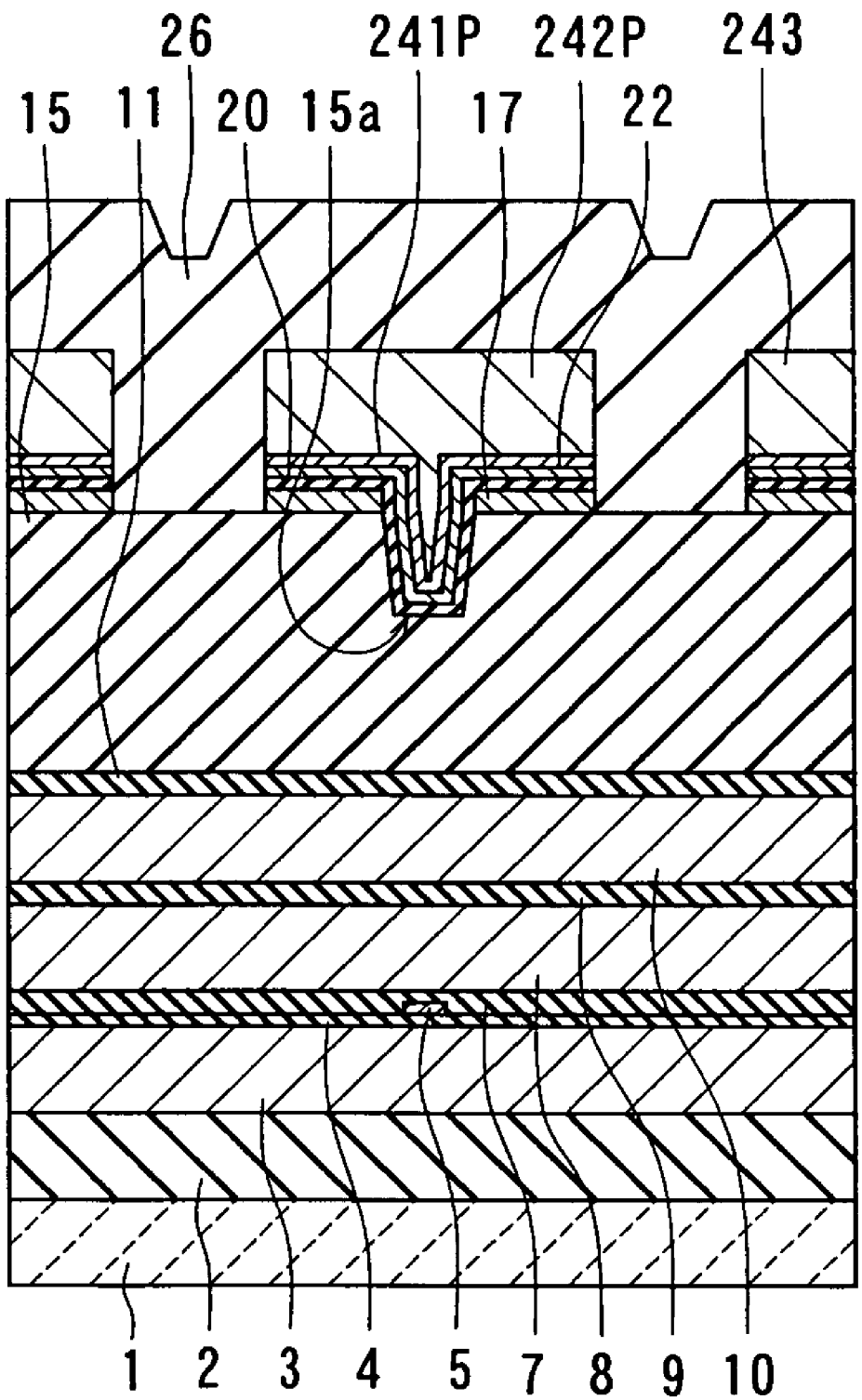
FIG. 19 is another cross-sectional view of the layered structure shown in FIG. 18.

FIG. 18 and FIG. 19 illustrate the following step. In the step, first, ion beam etching, for example, is performed to remove the layered structure that is disposed on the top surface of the encasing layer 15 and made up of the nonmagnetic metal layer 17, the nonmagnetic film 20, the polishing stopper layer 22 and the magnetic layer 241P except portions of the layered structure located below the magnetic layer 242P and the plating layer 243. Next, the coating layer 26 made of alumina, for example, and having a thickness of 1.0 to 1.5 µm, for example, is formed on the entire top surface of the layered structure.

Figure 20:
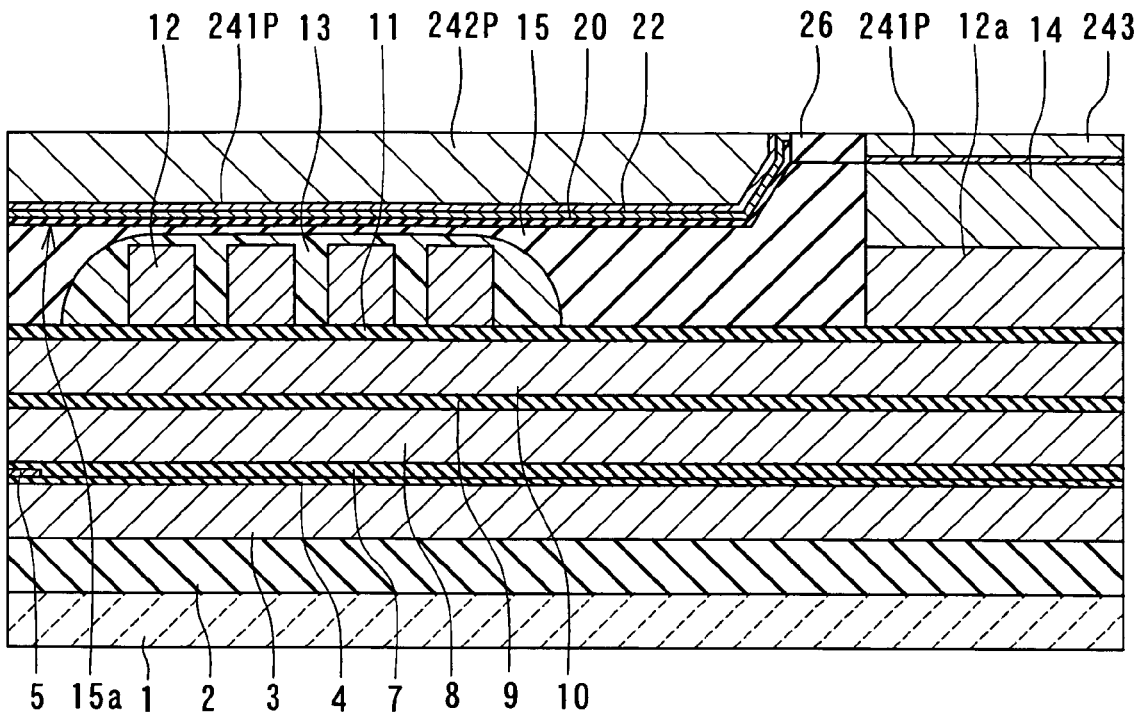
FIG. 20 is a cross-sectional view of the layered structure obtained in a step that follows the step shown in FIG. 18.
Figure 21:
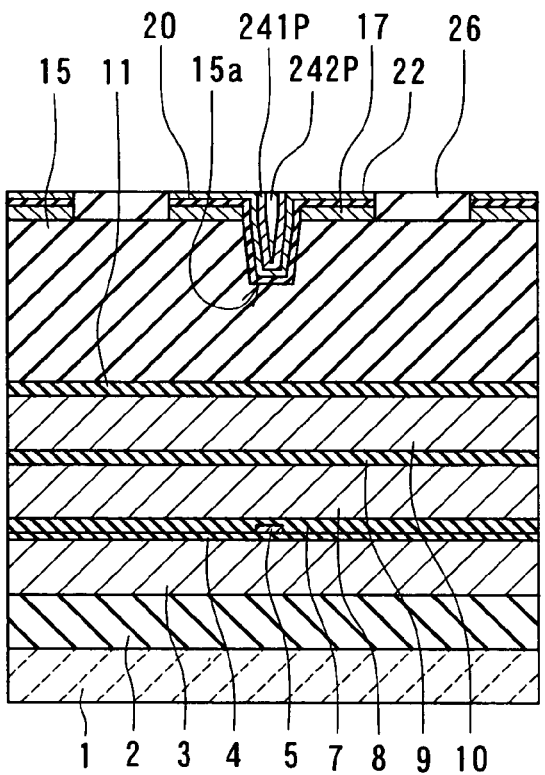
FIG. 21 is another cross-sectional view of the layered structure shown in FIG. 20.

FIG. 20 and FIG. 21 illustrate the following step. In the step, the coating layer 26, the magnetic layer 242P and the magnetic layer 241P are polished by CMP, for example, until the polishing stopper layer 22 is exposed. As a result, portions of the magnetic layers 241P and 242P disposed on the top surface of the polishing stopper layer 22 are removed and the top surfaces of the polishing stopper layer 22, the magnetic layer 241P and the magnetic layer 242P are flattened. If the coating layer 26, the magnetic layer 242P and the magnetic layer 241P are polished by CMP, such a slurry is used that polishing is stopped when the polishing stopper layer 22 is exposed, such as an alumina-base slurry. If the coating layer 26, the magnetic layer 242P and the magnetic layer 241P are polished by CMP using an alumina-base slurry, the material of the polishing stopper layer 22 is preferably Ta or Ru.

Figure 22:
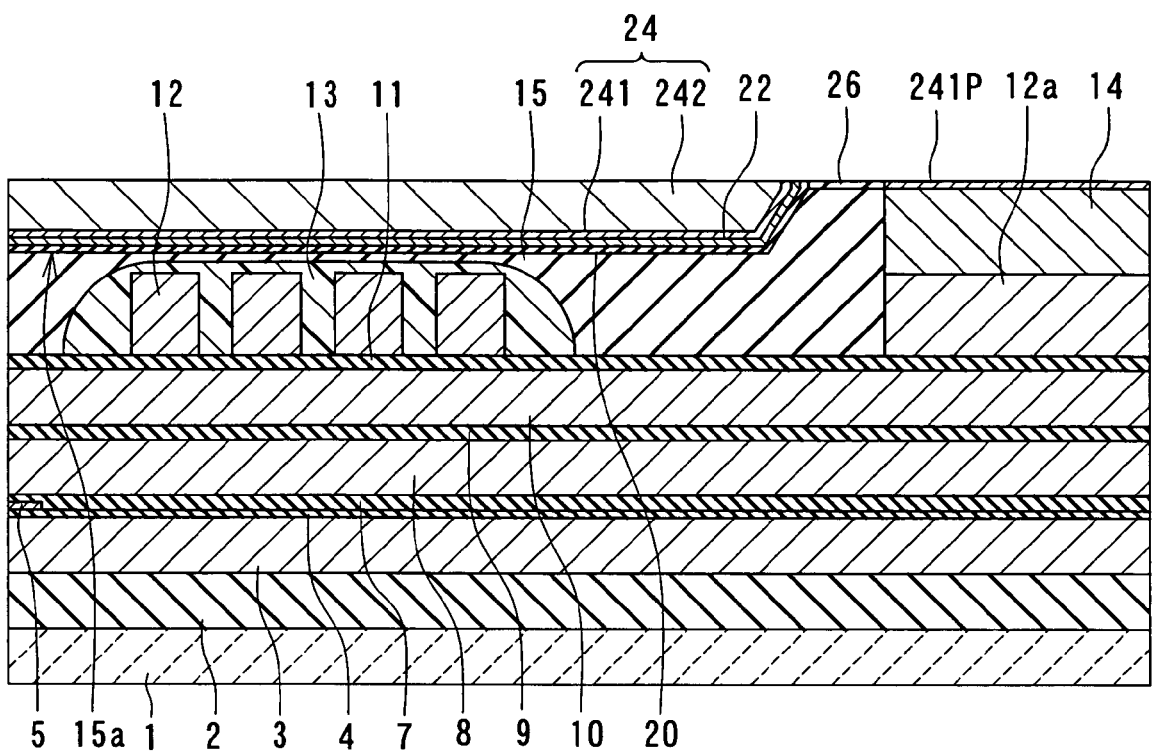
FIG. 22 is a cross-sectional view of the layered structure obtained in a step that follows the step shown in FIG. 20.
Figure 23:
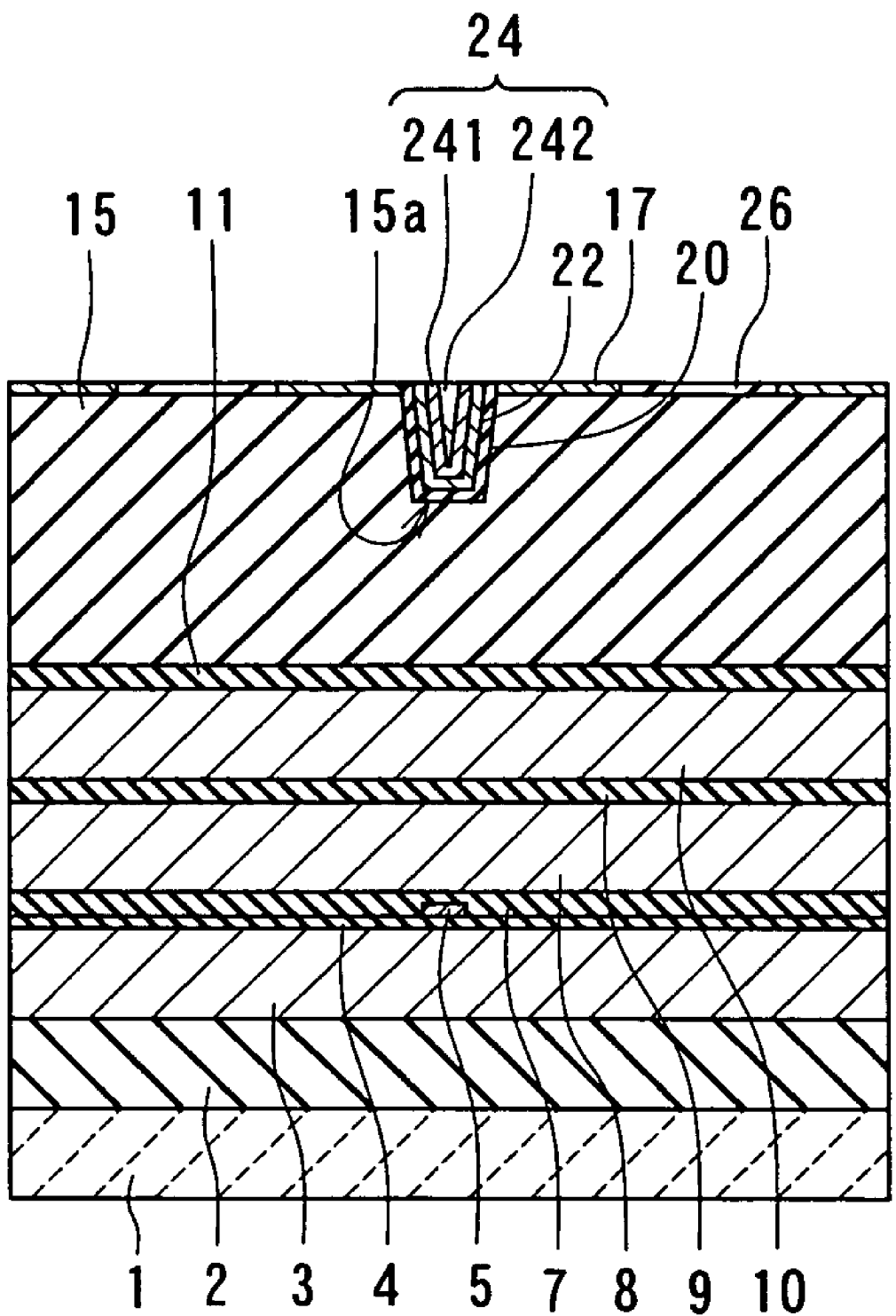
FIG. 23 is another cross-sectional view of the layered structure shown in FIG. 22.

FIG. 22 and FIG. 23 illustrate the following step. In the step, at least portions of the top surfaces of the first and second magnetic layers 241P and 242P that are located near the medium facing surface are etched by ion beam etching, sputter etching or reactive ion etching. Through this step, the first and second magnetic layers 241P and 242P are formed into the first layer 241 and the second layer 242, respectively, and the pole layer 24 is thereby formed. In this step, the polishing stopper layer 22, the nonmagnetic film 20 and the coating layer 26 are etched, together with the at least portions of the top surfaces of the first and second magnetic layers 241P and 242P, so that at least portions of the polishing stopper layer 22 and the nonmagnetic film 20 that are located on the nonmagnetic metal layer 17 are removed. In this step, the etching may be further continued from the state in which the top surface of the nonmagnetic metal layer 17 is exposed, so as to etch at least a portion of the nonmagnetic metal layer 17 and at least a portion of the coating layer 26, together with the at least portions of the top surfaces of the first and second magnetic layers 241P and 242P. Through this step, at least portions of the top surfaces of the nonmagnetic metal layer 17, the nonmagnetic film 20, the polishing stopper layer 22, the first layer 241 and the second layer 242 that are located near the medium facing surface are flattened, and the thickness of the pole layer 24 taken in the medium facing surface is adjusted. It is possible in this step to control the thickness of the pole layer 24 with precision by etching using ion beam etching, in particular.

In this step, at least portions of the top surfaces of the magnetic layers 241P and 242P are etched so that the top surface of the pole layer 24 is located in the medium facing surface at a height that falls within a range between the height at which the top surface of the nonmagnetic metal layer 17 as initially formed is located and the height at which the bottom surface thereof is located. Therefore, the nonmagnetic metal layer 17 and the coating layer 26 may be etched together with the at least portions of the top surfaces of the magnetic layers 241P and 242P until the nonmagnetic metal layer 17 and the coating layer 26 are completely removed and the top surface of the encasing layer 15 is exposed. In this case, the second portion 42 that appears in the end face of the pole layer 24 located in the medium facing surface coincides with the second side A2 of the first portion 41. Furthermore, in this step, the at least portions of the top surfaces of the magnetic layers 241P and 242P are etched so that the top surface of the pole layer 24 is located in the medium facing surface at a height that falls within a range between the height at which the top surface of the nonmagnetic metal layer 17 is located and the height at which the bottom surface thereof is located after this step is completed. It suffices that, after this step is completed, the top surface of the pole layer 24 is located at a height that falls within the range between the height at which the top surface of the nonmagnetic metal layer 17 is located and the height at which the bottom surface thereof is located. As long as this condition is satisfied, the top surface of the pole layer 24 may be located at a height lower than the height at which the top surface of the nonmagnetic metal layer 17 is located.

Figure 24:
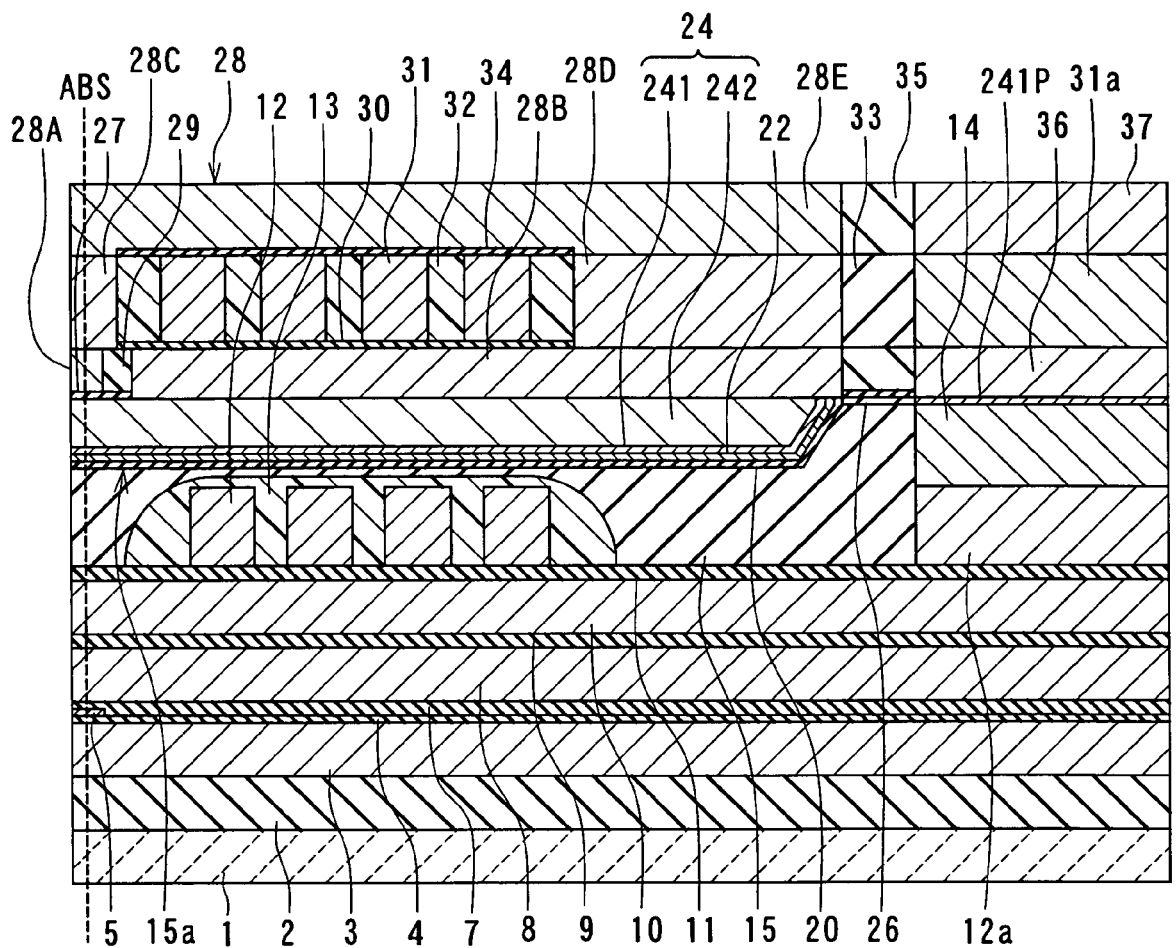
FIG. 24 is a cross-sectional view of the layered structure obtained in a step that follows the step shown in FIG. 22.
Figure 25:
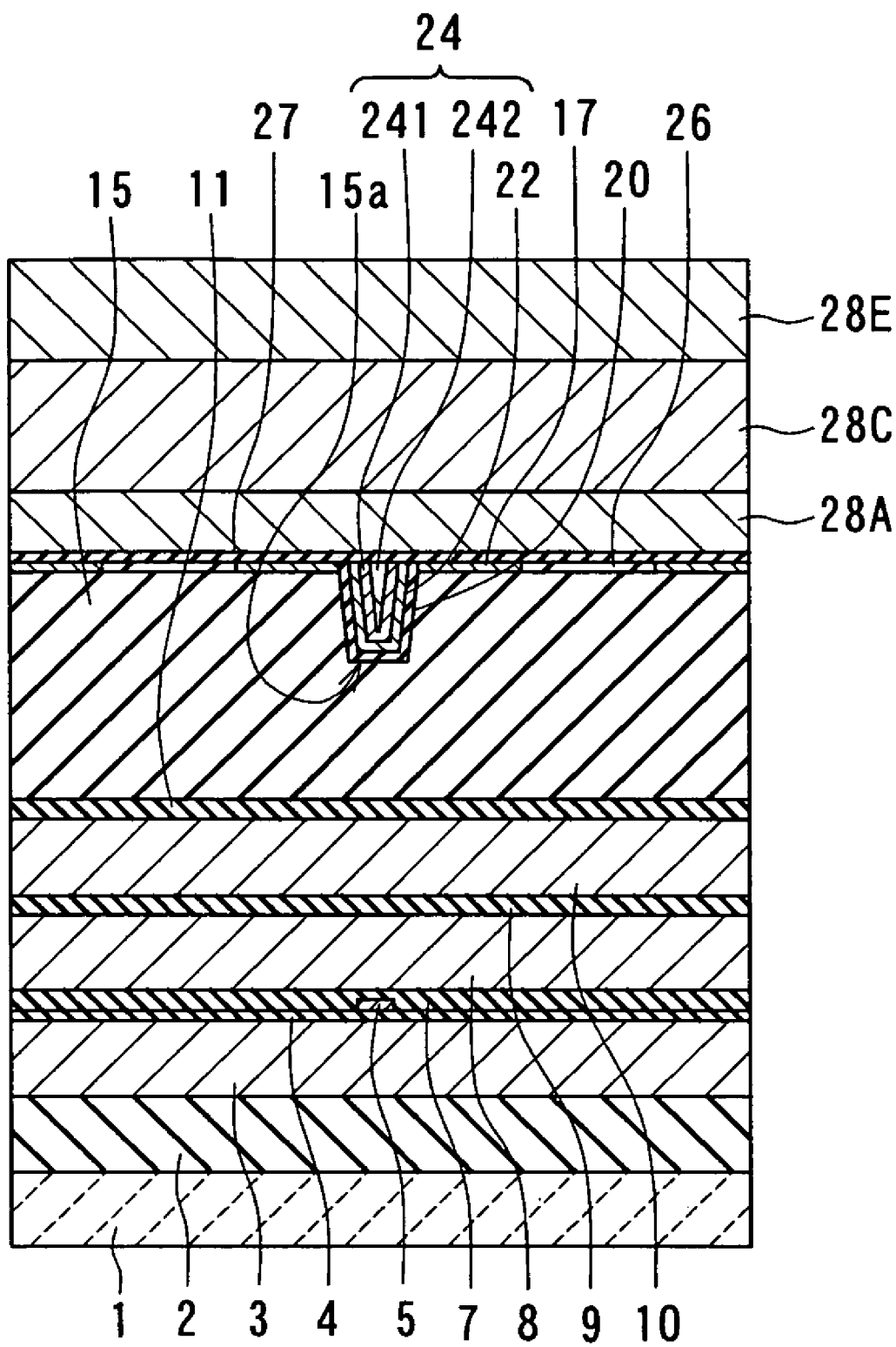
FIG. 25 is another cross-sectional view of the layered structure shown in FIG. 24.

FIG. 24 and FIG. 25 illustrate the following step. In the step, first, the gap layer 27 is formed on the entire top surface of the layered structure. Next, the gap layer 27 is selectively etched to form openings in regions of the gap layer 27 in which the yoke layer 28B and the coupling layer 36 are to be formed. Next, the first layer 28A is formed on the gap layer 27, and the yoke layer 28B and the coupling layer 36 are formed in the regions where the respective openings of the gap layer 27 are formed.

Next, the nonmagnetic layer 29 is formed on the entire top surface of the layered structure. Next, the nonmagnetic layer 29 is polished by CMP, for example, so that the first layer 28A, the yoke layer 28B and the coupling layer 36 are exposed, and the top surfaces of the first layer 28A, the yoke layer 28B, the coupling layer 36 and the nonmagnetic layer 29 are flattened.

Next, the insulating layer 30 having a thickness that falls within a range of 0.2 to 0.3 μm inclusive, for example, is formed by a method such as sputtering on the entire top surface of the layered structure. Next, the insulating layer 30 is selectively etched to form openings in regions of the insulating layer 30 in which the connecting portion 31a of the coil 31, the second layer 28C and the coupling layer 28D are to be formed. Next, the coil 31 is formed by frame plating, for example. The connecting portion 31a of the coil 31 is formed on the coupling layer 36 while the remainder of the coil 31 is formed on the insulating layer 30. Next, the second layer 28C and the coupling layer 28D are formed by frame plating, for example. Alternatively, the coil 31 may be formed after the second layer 28C and the coupling layer 28D are formed.

Next, the insulating layer 32 made of photoresist, for example, is selectively formed in the space between the respective adjacent turns of the coil 31 and around the coil 31. Next, the insulating layer 33 having a thickness of 4 to 4.5 μm, for example, is formed on the entire top surface of the layered structure. Next, the insulating layer 33 is polished by CMP, for example, so that the second layer 28C, the coupling layer 28D and the coil 31 are exposed, and the top surfaces of the second layer 28C, the coupling layer 28D, the coil 31, and the insulating layers 32 and 33 are thereby flattened. Next, the insulating layer 34 is formed on the coil 31 and the insulating layer 32.

Next, the third layer 28E and the coupling layer 37 are formed by frame plating, for example. Next, the insulating layer 35 is formed to cover the entire top surface of the layered structure. The insulating layer 35 is then polished by CMP, for example, so that the third layer 28E and the coupling layer 37 are exposed, and the top surfaces of the third layer 28E, the coupling layer 37 and the insulating layer 35 are thereby flattened. Next, a protection layer not shown is formed on the entire top surface of the layered structure. Next, two terminals connected to the MR element 5 and two terminals connected to the coils 12 and 31 are formed on the protection layer. Next, the layered structure is divided into sliders, and steps such as polishing of the medium facing surface 40 and fabrication of the flying rails are performed to complete the magnetic head. In FIG. 24, the broken line indicated with ABS shows the position in which the medium facing surface 40 is formed.

According to the method of manufacturing the magnetic head of the embodiment, the magnetic layers 241P and 242P to be the pole layer 24 are formed such that the groove 15a of the encasing layer 15 and the opening 17a of the nonmagnetic metal layer 17 are filled with the magnetic layers 241P and 242P and that the top surfaces of the magnetic layers 241P and 242P are located higher than the top surface of the nonmagnetic metal layer 17. The magnetic layers 241P and 242P are formed into the pole layer 24 by etching at least portions of the top surfaces of the magnetic layers 241P and 242P. According to the embodiment, it is possible to easily form the groove 15a of the encasing layer 15 and the opening 17a of the nonmagnetic metal layer 17 as described above.

According to the embodiment, in the step of etching the at least portions of the top surfaces of the magnetic layers 241P and 242P, etching is performed so that, in the medium facing surface 40 the top surface of the pole layer 24 is located at a height that falls within a range between the height at which the top surface of the nonmagnetic metal layer 17 as initially formed is located and the height at which the bottom surface thereof is located. In this step, at least a portion of the nonmagnetic metal layer 17 may be etched together with the at least portions of the top surfaces of the magnetic layers 241P and 242P. Furthermore, etching may be performed in the step so that, in the medium facing surface 40, the top surface of the pole layer 24 is located at a height that falls within a range between the height at which the top surface of the nonmagnetic metal layer 17 is located and the height at which the bottom surface thereof is located after this step is completed.

According to the embodiment, the width of the top surface of the pole layer 24 is uniform and equal to the width of the second portion 42, regardless of the height at which the top surface of the pole layer 24 is located in the medium facing surface 40 within the range between the height at which the top surface of the nonmagnetic metal layer 17 as initially formed is located and the height at which the bottom surface thereof is located. As a result, it is possible to control the track width with precision. Furthermore, the etching rate of the magnetic layers 241P and 242P made of a magnetic metal material and that of the nonmagnetic metal layer 17 made of a nonmagnetic metal material are nearly equal. As a result, according to the embodiment, it is possible to etch the top surfaces of the magnetic layers 241P and 242P (the pole layer 24) and the metal layer 17 with precision. It is thereby possible to control the thickness of the pole layer 24 with precision. The foregoing features of the embodiment make it possible to form the pole layer 24 having a desired shape with accuracy.

According to the embodiment, it is possible to obtain the track width by measuring the width of the opening 17a of the nonmagnetic metal layer 17 in the course of the manufacturing process of the magnetic head. It is thereby possible to improve the efficiency in manufacturing the magnetic head.

According to the embodiment, the side portions of the pole layer 24 are not etched. As a result, it is impossible that the neck height NH is made greater than a desired value and/or the pole layer 24 goes out of a desired shape. It is therefore possible to improve the overwrite property.

Figure 26:
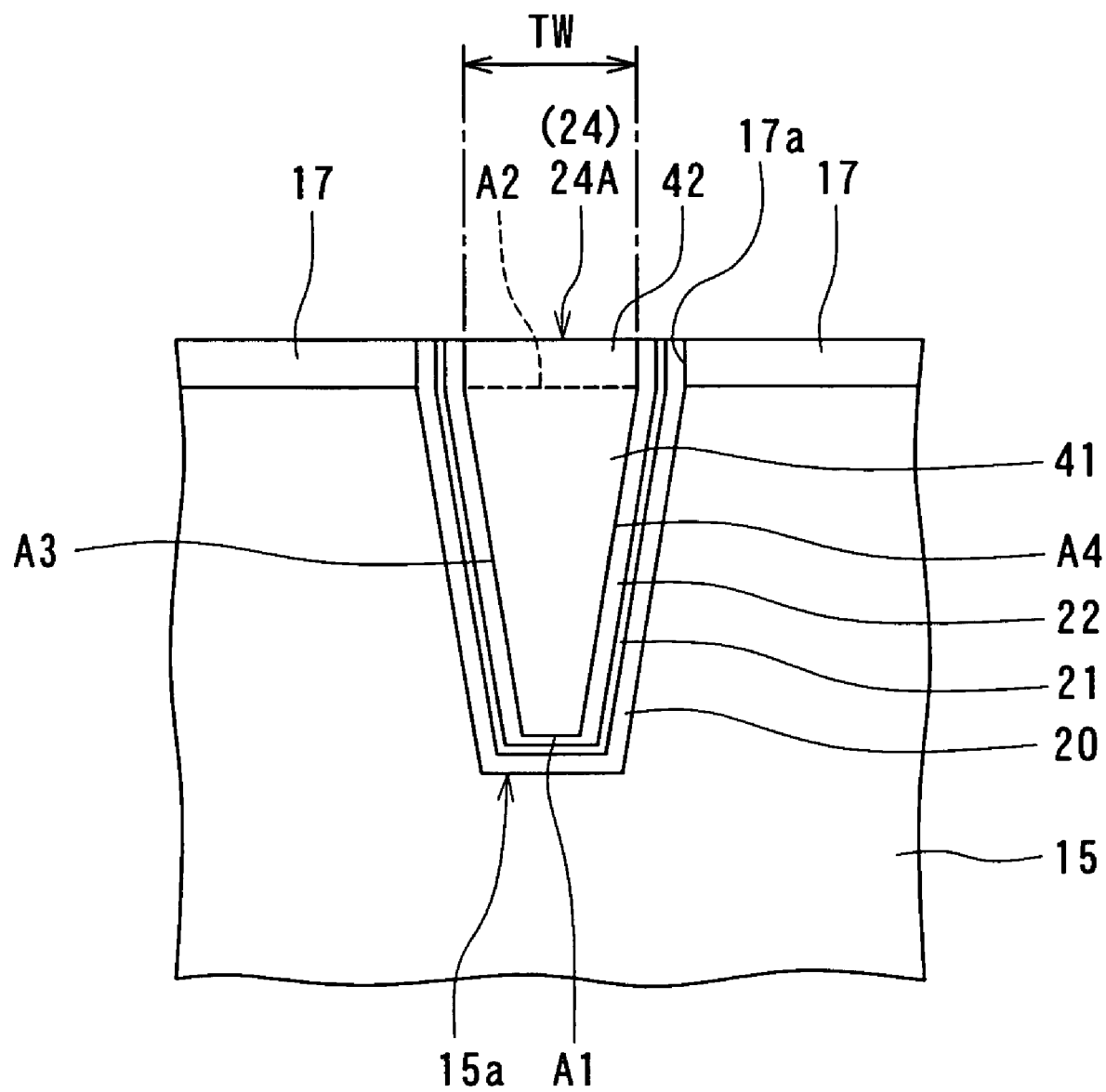
FIG. 26 is a front view of a pole layer and a neighborhood thereof in the medium facing surface of a magnetic head of a first modification example of the first embodiment of the invention.
Figure 27:
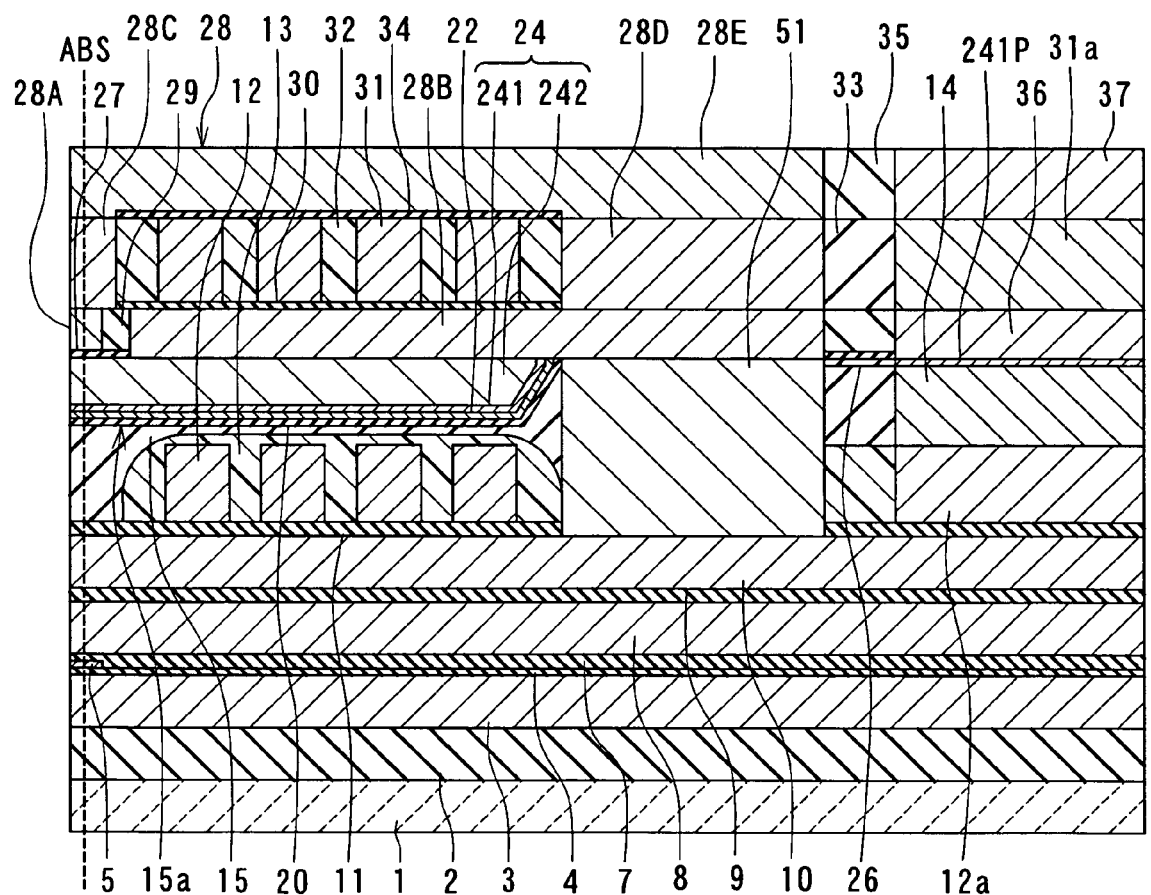
FIG. 27 is a cross-sectional view of a layered structure for illustrating a second modification example of the first embodiment of the invention.
Figure 28:
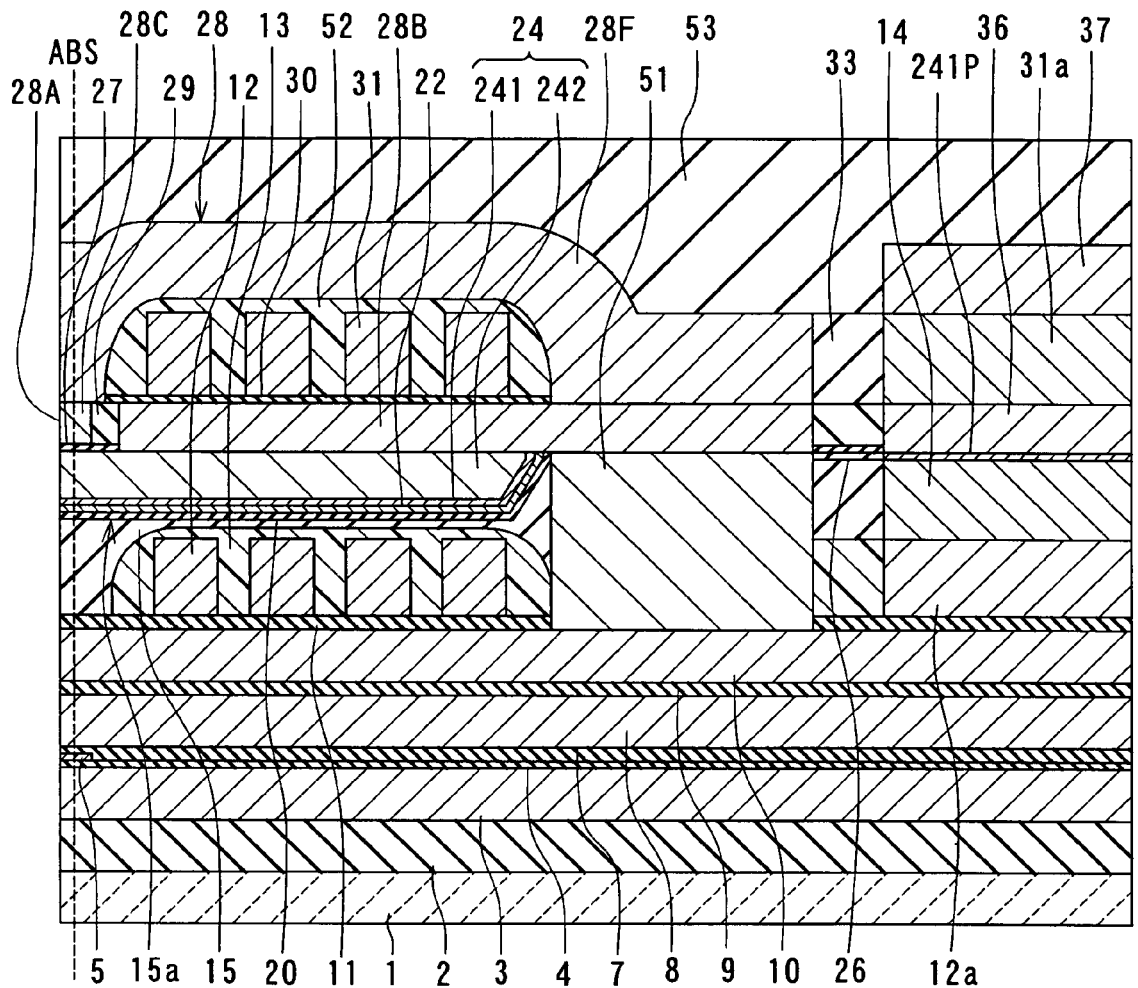
FIG. 28 is a cross-sectional view of a layered structure for illustrating a third modification example of the first embodiment of the invention.

First to third modification examples of the embodiment will now be described. FIG. 26 is a front view illustrating a pole layer and a neighborhood thereof in the medium facing surface of a magnetic head of the first modification example. FIG. 27 is a cross-sectional view of a layered structure obtained in the course of manufacturing process of a magnetic head of the second modification example. FIG. 28 is a cross-sectional view of a layered structure obtained in the course of manufacturing process of a magnetic head of the third modification example. FIG. 27 and FIG. 28 each illustrate the cross section orthogonal to the medium facing surface and a surface of the substrate.

The magnetic head of the first modification example shown in FIG. 26 comprises a joining film 21 that is disposed between the nonmagnetic film 20 and the polishing stopper layer 22 in the groove 15a of the encasing layer 15 and in the opening 17a of the nonmagnetic metal layer 17 and that joins the nonmagnetic film 20 and the polishing stopper layer 22 to each other. The polishing stopper layer 22 corresponds to the seed layer of the invention. A method of manufacturing the magnetic head of the first modification example comprises the step of forming the joining film 21 after the step of forming the nonmagnetic film 20 and before the step of forming the polishing stopper layer 22. The joining film 21 has a thickness of about 5 nm, for example. In the first modification example, the nonmagnetic film 20 is an alumina film formed by ALCVD, for example. The polishing stopper layer 22 is made of Ru or NiPd, for example. The joining film 21 includes Ta, Ti or W, for example. According to the first modification example, it is possible to prevent the polishing stopper layer 22 from being removed from the nonmagnetic film 20. The remainder of configuration, function and effects of the magnetic head of the first modification example are the same as those of the magnetic head shown in FIG. 1 to FIG. 5.

The magnetic head of the second modification example shown in FIG. 27 comprises a coupling layer 51 for magnetically coupling the second top shield layer 10 to the yoke layer 28B of the shield layer 28. In the second modification example, an opening is formed in the insulating layer 11 and the coupling layer 51 is disposed on the second top shield layer 10 in the region in which the opening is formed. A portion of the yoke layer 28B is in contact with the top surface of the coupling layer 51. The remainder of configuration, function and effects of the magnetic head of the second modification example are the same as those of the magnetic head shown in FIG. 1 to FIG. 5.

The magnetic head of the third modification example shown in FIG. 28 comprises an insulating layer 52 covering at least part of the coil 31 in place of the insulating layers 32 and 34 of FIG. 3. The shield layer 28 of the third modification example comprises a second layer 28F in place of the second layer 28C, the coupling layer 28D and the third layer 28E of FIG. 3. The second layer 28F has an end located in the medium facing surface 40, and is disposed to couple the first layer 28A to the yoke layer 28B. The second layer 28F includes a portion located on a side of the at least part of the coil 31 covered with the insulating layer 52, the side being opposite to the pole layer 24. The second layer 28F includes a portion located between the medium facing surface 40 and the coil 31. In this portion the distance between the end located in the medium facing surface 40 and the other end increases as the distance from the first layer 28A increases. The second layer 28F is made of CoNiFe or NiFe, for example. The magnetic head of the third modification example comprises a protection layer 53 for covering the shield layer 28 and the coupling layer 37. The remainder of configuration, function and effects of the magnetic head of the third modification example are the same as those of the second modification example.

Second Embodiment

Figure 29:
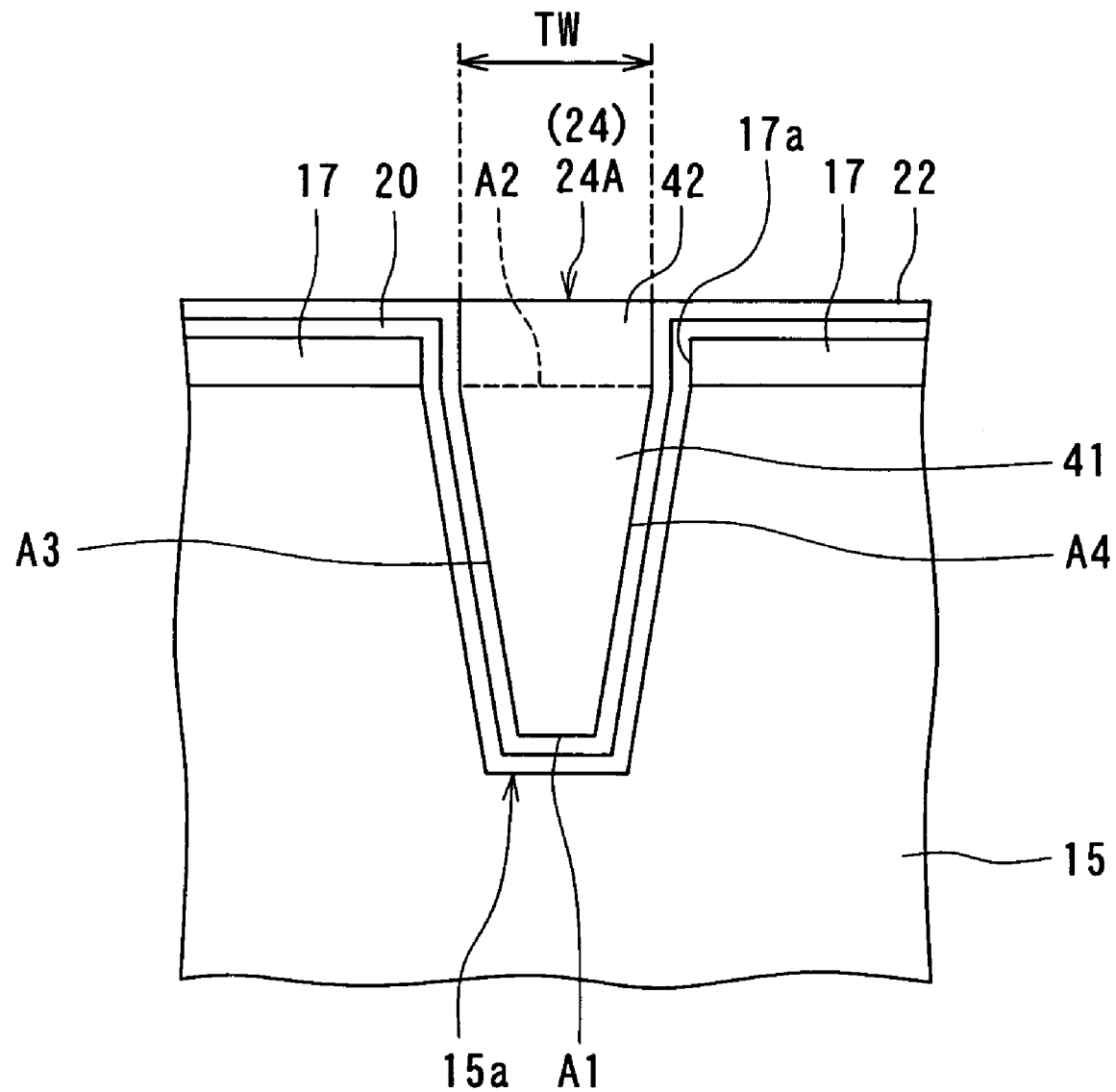
FIG. 29 is a front view of a pole layer and a neighborhood thereof in the medium facing surface of a magnetic head of a second embodiment of the invention.
Figure 30:
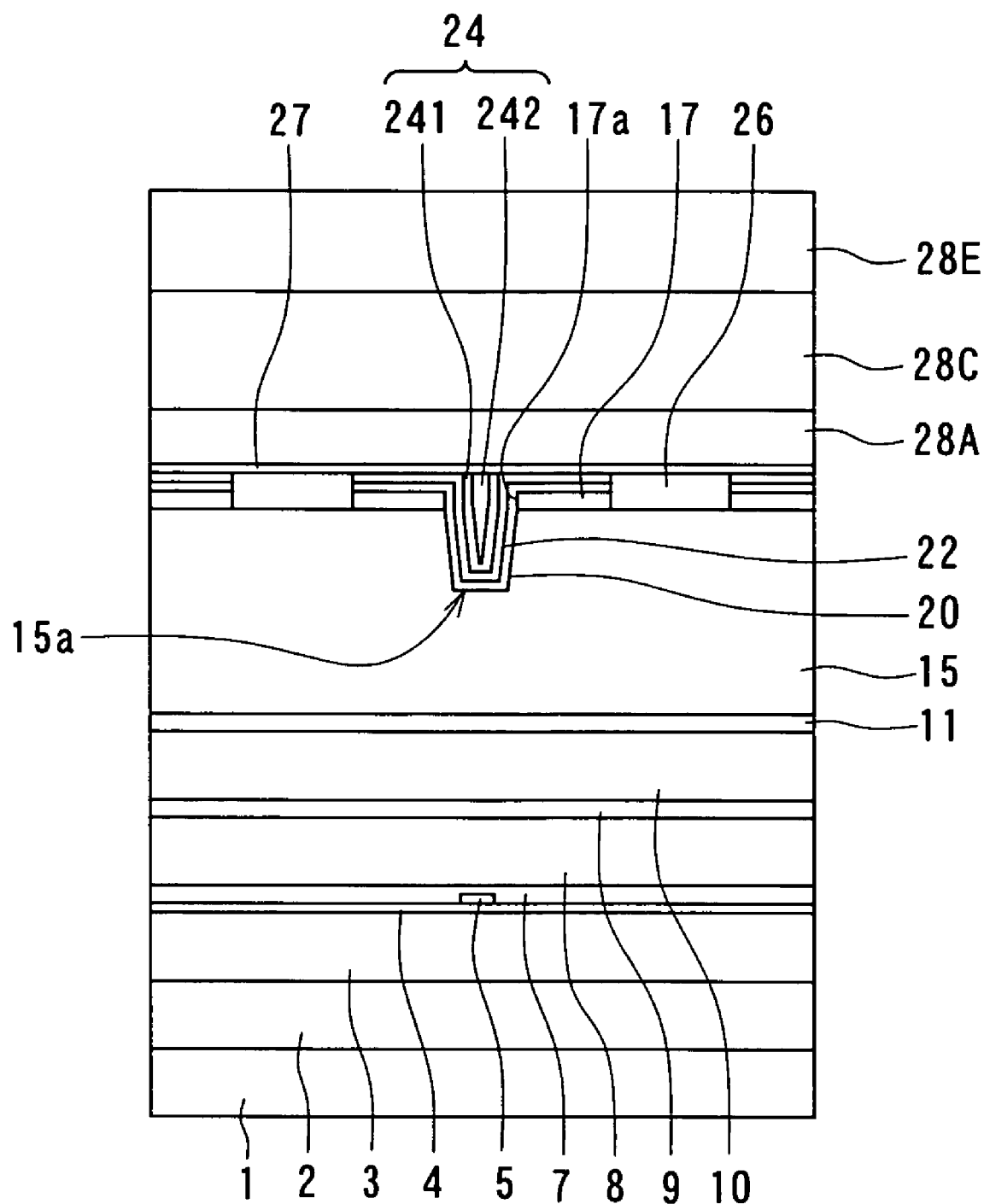
FIG. 30 is a front view of the medium facing surface of the magnetic head of the second embodiment of the invention.
Figure 31:
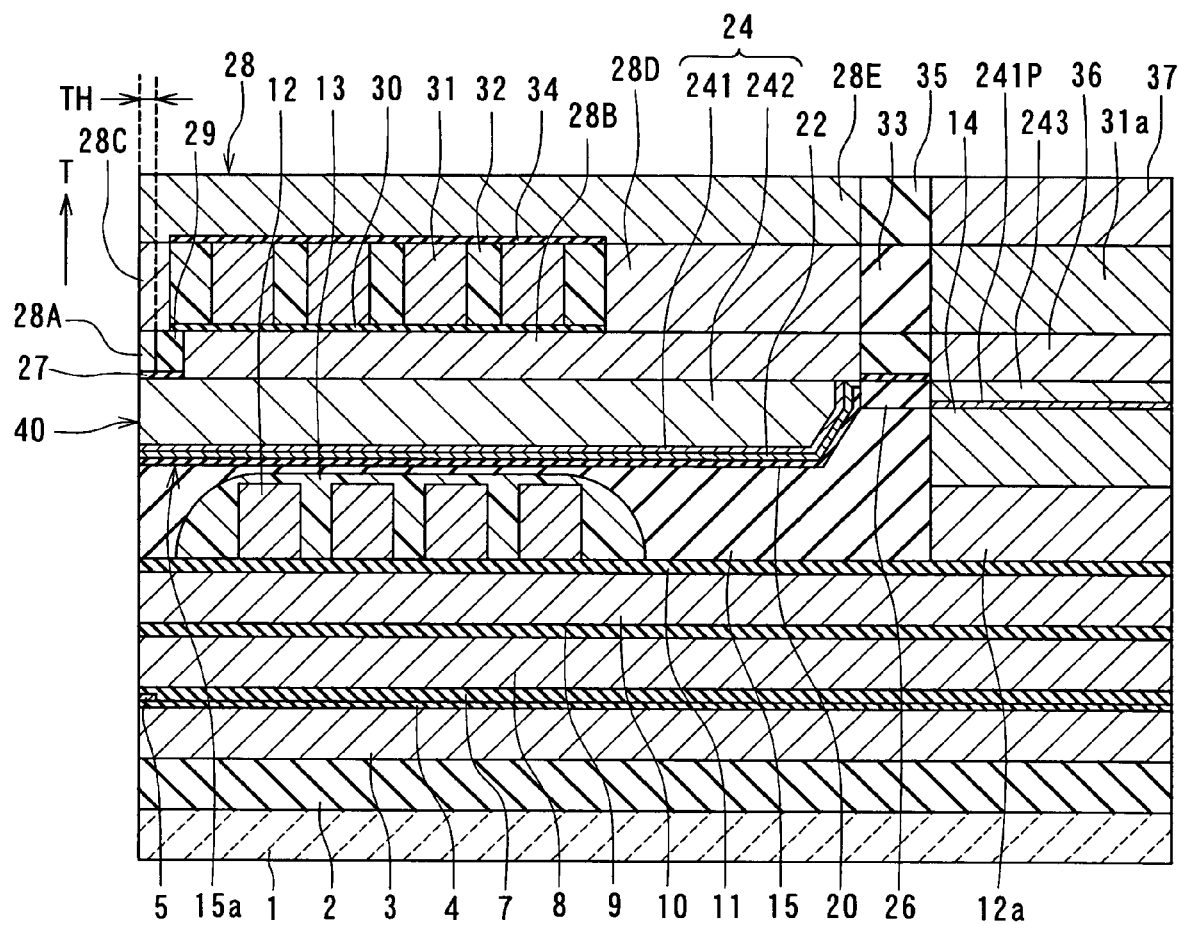
FIG. 31 is a cross-sectional view for illustrating the configuration of the magnetic head of the second embodiment of the invention.

Reference is now made to FIG. 29 to FIG. 31 to describe a magnetic head and a method of manufacturing the same of a second embodiment of the invention. FIG. 29 is a front view of a pole layer and a neighborhood thereof in a medium facing surface of the magnetic head of the second embodiment. FIG. 30 is a front view of the medium facing surface of the magnetic head of the embodiment. FIG. 31 is a cross-sectional view for illustrating the configuration of the magnetic head of the embodiment. FIG. 31 illustrates the cross section orthogonal to the medium facing surface and a surface of the substrate.

In the magnetic head of the second embodiment, the nonmagnetic film 20 has a portion located above the top surface of the nonmagnetic metal layer 17. The polishing stopper layer 22 has a portion that is located above the top surface of the nonmagnetic metal layer 17 and that is located on the nonmagnetic film 20. In the medium facing surface 40, the top surfaces of the polishing stopper layer 22 and the pole layer 24 are located at the same height. The gap layer 27 is disposed on the top surfaces of the polishing stopper layer 22 and the pole layer 24.

In the method of manufacturing the magnetic head of the second embodiment, the step of etching at least portions of the top surfaces of the magnetic layers 241P and 242P is performed such that a portion of the polishing stopper layer 22 is etched together with the at least portions of the top surfaces of the magnetic layers 241P and 242P. In addition, in the step of etching the at least portions of the top surfaces of the magnetic layers 241P and 242P, etching is performed so that, in the medium facing surface 40, the top surfaces of the polishing stopper layer 22 and the pole layer 24 are located at the same height.

The polishing stopper layer 22 of the second embodiment corresponds to each of the nonmagnetic film and the seed layer of the invention. The polishing stopper layer 22 of the second embodiment is made of a nonmagnetic metal material, as is the nonmagnetic metal layer 17.

According to the second embodiment, as in the first embodiment, it is easy to form the groove 15a of the encasing layer 15 and the opening 17a of the nonmagnetic metal layer 17. In the second embodiment, the width of the top surface of the pole layer 24 is uniform and equal to the width of the second portion 42, regardless of the height at which the top surface of the pole layer 24 is located in the medium facing surface 40 within the range between the height at which the top surface of a portion of the polishing stopper layer 22 as initially formed is located and the height at which the bottom surface thereof is located, the portion being located above the top surface of the nonmagnetic metal layer 17. As a result, it is possible to control the track width with precision. Furthermore, the etching rate of the magnetic layers 241P and 242P made of a magnetic metal material and that of the polishing stopper layer 22 made of a nonmagnetic metal material are nearly equal. As a result, according to the embodiment, it is possible to etch the top surfaces of the pole layer 24 and the polishing stopper layer 22 with precision. In addition, it is easy to flatten the top surfaces of the pole layer 24 and the polishing stopper layer 22 by etching. It is thereby possible to control the thickness of the pole layer 24 with precision. The foregoing features of the embodiment make it possible to form the pole layer 24 having a desired shape with accuracy.

The remainder of configuration, function and effects of the second embodiment are similar to those of the first embodiment including the modification examples.

Third Embodiment

Figure 32:
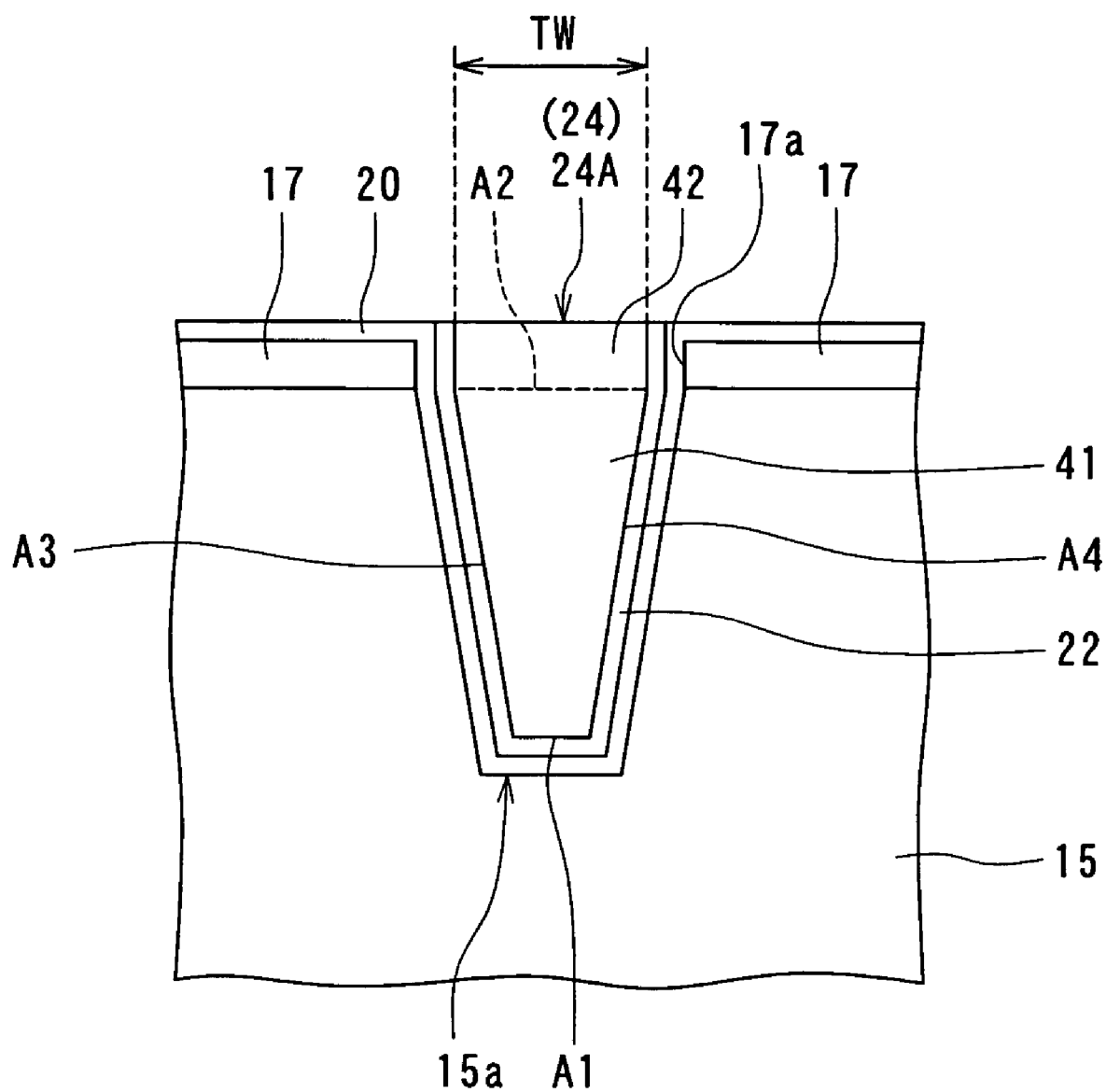
FIG. 32 is a front view of a pole layer and a neighborhood thereof in the medium facing surface of a magnetic head of a third embodiment of the invention.
Figure 33:
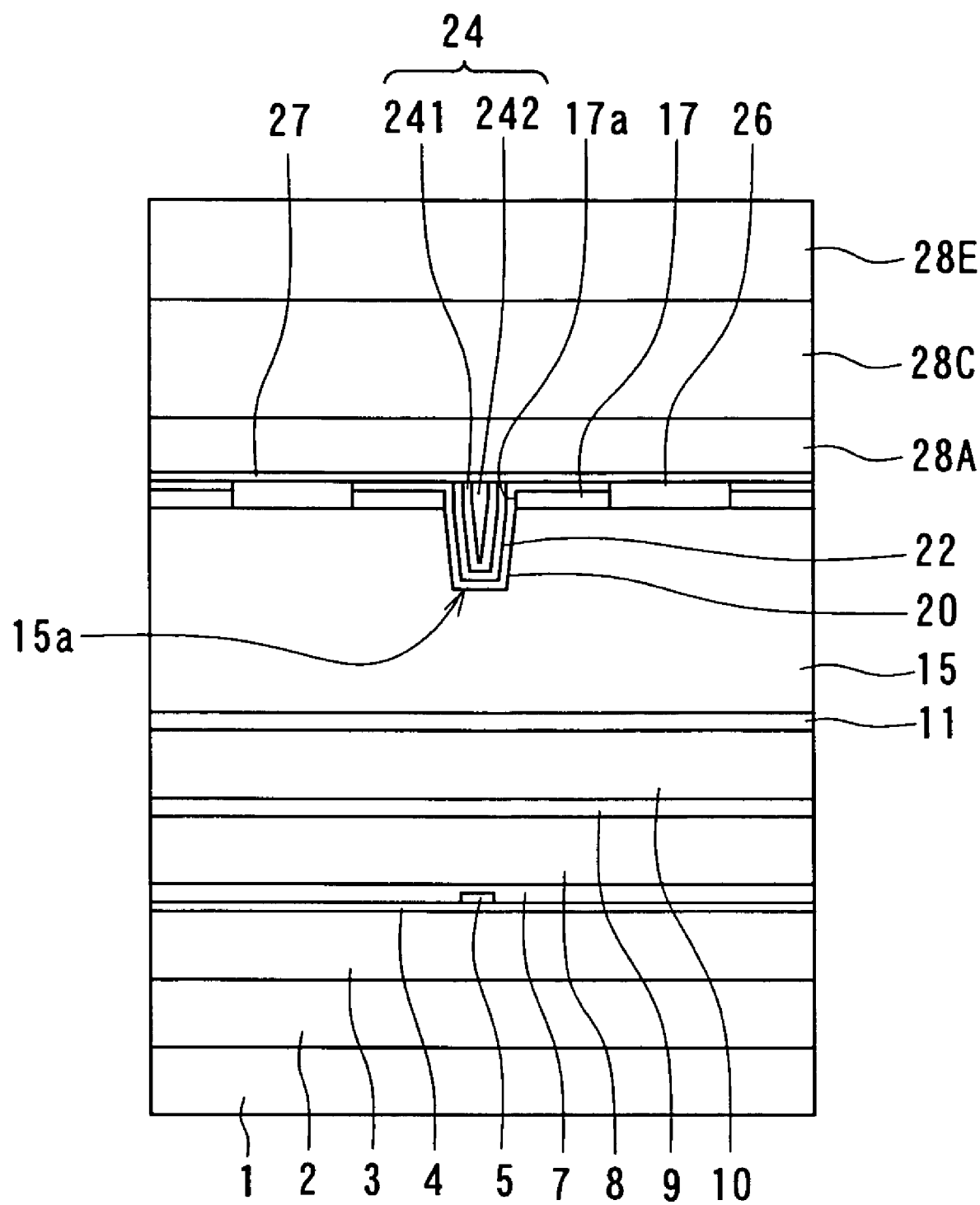
FIG. 33 is a front view of the medium facing surface of the magnetic head of the third embodiment of the invention.
Figure 34:
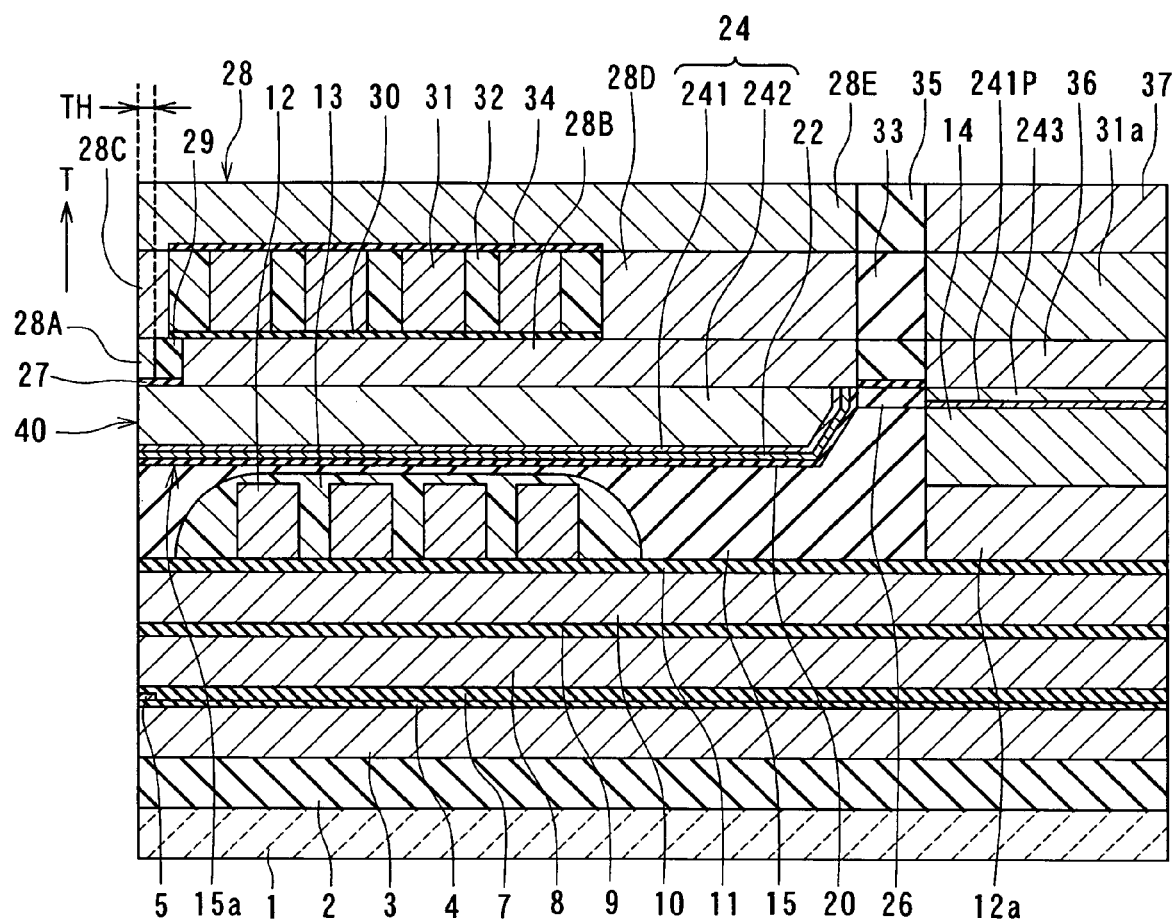
FIG. 34 is a cross-sectional view for illustrating the configuration of the magnetic head of the third embodiment of the invention.

Reference is now made to FIG. 32 to FIG. 34 to describe a magnetic head and a method of manufacturing the same of a third embodiment of the invention. FIG. 32 is a front view of a pole layer and a neighborhood thereof in a medium facing surface of the magnetic head of the third embodiment. FIG. 33 is a front view of the medium facing surface of the magnetic head of the embodiment. FIG. 34 is a cross-sectional view for illustrating the configuration of the magnetic head of the embodiment. FIG. 34 illustrates the cross section orthogonal to the medium facing surface and a surface of the substrate.

In the magnetic head of the third embodiment, the nonmagnetic film 20 has a portion located above the top surface of the nonmagnetic metal layer 17. In the medium facing surface 40, the top surfaces of the nonmagnetic film 20 and the pole layer 24 are located at the same height. The gap layer 27 is disposed on the top surfaces of the nonmagnetic film 20 and the pole layer 24.

In the method of manufacturing the magnetic head of the third embodiment, the step of etching at least portions of the top surfaces of the magnetic layers 241P and 242P is performed such that a portion of the polishing stopper layer 22 is etched together with the at least portions of the top surfaces of the magnetic layers 241P and 242P until the nonmagnetic film 20 is exposed. In addition, in the step of etching the at least portions of the top surfaces of the magnetic layers 241P and 242P, etching is performed so that, in the medium facing surface 40, the top surfaces of the nonmagnetic film 20 and the pole layer 24 are located at the same height. After the nonmagnetic film 20 is exposed, a portion of the nonmagnetic film 20 may be further etched together with the at least portions of the top surfaces of the magnetic layers 241P and 242P. In this case, the top surface of the pole layer 24 may be located at a height lower than the height at which the top surface of the nonmagnetic film 20 is located.

The remainder of configuration, function and effects of the third embodiment are similar to those of the second embodiment.

Fourth Embodiment

Reference is now made to FIG. 35 to FIG. 39 to describe a magnetic head and a method of manufacturing the same of a fourth embodiment of the invention. FIG. 35 to FIG. 39 are cross-sectional views of layered structures obtained in the manufacturing process of the magnetic head of the fourth embodiment. FIG. 35 to FIG. 39 each illustrate the cross section taken in the position in which the medium facing surface is to be formed.

Figure 35:
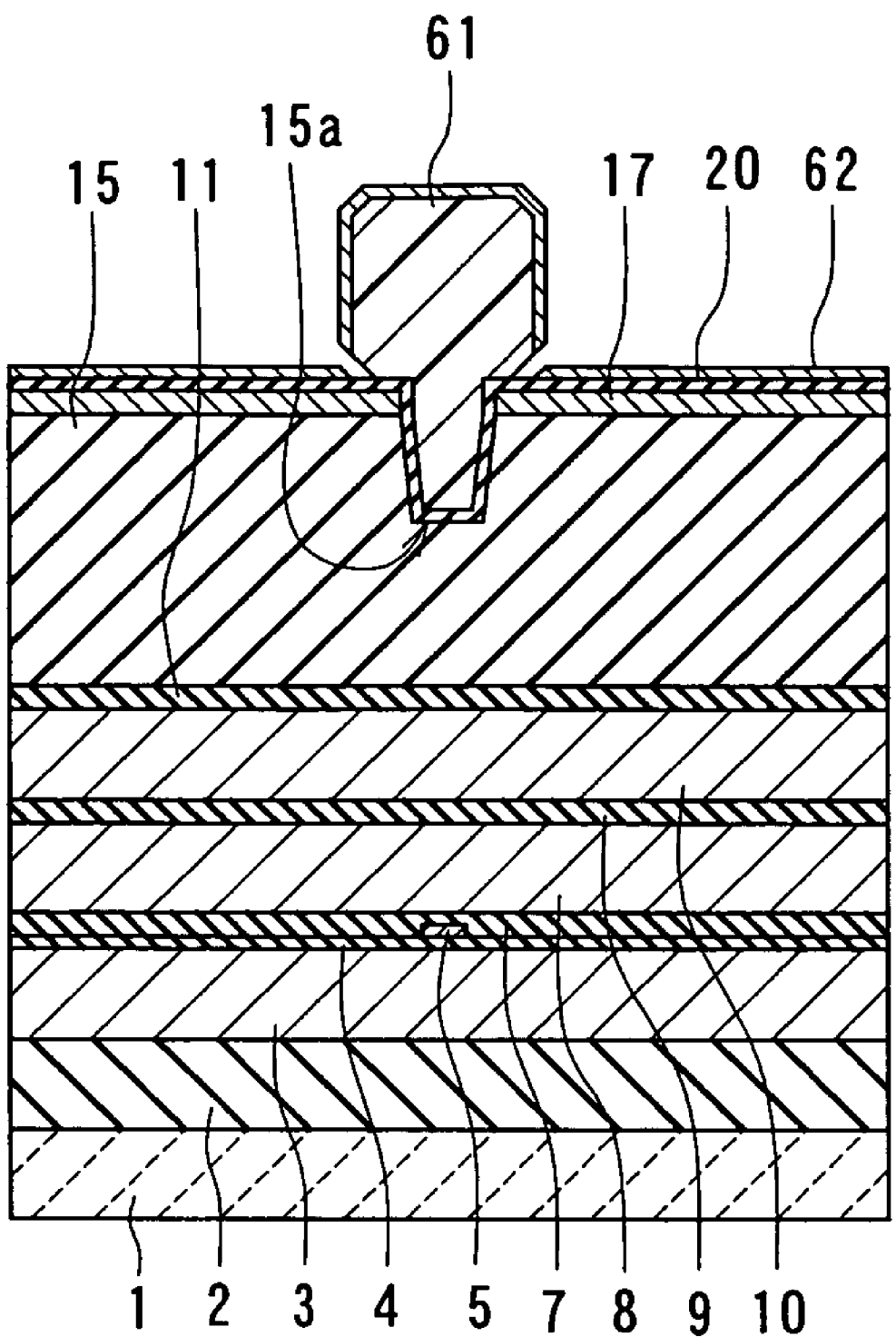
FIG. 35 is a cross-sectional view of a layered structure obtained in a step of a method of manufacturing a magnetic head of a fourth embodiment of the invention.

The method of manufacturing the magnetic head of the fourth embodiment includes the steps up to the step of forming the nonmagnetic film 20 that are the same as those of the first embodiment. FIG. 35 illustrates the following step. In the step, first, a photoresist layer is formed on the nonmagnetic film 20. The photoresist layer is then patterned to form a mask 61. The mask 61 is located in a region including the groove 15a and a region around the groove 15a. Next, a polishing stopper layer 62 is formed by sputtering, for example, on the entire top surface of the layered structure. The polishing stopper layer 62 indicates the level at which polishing is stopped in the step of polishing the magnetic layer that will be performed later. The thickness of the polishing stopper layer 62 falls within the range of 40 to 70 nm inclusive, for example. The polishing stopper layer 62 may be made of a material the same as that of the polishing stopper layer 22 of the first embodiment. Next, the mask 61 is lifted off. As a result, the polishing stopper layer 62 is located in a region other than the region including the groove 15a and the region around the groove 15a.

Figure 36:
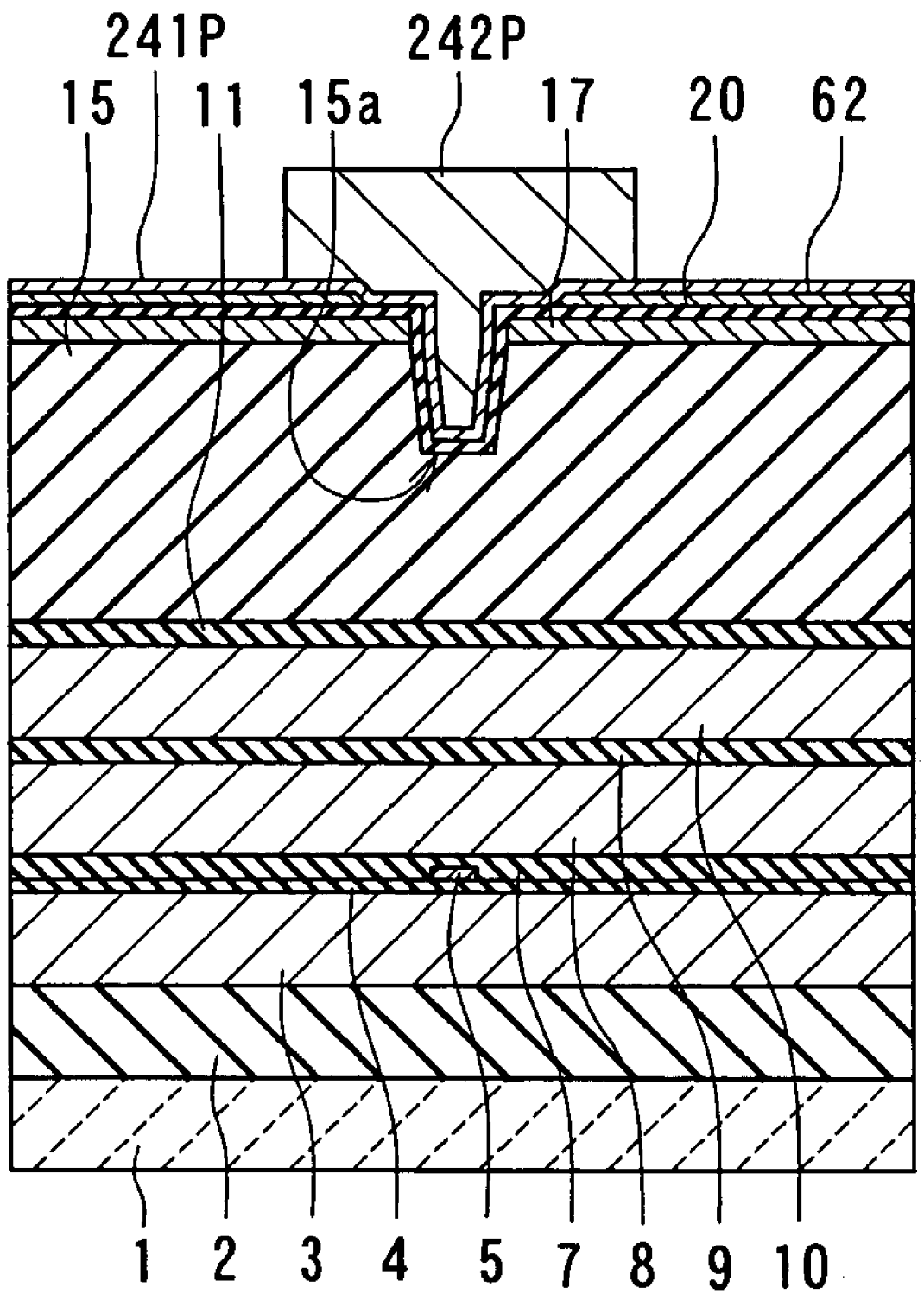
FIG. 36 is a cross-sectional view of the layered structure obtained in a step that follows the step shown in FIG. 35.

FIG. 36 illustrates the following step. In the step, first, the magnetic layer 241P is formed on the entire top surface of the layered structure. Next, the magnetic layer 242P is formed by frame plating on the magnetic layer 241P. In this case, the magnetic layer 241P is used as an electrode for plating. In the manner thus described, the magnetic layers 241P and 242P to be the pole layer 24 are formed such that the groove 15a is filled with the magnetic layers 241P and 242P and that the top surfaces of the magnetic layers 241P and 242P are located higher than the top surface of the polishing stopper layer 62.

Figure 37:
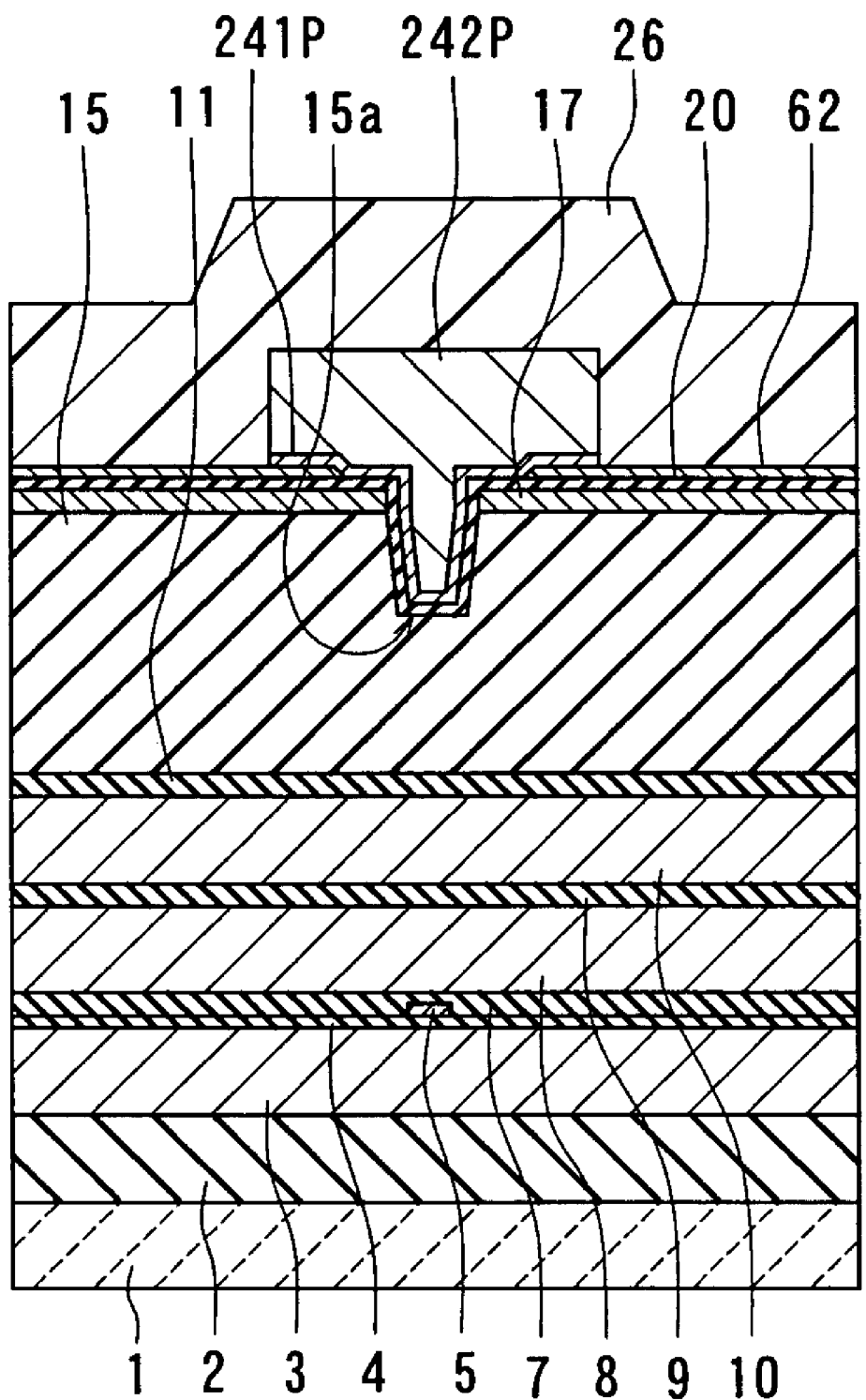
FIG. 37 is a cross-sectional view of the layered structure obtained in a step that follows the step shown in FIG. 36.

FIG. 37 illustrates the following step. In the step, first, the magnetic layer 241P except a portion below the magnetic layer 242P is removed by ion beam etching, for example. Next, the coating layer 26 made of alumina, for example, and having a thickness of 1.0 to 1.5 µm, for example, is formed on the entire top surface of the layered structure.

Figure 38:
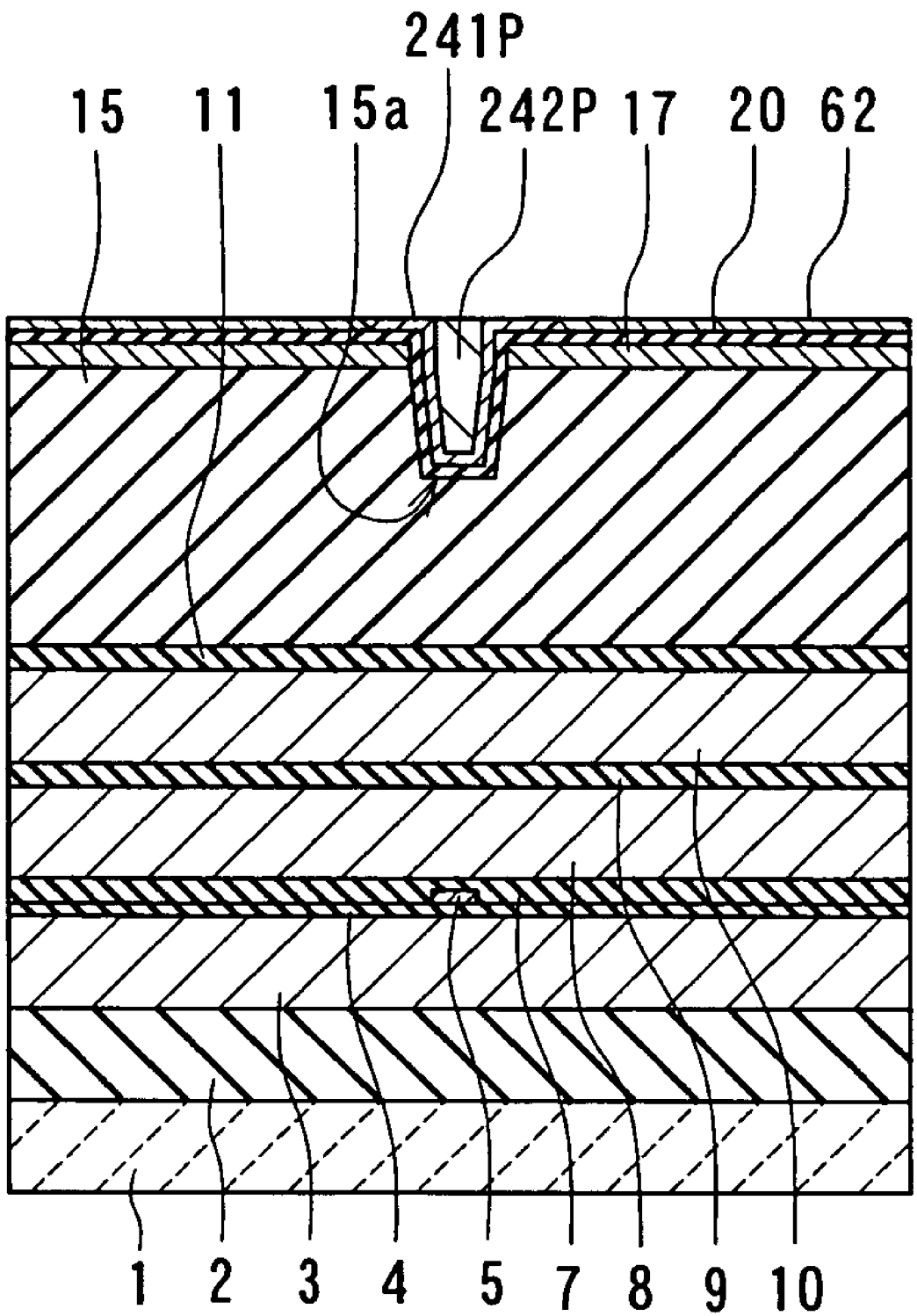
FIG. 38 is a cross-sectional view of the layered structure obtained in a step that follows the step shown in FIG. 37.

FIG. 38 illustrates the following step. In the step, the coating layer 26, the magnetic layer 242P and the magnetic layer 241P are polished by CMP, for example, until the polishing stopper layer 62 is exposed. As a result, portions of the magnetic layers 241P and 242P disposed on the top surface of the polishing stopper layer 62 are removed and the top surfaces of the polishing stopper layer 62, the magnetic layer 241P and the magnetic layer 242P are flattened. If the coating layer 26, the magnetic layer 242P and the magnetic layer 241P are polished by CMP, such a slurry is used that polishing is stopped when the polishing stopper layer 62 is exposed, such as an alumina-base slurry. If the coating layer 26, the magnetic layer 242P and the magnetic layer 241P are polished by CMP using an alumina-base slurry, the material of the polishing stopper layer 62 is preferably Ta or Ru.

Figure 39:
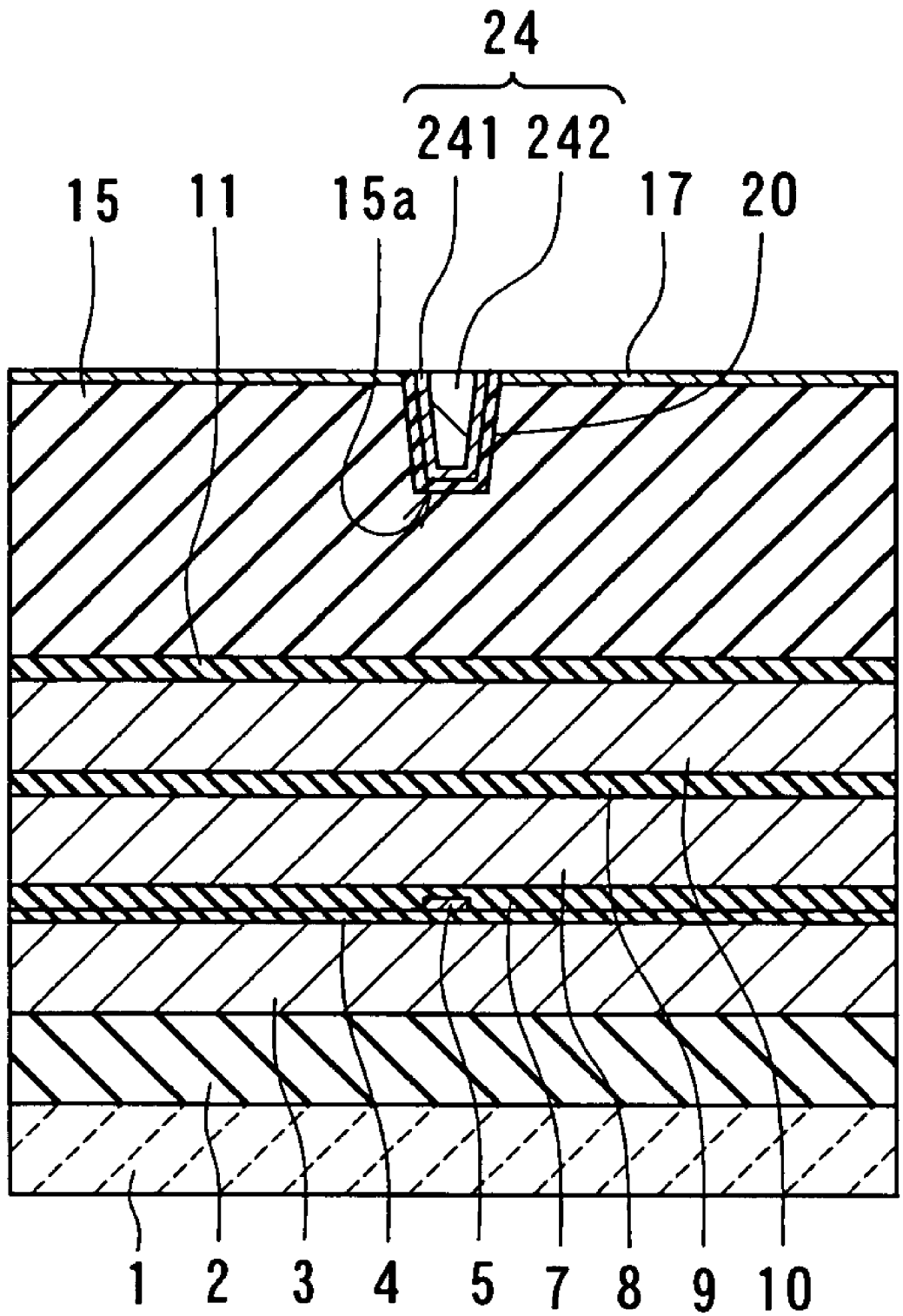
FIG. 39 is a cross-sectional view of the layered structure obtained in a step that follows the step shown in FIG. 38.

FIG. 39 illustrates the following step. In the step, any of ion beam etching, sputter etching and reactive ion etching is performed to etch at least portions of the top surfaces of the first and second magnetic layers 241P and 242P that are located near the medium facing surface. Through this step, the first and second magnetic layers 241P and 242P are formed into the first layer 241 and the second layer 242, respectively, and the pole layer 24 is thereby formed. In this step, the polishing stopper layer 62 and the nonmagnetic film 20 are etched together with the at least portions of the top surfaces of the first and second magnetic layers 241P and 242P, so that at least the polishing stopper layer 62 is removed and a portion of the nonmagnetic film 20 located on the nonmagnetic metal layer 17 is removed. In this step, the etching may be further continued from the state in which the top surface of the nonmagnetic metal layer 17 is exposed, so as to etch at least a portion of the nonmagnetic metal layer 17 together with the at least portions of the top surfaces of the first and second magnetic layers 241P and 242P. Through this step, at least portions of the top surfaces of the nonmagnetic metal layer 17, the nonmagnetic film 20, the first layer 241 and the second layer 242 that are located near the medium facing surface are flattened, and the thickness of the pole layer 24 taken in the medium facing surface is adjusted. It is possible in this step to control the thickness of the pole layer 24 with precision by etching using ion beam etching, in particular.

In this step, the at least portions of the top surfaces of the magnetic layers 241P and 242P are etched so that the top surface of the pole layer 24 is located in the medium facing surface at a height that falls within a range between the height at which the top surface of the nonmagnetic metal layer 17 as initially formed is located and the height at which the bottom surface thereof is located. Therefore, the nonmagnetic metal layer 17 may be etched together with the at least portions of the top surfaces of the magnetic layers 241P and 242P, until the nonmagnetic metal layer 17 is completely removed and the top surface of the encasing layer 15 is exposed. In this case, the second portion 42 that appears in the end face of the pole layer 24 located in the medium facing surface coincides with the second side A2 of the first portion 41. Furthermore, in this step, the at least portions of the top surfaces of the magnetic layers 241P and 242P are etched so that the top surface of the pole layer 24 is located in the medium facing surface at a height that falls within a range between the height at which the top surface of the nonmagnetic metal layer 17 is located and the height at which the bottom surface thereof is located after this step is completed. It suffices that, after this step is completed, the top surface of the pole layer 24 is located at a height that falls within the range between the height at which the top surface of the nonmagnetic metal layer 17 is located and the height at which the bottom surface thereof is located. As long as this condition is satisfied, the top surface of the pole layer 24 may be located at a height lower than the height at which the top surface of the nonmagnetic metal layer 17 is located.

Next, the gap layer 27 is formed on the entire top surface of the layered structure. The steps that follow are the same as those of the first embodiment. In the magnetic head of the fourth embodiment, the pole layer 24 is disposed in the groove 15a of the encasing layer 15 only with the nonmagnetic film 20 disposed between the pole layer 24 and the groove 15a. As a result, it is easy to control the track width. The remainder of configuration, function and effects of the fourth embodiment are similar to those of the first embodiment including the modification examples.

Fifth Embodiment

Reference is now made to FIG. 40 to FIG. 43 to describe a magnetic head and a method of manufacturing the same of a fifth embodiment of the invention. Each of FIG. 40 to FIG. 43 is a cross-sectional view of a layered structure obtained in the manufacturing process of the magnetic head of the embodiment. Each of FIG. 40 to FIG. 43 shows the cross section taken in the position in which the medium facing surface is to be formed.

Figure 40:
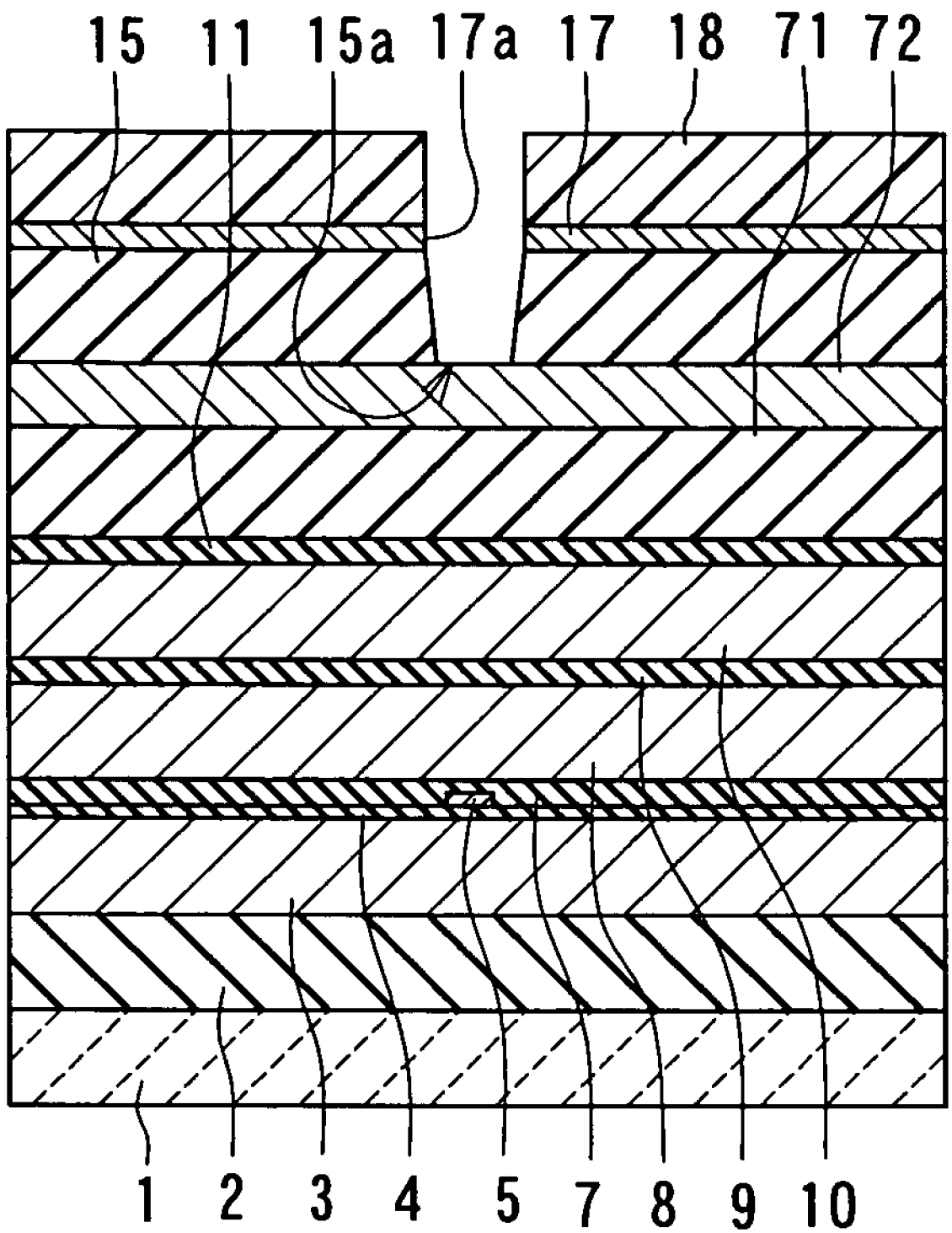
FIG. 40 is a cross-sectional view of a layered structure obtained in a step of a method of manufacturing a magnetic head of a fifth embodiment of the invention.

The method of manufacturing the magnetic head of the fifth embodiment includes the steps up to the step of forming the coil 12 on the insulating layer 11 as shown in FIG. 8 and further forming the insulating layer 13 and the coupling layer 14, that are the same as those of the first embodiment. FIG. 40 illustrates the following step. In the step, first, an insulating layer 71 made of alumina, for example, is formed on the entire top surface of the layered structure. Next, the insulating layer 71 is polished by CMP, for example, until the coupling layer 14 is exposed. Next, a nonmagnetic conductive layer 72 made of a nonmagnetic conductive material is selectively formed on the insulating layer 71 in a region including a region in which the pole layer 24 will be disposed later. The material of the nonmagnetic conductive layer 72 may be the same as that of the nonmagnetic metal layer 17 of the first embodiment. Furthermore, a second coupling layer not shown that is made of a conductive material is formed on the coupling layer 14.

Next, a nonmagnetic layer is formed on the entire top surface of the layered structure. The nonmagnetic layer is then polished by CMP, for example, until the second coupling layer is exposed. The nonmagnetic layer will be the encasing layer 15 by forming the groove 15a therein later. Next, the nonmagnetic metal layer 17 is formed on the nonmagnetic layer. Next, the groove 15a is formed in the nonmagnetic layer as in the step illustrated in FIG. 12 and FIG. 13. The groove 15a is formed such that the bottom thereof reaches the level of the top surface of the nonmagnetic conductive layer 72. The nonmagnetic layer is thus formed into the encasing layer 15 by forming the groove 15a therein.

Figure 41:
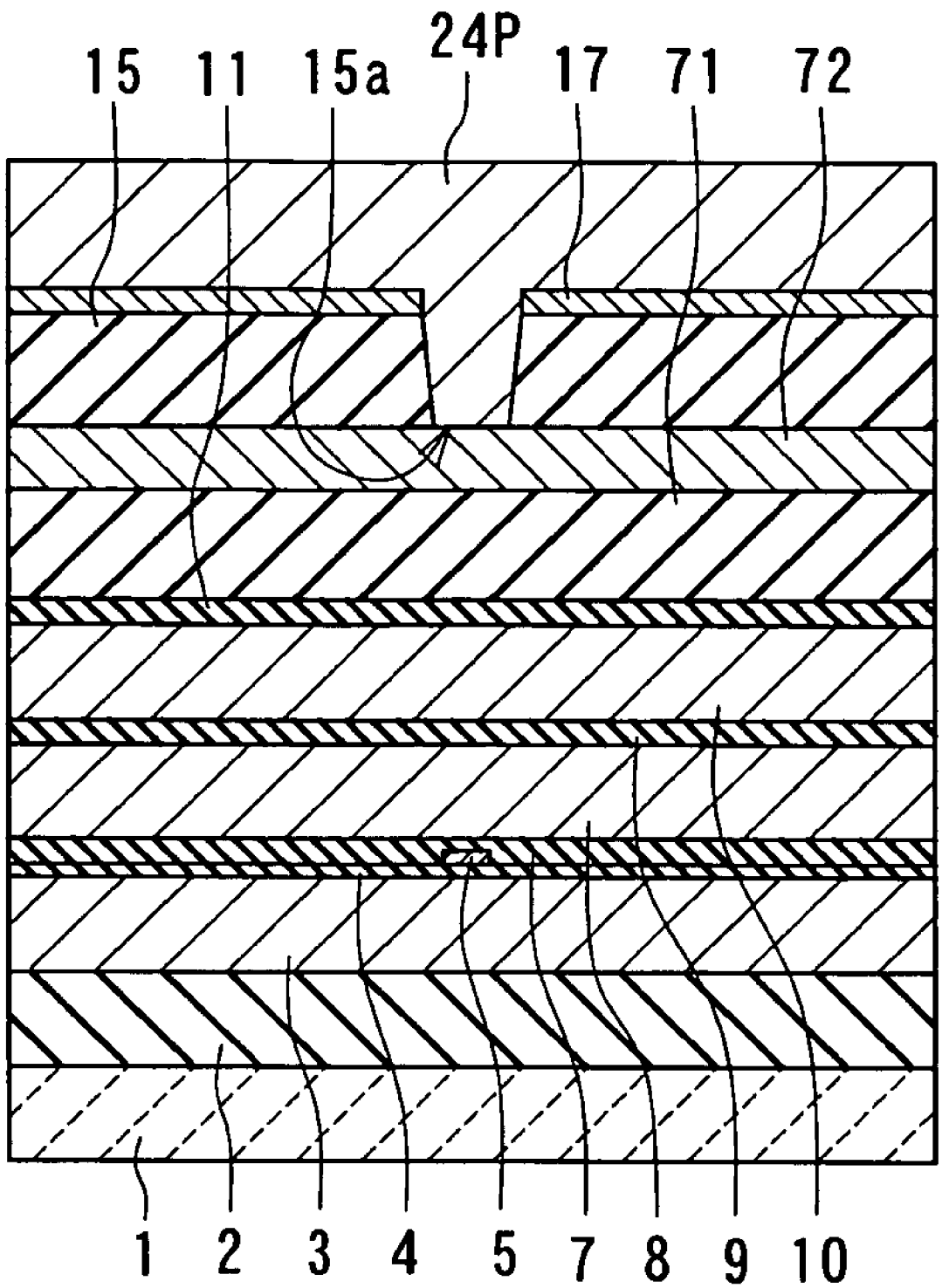
FIG. 41 is a cross-sectional view of the layered structure obtained in a step that follows the step shown in FIG. 40.

FIG. 41 illustrates the following step. In the step, a magnetic layer 24P is formed by frame plating, using the nonmagnetic conductive layer 72 as an electrode for plating. The magnetic layer 24P is formed such that the groove 15a is filled with the magnetic layer 24P and that the top surface of the magnetic layer 24P is located higher than the top surface of the nonmagnetic metal layer 17. The magnetic layer 24P is a layer to be the pole layer 24 later. The magnetic layer 24P is made of a magnetic metal material and may be made of any of NiFe, CoNiFe and CoFe, for example.

Figure 42:
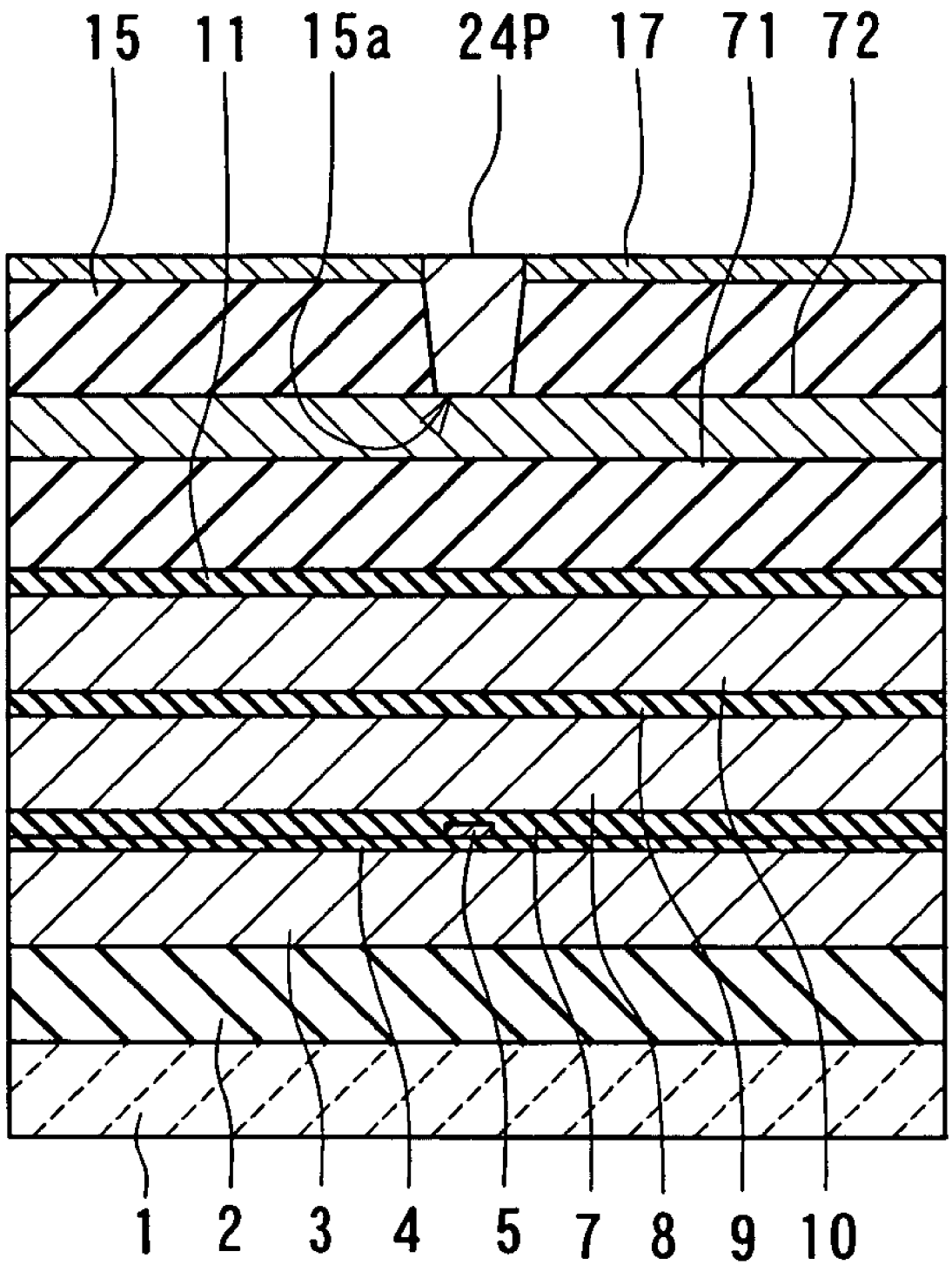
FIG. 42 is a cross-sectional view of the layered structure obtained in a step that follows the step shown in FIG. 41.

FIG. 42 illustrates the following step. In the step, although not shown, a coating layer made of alumina, for example, is first formed on the entire top surface of the layered structure. Next, the coating layer and the magnetic layer 24P are polished by CMP, for example, until the nonmagnetic metal layer 17 is exposed. As a result, a portion of the magnetic layer 24P disposed on the top surface of the nonmagnetic metal layer 17 is removed and the top surfaces of the nonmagnetic metal layer 17 and the magnetic layer 24P are flattened. If the coating layer and the magnetic layer 24P are polished by CMP, such a slurry is used that polishing is stopped when the nonmagnetic metal layer 17 is exposed, such as an alumina-base slurry. If the coating layer and the magnetic layer 24P are polished by CMP using an alumina-base slurry, the material of the nonmagnetic metal layer 17 is preferably Ta or Ru.

Figure 43:
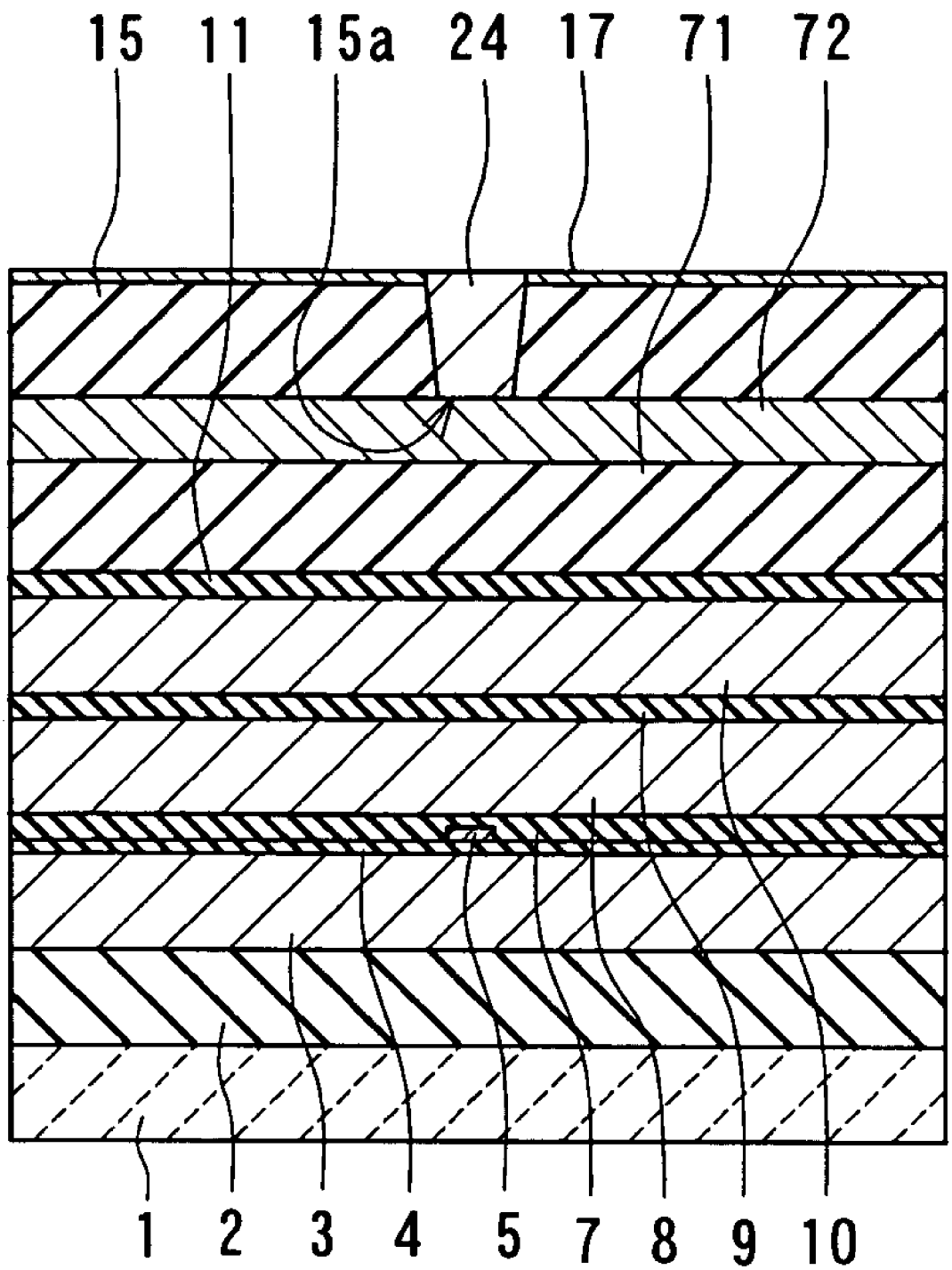
FIG. 43 is a cross-sectional view of the layered structure obtained in a step that follows the step shown in FIG. 42.

FIG. 43 illustrates the following step. In the step, any of ion beam etching, sputter etching and reactive ion etching is performed to etch at least a portion of the nonmagnetic metal layer 17, together with at least a portion of the top surface of the magnetic layer 24P located near the medium facing surface. Through this step, the magnetic layer 24P is formed into the pole layer 24. Through this step, at least portions of the top surfaces of the nonmagnetic metal layer 17 and the pole layer 24 that are located near the medium facing surface are flattened, and the thickness of the pole layer 24 taken in the medium facing surface is adjusted. It is possible in this step to control the thickness of the pole layer 24 with precision by etching using ion beam etching, in particular.

In this step, the at least portion of the top surface of the magnetic layer 24P is etched so that the top surface of the pole layer 24 is located in the medium facing surface at a height that falls within a range between the height at which the top surface of the nonmagnetic metal layer 17 as initially formed is located and the height at which the bottom surface thereof is located. Therefore, the nonmagnetic metal layer 17 may be etched together with the at least portion of the top surface of the magnetic layer 24P, until the nonmagnetic metal layer 17 is completely removed and the top surface of the encasing layer 15 is exposed. In this case, the second portion 42 that appears in the end face of the pole layer 24 located in the medium facing surface coincides with the second side A2 of the first portion 41. Furthermore, in this step, the at least portion of the top surface of the magnetic layer 24P is etched so that the top surface of the pole layer 24 is located in the medium facing surface at a height that falls within a range between the height at which the top surface of the nonmagnetic metal layer 17 is located and the height at which the bottom surface thereof is located after this step is completed. It suffices that, after this step is completed, the top surface of the pole layer 24 is located at a height that falls within the range between the height at which the top surface of the nonmagnetic metal layer 17 is located and the height at which the bottom surface thereof is located. As long as this condition is satisfied, the top surface of the pole layer 24 may be located at a height lower than the height at which the top surface of the nonmagnetic metal layer 17 is located.

Next, the gap layer 27 is formed on the entire top surface of the layered structure. The steps that follow are the same as those of the first embodiment. In the magnetic head of the fifth embodiment, the pole layer 24 is disposed in the groove 15a of the encasing layer 15 without any layer disposed between the pole layer 24 and the groove 15a. As a result, it is easy to control the track width.

A case will now be considered wherein a groove that does not penetrate is formed in the encasing layer and the pole layer is formed in the groove by plating. In this case, it is difficult to form an electrode film for plating at the bottom of the groove without defects when the track width is reduced and the width of the groove is reduced, too, in particular. If the electrode film is not sufficiently formed at the bottom of the groove, there is a possibility that, when the pole layer is formed by plating, a plating film is not sufficiently grown near the bottom of the groove, and defects such as keyholes result.

In the fifth embodiment, the encasing layer 15 having the groove 15a that penetrates is formed on the nonmagnetic conductive layer 72 made of a nonmagnetic conductive material. The magnetic layer 24P is then formed on the nonmagnetic conductive layer 72 in the groove 15a. Therefore, according to the embodiment, the nonmagnetic conductive layer 72 that functions as the electrode for plating exists at the bottom of the groove 15a. As a result, it is possible that the plating film is sufficiently grown even near the bottom of the groove 15a when the magnetic layer 24P is formed by plating. It is thereby possible to prevent defects such as keyholes. As a result, according to the embodiment, it is possible to form the pole layer 24 having a desired shape with accuracy even if the track width is reduced.

The remainder of configuration, function and effects of the fifth embodiment are similar to those of the first embodiment including the modification examples.

Sixth Embodiment

Figure 44:
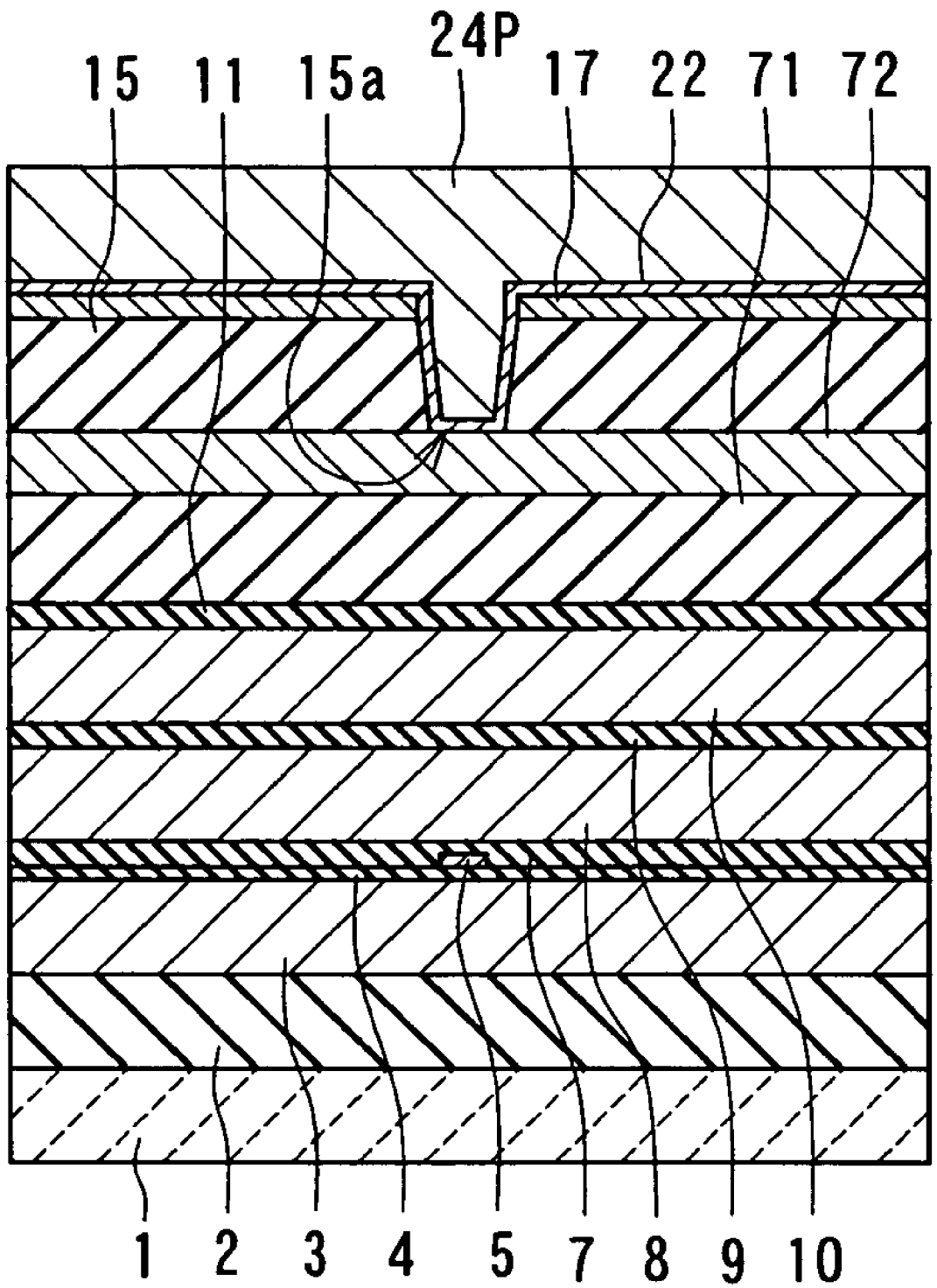
FIG. 44 is a cross-sectional view of a layered structure obtained in a step of a method of manufacturing a magnetic head of a sixth embodiment of the invention.
Figure 45:
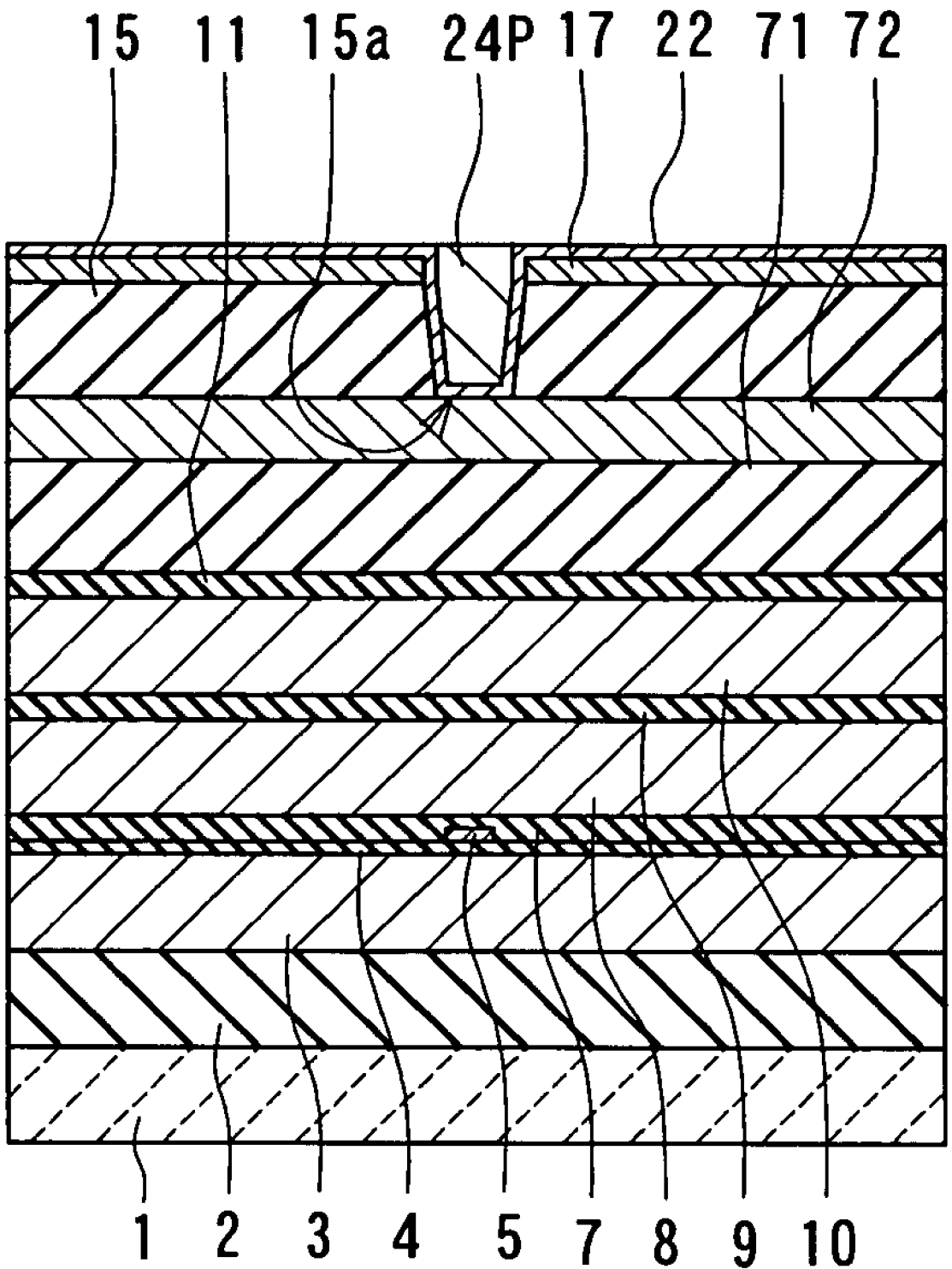
FIG. 45 is a cross-sectional view of the layered structure obtained in a step that follows the step shown in FIG. 44.
Figure 46:
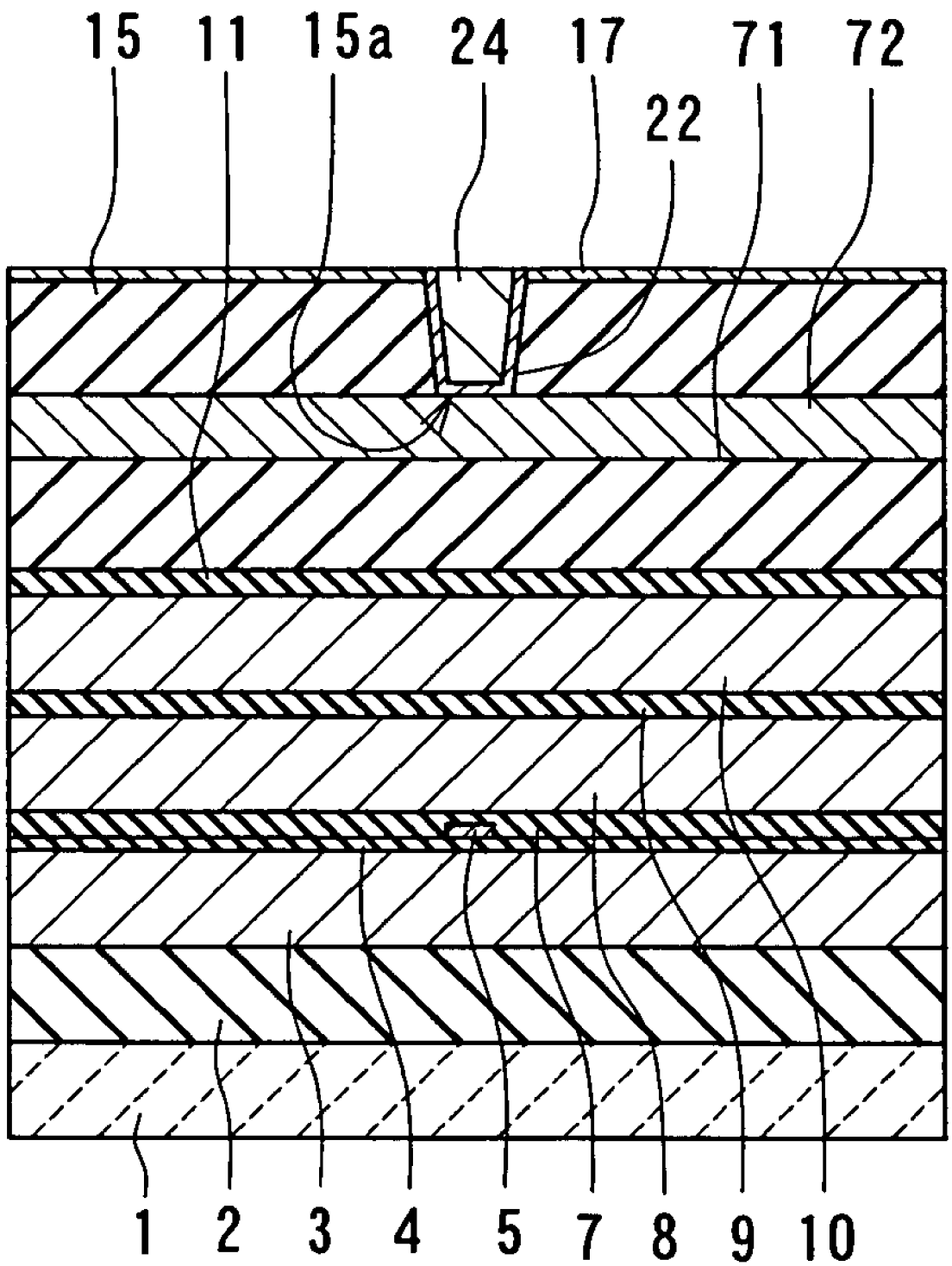
FIG. 46 is a cross-sectional view of the layered structure obtained in a step that follows the step shown in FIG. 45.

Reference is now made to FIG. 44 to FIG. 46 to describe a magnetic head and a method of manufacturing the same of a sixth embodiment of the invention. Each of FIG. 44 to FIG. 46 is a cross-sectional view of a layered structure obtained in the manufacturing process of the magnetic head of the embodiment. Each of FIG. 44 to FIG. 46 shows the cross section taken in the position in which the medium facing surface is to be formed.

The method of manufacturing the magnetic head of the sixth embodiment includes the steps up to the step of forming the groove 15a as shown in FIG. 40, that are the same as those of the fifth embodiment. FIG. 44 illustrates the following step. In the step, first, the polishing stopper layer 22 is formed by a method such as sputtering on the entire top surface of the layered structure. The polishing stopper layer 22 is formed in the groove 15a of the encasing layer 15, too. The polishing stopper layer 22 also functions as a seed layer used when the pole layer 24 is formed by plating. The material and thickness of the polishing stopper layer 22 are the same as those of the first embodiment. Next, the magnetic layer 24P is formed by frame plating, using the nonmagnetic conductive layer 72 and the polishing stopper layer 22 as electrodes for plating. The magnetic layer 24P is formed such that the groove 15a is filled with the magnetic layer 24P and the top surface of the magnetic layer 24P is located higher than the top surface of the polishing stopper layer 22.

FIG. 45 illustrates the following step. In the step, although not shown, a coating layer made of alumina, for example, is first formed on the entire top surface of the layered structure. Next, the coating layer and the magnetic layer 24P are polished by CMP, for example, until the polishing stopper layer 22 is exposed. As a result, a portion of the magnetic layer 24P disposed on the top surface of the polishing stopper layer 22 is removed and the top surfaces of the polishing stopper layer 22 and the magnetic layer 24P are flattened. If the coating layer and the magnetic layer 24P are polished by CMP, such a slurry is used that polishing is stopped when the polishing stopper layer 22 is exposed, such as an alumina-base slurry. If the coating layer and the magnetic layer 24P are polished by CMP using an alumina-base slurry, the material of the polishing stopper layer 22 is preferably Ta or Ru.

FIG. 46 illustrates the following step. In the step, any of ion beam etching, sputter etching and reactive ion etching is performed to etch at least a portion of the top surface of the magnetic layer 24P located near the medium facing surface. Through this step, the magnetic layer 24P is formed into the pole layer 24. In this step, the polishing stopper layer 22 is etched together with the at least portion of the top surface of the magnetic layer 24P so that at least a portion of the polishing stopper layer 22 located on the nonmagnetic metal layer 17 is removed. In this step, the etching may be further continued from the state in which the top surface of the nonmagnetic metal layer 17 is exposed, so as to etch at least a portion of the nonmagnetic metal layer 17 together with the at least portion of the top surface of the magnetic layer 24P. Through this step, at least portions of the top surfaces of the nonmagnetic metal layer 17, the polishing stopper layer 22 and the pole layer 24 that are located near the medium facing surface are flattened, and the thickness of the pole layer 24 taken in the medium facing surface is adjusted. It is possible in this step to control the thickness of the pole layer 24 with precision by etching using ion beam etching, in particular.

In this step, the at least portion of the top surface of the magnetic layer 24P is etched so that the top surface of the pole layer 24 is located in the medium facing surface at a height that falls within a range between the height at which the top surface of the nonmagnetic metal layer 17 as initially formed is located and the height at which the bottom surface thereof is located. Therefore, the nonmagnetic metal layer 17 may be etched together with the at least portion of the top surface of the magnetic layer 24P, until the nonmagnetic metal layer 17 is completely removed and the top surface of the encasing layer 15 is exposed. In this case, the second portion 42 that appears in the end face of the pole layer 24 located in the medium facing surface coincides with the second side A2 of the first portion 41. Furthermore, in this step, the at least portion of the top surface of the magnetic layer 24P is etched so that the top surface of the pole layer 24 is located in the medium facing surface at a height that falls within a range between the height at which the top surface of the nonmagnetic metal layer 17 is located and the height at which the bottom surface thereof is located after this step is completed. It suffices that, after this step is completed, the top surface of the pole layer 24 is located at a height that falls within the range between the height at which the top surface of the nonmagnetic metal layer 17 is located and the height at which the bottom surface thereof is located. As long as this condition is satisfied, the top surface of the pole layer 24 may be located at a height lower than the height at which the top surface of the nonmagnetic metal layer 17 is located.

Next, the gap layer 27 is formed on the entire top surface of the layered structure. The steps that follow are the same as those of the first embodiment. In the magnetic head of the sixth embodiment, the pole layer 24 is disposed in the groove 15a of the encasing layer 15 only with the polishing stopper layer 22 disposed between the pole layer 24 and the groove 15a. The remainder of configuration, function and effects of the sixth embodiment are similar to those of the fifth embodiment.

Seventh Embodiment

Figure 48:
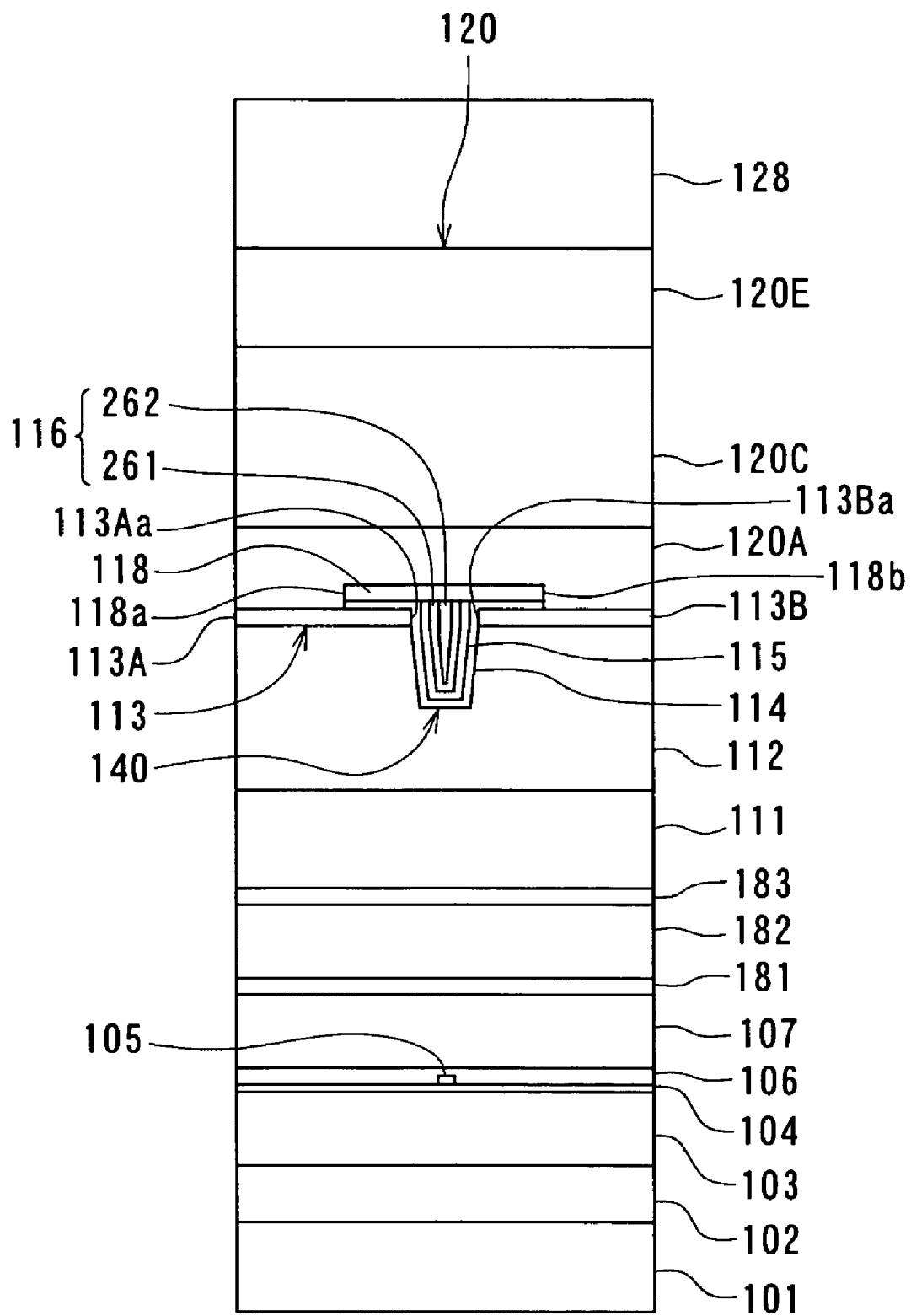
FIG. 48 is a front view of the medium facing surface of the magnetic head of the seventh embodiment of the invention.
Figure 49:
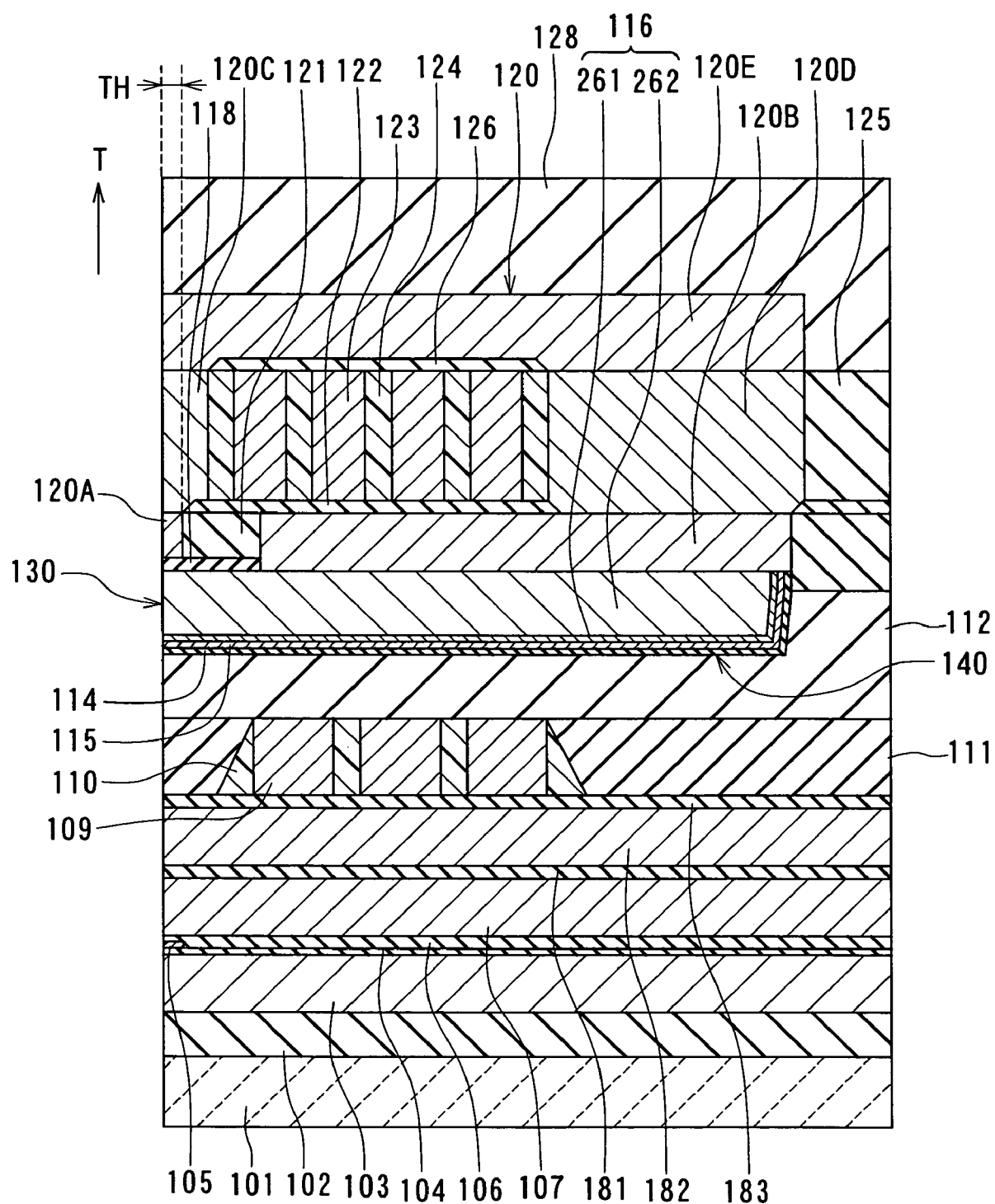
FIG. 49 is a cross-sectional view for illustrating the configuration of the magnetic head of the seventh embodiment of the invention.

A seventh embodiment of the invention will now be described. Reference is first made to FIG. 48 and FIG. 49 to describe the configuration of a magnetic head for perpendicular magnetic recording of the seventh embodiment of the invention. FIG. 48 is a front view for illustrating a medium facing surface of the magnetic head of the embodiment. FIG. 49 is a cross-sectional view for illustrating the configuration of the magnetic head of the embodiment. FIG. 49 illustrates a cross section orthogonal to the medium facing surface and a surface of a substrate. The arrow indicated with T in FIG. 49 shows the direction of travel of a recording medium.

As shown in FIG. 48 and FIG. 49, the magnetic head for perpendicular magnetic recording (hereinafter simply called the magnetic head) of the embodiment comprises: a substrate 101 made of a ceramic such as aluminum oxide and titanium carbide ($Al_2O_3$—TiC); an insulating layer 102 made of an insulating material such as alumina ($Al_2O_3$) and disposed on the substrate 101; a bottom shield layer 103 made of a magnetic material and disposed on the insulating layer 102; a bottom shield gap film 104 that is an insulating film disposed on the bottom shield layer 103; a magnetoresistive (MR) element 105 as a read element disposed on the bottom shield gap film 104; a top shield gap film 106 that is an insulating film disposed on the MR element 105; and a first top shield layer 107 made of a magnetic material and disposed on the top shield gap film 106.

The MR element 105 has an end that is located in the medium facing surface 130 that faces toward a recording medium. The MR element 105 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 181 and a second top shield layer 182 that are disposed on the first top shield layer 107 one by one. The nonmagnetic layer 181 is made of a nonmagnetic material such as alumina. The second top shield layer 182 is made of a magnetic material. The portions from the bottom shield layer 103 to the second top shield layer 182 make up a read head.

The magnetic head further comprises: an insulating layer 183 made of an insulating material and disposed on the second top shield layer 182; a coil 109 disposed on the insulating layer 183; an insulating layer 110 made of an insulating material and disposed around the coil 109 and in the space between the respective adjacent turns of the coil 109; and an insulating layer 111 made of an insulating material and disposed around the insulating layer 110. The coil 109 is flat-whorl-shaped. The coil 109 and the insulating layers 110 and 111 have flattened top surfaces. The insulating layers 183 and 111 are made of alumina, for example. The insulating layer 110 is made of photoresist, for example. The coil 109 is made of a conductive material such as copper.

The magnetic head further comprises an encasing layer 112 made of a nonmagnetic material and disposed on the flattened top surfaces of the coil 109 and the insulating layers 110 and 111. The encasing layer 112 may be made of an insulating material such as alumina, silicon oxide ($SiO_x$), or silicon oxynitride (SiON), or may be made of a nonmagnetic metal material such as Ru, Ta, Mo, Ti, W, NiCu, NiB or NiPd.

The magnetic head further comprises a metal layer 113 made of a magnetic metal material and disposed on a portion of the top surface of the encasing layer 112. The metal layer 113 has an opening that penetrates. The metal layer 113 is divided into two portions by this opening, and the two portions are two side shield layers 113A and 113B. The material of the side shield layers 113A and 113B, that is, the material of the metal layer 113, may be any of NiFe, CoNiFe and CoFe, for example.

The layered structure made up of the encasing layer 112 and the metal layer 113 has a groove 140 that accommodates at least a portion of a pole layer described later.

The magnetic head further comprises a nonmagnetic film 114, a polishing stopper layer 115 and the pole layer 116 that are disposed in the groove 140. The nonmagnetic film 114 is made of a nonmagnetic material and disposed to touch the surface of the groove 140. The pole layer 116 is made of a magnetic material and disposed apart from the surface of the groove 140. The polishing stopper layer 115 is disposed between the nonmagnetic film 114 and the pole layer 116. The polishing stopper layer 115 also functions as a seed layer used for forming the pole layer 116 by plating. The pole layer 116 incorporates: a first layer 261 located closer to the surface of the groove 140; and a second layer 262 located farther from the surface of the groove 140. The first layer 261 may be omitted.

The nonmagnetic film 114 may be made of an insulating material or a semiconductor material, for example. The insulating material as the material of the nonmagnetic film 114 may be any of alumina, silicon oxide ($SiO_x$), and silicon oxynitride (SiON). The semiconductor material as the material of the nonmagnetic film 114 may be polycrystalline silicon or amorphous silicon.

The polishing stopper layer 115 is made of a nonmagnetic conductive material. The material of the polishing stopper layer 115 may be any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example.

Each of the first layer 261 and the second layer 262 is made of a magnetic metal material. The first layer 261 may be made of any of CoFeN, CoNiFe, NiFe, and CoFe, for example. The second layer 262 may be made of any of NiFe, CoNiFe and CoFe, for example.

The magnetic head further comprises a gap layer 118 disposed on the top surfaces of the nonmagnetic film 114, the polishing stopper layer 115 and the pole layer 116. The gap layer 118 is a flat layer and has an opening located at a distance from the medium facing surface 130. The gap layer 118 may be made of an insulating material such as alumina or a nonmagnetic metal material such as Ru, NiCu, Ta, W, NiB or NiPd.

The side shield layers 113A and 113B have end faces located on both sides of the end face of the pole layer 116 in the medium facing surface 130, the sides being opposed to each other in the direction of track width. The nonmagnetic film 114 and the polishing stopper layer 115 are disposed between the pole layer 116 and the side shield layers 113A and 113B. In the medium facing surface 130, both ends 118a and 118b of the end face of the gap layer 118 that are opposed to each other in the direction of track width are located at positions along the direction of track width outside ends 113Aa and 113Ba of the respective end faces of the side shield layers 113A and 113B, the ends 113Aa and 113Ba being closer to the pole layer 116. In the medium facing surface 130, the end face of the gap layer 118 has a shape that extends linearly in the direction of track width.

The magnetic head further comprises a main shield layer 120. The main shield layer 120 has: a first layer 120A disposed on the side shield layers 113A and 113B and the gap layer 118; a second layer 120C disposed on the first layer 120A; a yoke layer 120B disposed on a portion of the pole layer 116 where the opening of the gap layer 118 is formed; a coupling layer 120D disposed on the yoke layer 120B; and a third layer 120E disposed to couple the second layer 120C to the coupling layer 120D. The first layer 120A, the yoke layer 120B, the second layer 120C, the coupling layer 120D and the third layer 120E are each made of a magnetic material. These layers 120A to 120E may be made of any of CoFeN, CoNiFe, NiFe and CoFe, for example.

The magnetic head further comprises a nonmagnetic layer 121 made of a nonmagnetic material and disposed around the yoke layer 120B. A portion of the nonmagnetic layer 121 is disposed on a side of the first layer 120A. The nonmagnetic layer 121 is made of an inorganic insulating material such as alumina or coating glass. Alternatively, the nonmagnetic layer 121 may be made up of a layer of a nonmagnetic metal material and a layer of an insulating material disposed thereon. In this case, the nonmagnetic metal material may be a refractory metal such as Ta, Mo, Nb, W, Cr, Ru, or Cu.

The magnetic head further comprises: an insulating layer 122 disposed on regions of the top surfaces of the yoke layer 120B and the nonmagnetic layer 121 in which a coil 123 described later is disposed; the coil 123 disposed on the insulating layer 122; an insulating layer 124 disposed around the coil 123 and in the space between the respective adjacent turns of the coil 123; an insulating layer 125 disposed around the second layer 120C, the coupling layer 20D and the insulating layer 124; and an insulating layer 126 disposed on the coil 123 and the insulating layer 124. The coil 123 is flat-whorl-shaped. A portion of the coil 123 passes between the second layer 120C and the coupling layer 120D. The coil 123 is made of a conductive material such as copper. The second layer 120C, the coupling layer 120D, the coil 123 and the insulating layers 124 and 125 have flattened top surfaces. The insulating layer 124 is made of photoresist, for example. The insulating layers 122, 125 and 126 are made of alumina, for example.

The portions from the coil 109 to the third layer 120E of the main shield layer 120 make up a write head. The magnetic head further comprises a protection layer 128 for covering the main shield layer 120. The protection later 128 is made of alumina, for example.

As described so far, the magnetic head of the embodiment comprises the medium facing surface 130 that faces toward a recording medium, the read head, and the write head. The read head and the write head are stacked on the substrate 101. The read head is disposed backward in the direction T of travel of the recording medium (that is, disposed closer to the air inflow end of the slider). The write head is disposed forward in the direction T of travel of the recording medium (that is, disposed closer to the air outflow end of the slider).

The read head comprises the MR element 105 as the read element, and the bottom shield layer 103 and the top shield layer 107 for shielding the MR element 105. Portions of the bottom shield layer 103 and the top shield layer 107 that are located on a side of the medium facing surface 130 are opposed to each other, the MR element 105 being placed between these portions. The read head further comprises: the bottom shield gap film 104 disposed between the MR element 105 and the bottom shield layer 103; and the top shield gap film 106 disposed between the MR element 105 and the top shield layer 107.

The write head comprises the coil 109, the encasing layer 112, the side shield layers 113A and 113B, the nonmagnetic film 114, the polishing stopper layer 115, the pole layer 116, the gap layer 118, the main shield layer 120, and the coil 123. The coils 109 and 123 generate a magnetic field corresponding to data to be written on the recording medium. The coil 109 is not a component requisite for the write head and may be omitted. The nonmagnetic film 114 may also be omitted.

The pole layer 116 has an end face located in the medium facing surface 130. The pole layer 116 allows a magnetic flux corresponding to the field generated by the coil 123 to pass therethrough and generates a write magnetic field for writing the data on the medium by using the perpendicular magnetic recording system.

The main shield layer 120 has an end located in the medium facing surface 130, and has a portion located away from the medium facing surface 130 and coupled to the pole layer 116. The gap layer 118 is made of a nonmagnetic material and provided between the pole layer 116 and the main shield layer 120.

In the medium facing surface 130, the end face of the shield layer 120 is disposed forward of the end face of the pole layer 116 along the direction T of travel of the recording medium with a specific space created by the thickness of the gap layer 118. The thickness of the gap layer 118 falls within a range of 30 to 60 nm inclusive, for example. At least part of the coil 123 is disposed between the pole layer 116 and the main shield layer 120 and insulated from the pole layer 116 and the main shield layer 120.

The pole layer 116 is disposed in the groove 140 with the nonmagnetic film 114 and the polishing stopper layer 115 disposed between the pole layer 116 and the groove 140. The nonmagnetic film 114 has a thickness that falls within a range of 10 to 40 nm inclusive, for example. However, the thickness of the nonmagnetic film 114 is not limited to this range but may be of any other value depending on the track width. The polishing stopper layer 115 has a thickness that falls within a range of 30 to 100 nm inclusive, for example.

The pole layer 116 incorporates: the first layer 261 located closer to the surface of the groove 140; and the second layer 262 located farther from the surface of the groove 140. The first layer 261 has a thickness that falls within a range of 0 to 100 nm inclusive, for example. That the thickness of the first layer 261 is zero means that the first layer 261 is not provided.

The main shield layer 120 has: the first layer 120A disposed adjacent to the gap layer 118; the second layer 120C disposed on a side of the first layer 120A farther from the gap layer 118; the yoke layer 120B disposed on the portion of the pole layer 116 where the opening of the gap layer 118 is formed; the coupling layer 120D disposed on the yoke layer 120B; and the third layer 120E disposed to couple the second layer 120C to the coupling layer 120D. The second layer 120C is disposed between the medium facing surface 130 and the at least part of the coil 123.

The first layer 120A has: a first end located in the medium facing surface 130; and a second end opposite to the first end. The second layer 120C also has: a first end located in the medium facing surface 130; and a second end opposite to the first end. The throat height TH is the distance between the medium facing surface 130 and the point at which the space between the pole layer 116 and the main shield layer 120 starts to increase when seen from the medium facing surface 130. In the embodiment, the throat height TH is the distance between the medium facing surface 130 and the end of the first layer 120A farther from the medium facing surface 130. The throat height TH falls within a range of 0.05 to 0.3 μm inclusive, for example. The minimum distance between the first end and the second end of the portion of the second layer 120C facing toward the pole layer 116 with the gap layer 118 and the first layer 120A disposed in between falls within a range of 0.3 to 0.8 μm inclusive, for example. The first layer 120A and the yoke layer 120B have a thickness that falls within a range of 0.3 to 0.8 μm inclusive, for example. The second layer 120C and the coupling layer 120D have a thickness that falls within a range of 1.5 to 3.0 μm inclusive, for example. The third layer 120E has a thickness that falls within a range of 2.0 to 3.0 μm inclusive, for example. The coil 123 has a thickness that is equal to or smaller than the thickness of the second layer 120C and that falls within a range of 1.5 to 3.0 μm inclusive, for example.

Figure 47:
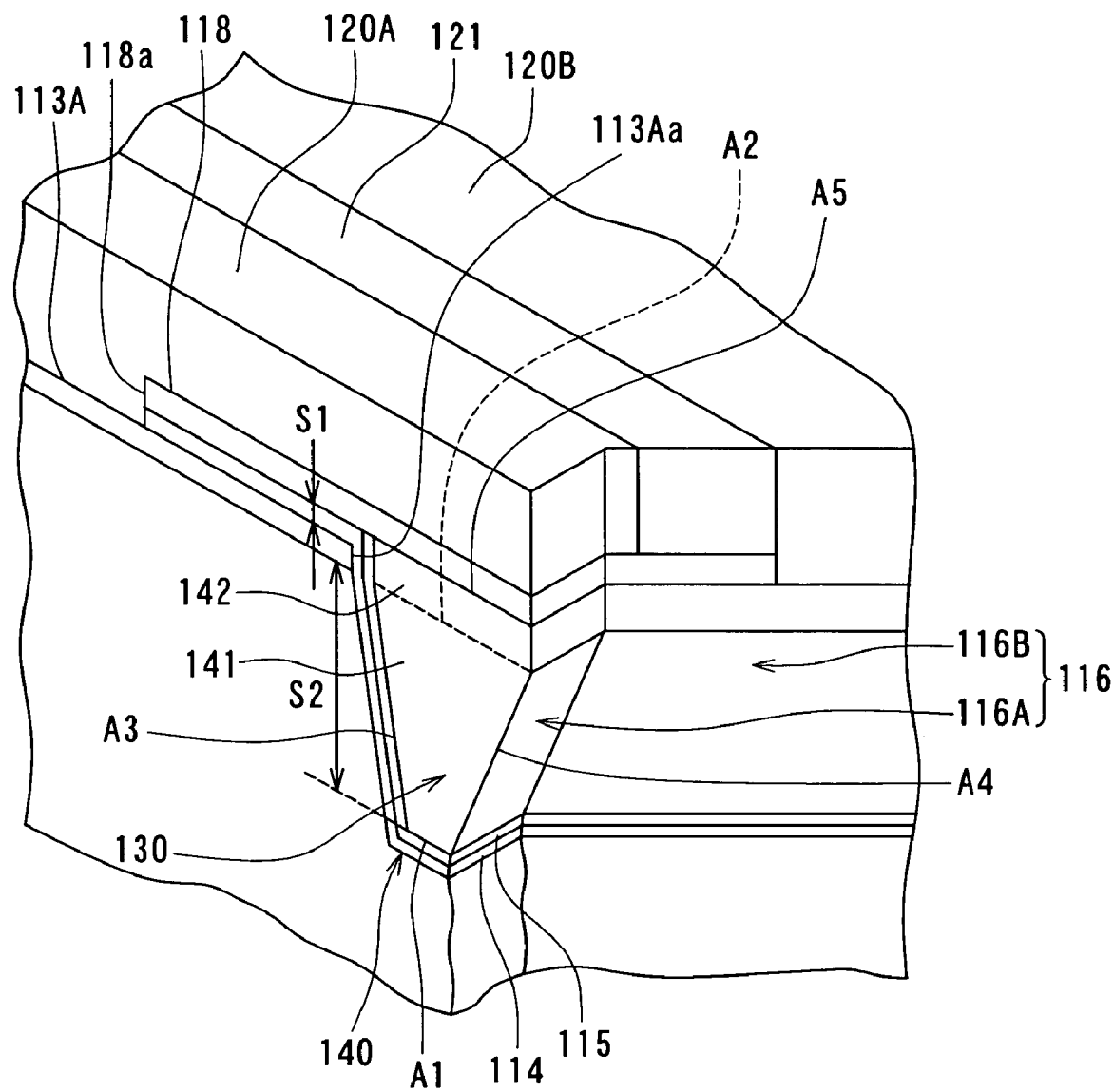
FIG. 47 is a perspective view illustrating a portion of a pole layer near the medium facing surface of a magnetic head of a seventh embodiment of the invention.
Figure 50:
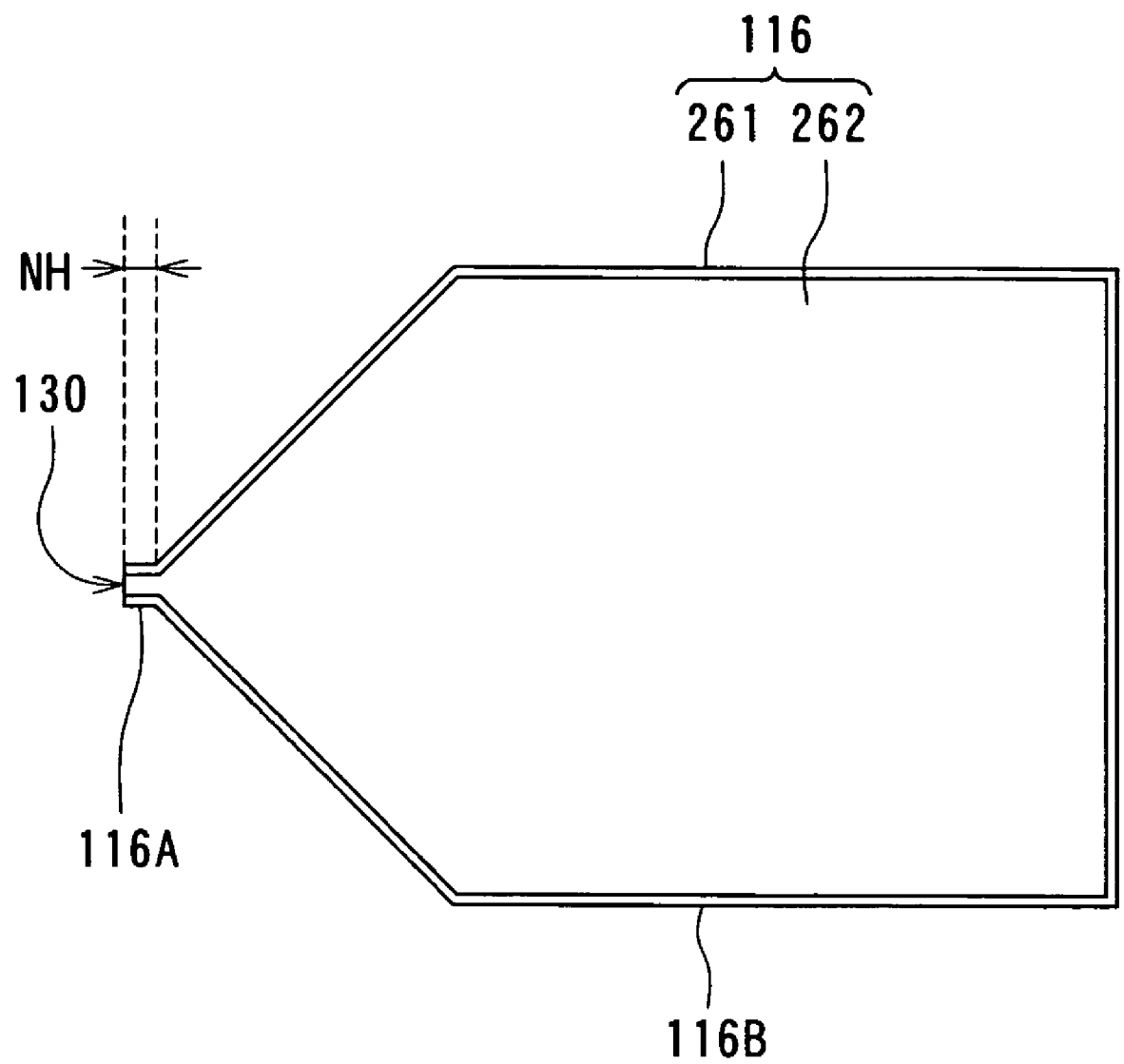
FIG. 50 is a top view of the pole layer of the magnetic head of the seventh embodiment of the invention.

Reference is now made to FIG. 47 and FIG. 50 to describe the pole layer 116, the side shield layers 113A and 113B, and the gap layer 118 in detail. FIG. 47 is a perspective view of a portion of the pole layer 116 near the medium facing surface 130. FIG. 50 is a top view of the pole layer 116. As shown in FIG. 47 and FIG. 50, the pole layer 116 incorporates a track width defining portion 116A and a wide portion 116B. The track width defining portion 116A has an end face located in the medium facing surface 130. The wide portion 116B is located farther from the medium facing surface 130 than the track width defining portion 116A and has a width greater than the width of the track width defining portion 116A. The width of the track width defining portion 116A does not change in accordance with the distance from the medium facing surface 130. For example, the wide portion 116B is equal in width to the track width defining portion 116A at the interface with the track width defining portion 116A, and gradually increases in width as the distance from the medium facing surface 130 increases and then maintains a specific width to the end of the wide portion 116B. In the embodiment, the track width defining portion 116A is defined as a portion of the pole layer 116 extending from the end face located in the medium facing surface 130 to the point at which the width of the pole layer 116 starts to increase. Here, the length of the track width defining portion 116A taken in the direction orthogonal to the medium facing surface 130 is called a neck height NH. The neck height NH falls within a range of 0.1 to 0.3 μm inclusive, for example.

The end face of the pole layer 116 located in the medium facing surface 130 has: a first portion 141; and a second portion 142 connected to the first portion 141 and located farther from the substrate 101 than the first portion 141. In FIG. 47, the broken line indicates the boundary between the first portion 141 and the second portion 142. The width of the first portion 141 decreases as the distance from the substrate 101 decreases.

The first portion 141 has: a first side A1 close to the substrate 101; a second side A2 opposite to the first side A1; a third side A3 connecting an end of the first side A1 to an end of the second side A2; and a fourth side A4 connecting the other end of the first side A1 to the other end of the second side A2. The second side A2 touches the gap layer 118 and defines the track width. Each of the third side A3 and the fourth side A4 forms an angle that falls within a range of 5 to 15 degrees inclusive, for example, with respect to the direction orthogonal to the top surface of the substrate 101. The length of the second side A2, that is, the track width, falls within a range of 0.05 to 0.20 μm inclusive, for example.

The second portion 142 has a uniform width that is equal to the length of the second side A2 and that defines the track width. The two sides of the second portion 142 that are located on both sides opposed to each other in the direction of width are orthogonal to the top surface of the substrate 101. In the medium facing surface 130, the side shield layers 113A and 113B exist on both sides of the second portion 142 opposed to each other in the direction of track width (only the side shield layer 113A is shown in FIG. 47). The thickness of the pole layer 116 falls within a range of 0.15 to 0.35 μm inclusive, for example.

The side shield layers 113A and 113B are made of a magnetic metal material and have end faces located in the medium facing surface 130 on both sides of the end face of the pole layer 116, the sides being opposed to each other in the direction of track width. The side shield layers 113A and 113B are coupled to the main shield layer 120. Each of the nonmagnetic film 114 and the polishing stopper layer 115 is made of a nonmagnetic material and disposed between the pole layer 116 and the side shield layers 113A and 113B. Each of the nonmagnetic film 114 and the polishing stopper layer 115 corresponds to the nonmagnetic film of the invention. In the medium facing surface 130, both ends 118a and 118b of the end face of the gap layer 118 that are opposed to each other in the direction of track width are located at positions along the direction of track width outside the ends 113Aa and 113Ba of the respective end faces of the side shield layers 113A and 113B, the ends 113Aa and 113Ba being closer to the pole layer 116.

Each of the side shield layers 113A and 113B has a thickness that is equal to or smaller than the thickness of the pole layer 116. In the medium facing surface 130, the end face of each of the side shield layers 113A and 113B has a side closer to the gap layer 118 and a side farther from the gap layer 118. In the medium facing surface 130, there is a difference in level s1 between a side A5 of the end face of the pole layer 116 that touches the gap layer 118 and the side of the end face of each of the side shield layers 113A and 113B that is closer to the gap layer 118, and there is a difference in level s2 between the side A1 of the end face of the pole layer 116 that is opposite to the gap layer 118 and the side of the end face of each of the side shield layers 113A and 113B that is farther from the gap layer 118. The difference in level s1 is equal to or smaller than the difference in level s2. That is, in the medium facing surface 130, the end faces of the side shield layers 113A and 113B are located at a height closer to the height at which the side A5 of the end face of the pole layer 116 is located than the height at which the side A1 thereof is located within a range between the height at which the side A1 is located and the height at which the side A5 is located. In the embodiment, the side of the end face of each of the side shield layers 113A and 113B that is closer to the gap layer 118 is located adjacent to the gap layer 118 with the nonmagnetic film 114 disposed in between. Therefore, the difference in level s1 between the side A5 and the side of the end face of each of the side shield layers 113A and 113B that is closer to the gap layer 118 is equal to the thickness of the nonmagnetic film 114.

In the example shown in FIG. 47, in the medium facing surface 130, the side A5 is located farther from the substrate 101 than the side of the end face of each of the side shield layers 113A and 113B that is closer to the gap layer 118. However, conversely, the side A5 may be located closer to the substrate 101 than the side of the end face of each of the side shield layers 113A and 113B closer to the gap layer 118. The difference in level s1 may be zero.

The thickness of each of the side shield layers 113A and 113B is preferably 15 to 70% of the thickness of the pole layer 116. The thickness of each of the side shield layers 113A and 113B falls within a range of 40 to 120 nm inclusive, for example. It is preferred that each of the side shield layers 113A and 113B have a saturation flux density that is lower than that of the pole layer 116.

Reference is now made to FIG. 51A to FIG. 58A and FIG. 51B to FIG. 58B to describe a method of manufacturing the magnetic head of the embodiment. Each of FIG. 51A to FIG. 58A is a cross-sectional view of a layered structure obtained in manufacturing process of the magnetic head wherein the cross section is orthogonal to the medium facing surface and the substrate. Each of FIG. 51B to FIG. 58B is a cross-sectional view of a portion of the layered structure near the medium facing surface wherein the cross section is parallel to the medium facing surface. In FIG. 51A to FIG. 58A and FIG. 51B to FIG. 58B, portions closer to the substrate 101 than the encasing layer 112 are omitted.

According to the method of manufacturing the magnetic head of the embodiment, as shown in FIG. 49, the insulating layer 102, the bottom shield layer 103 and the bottom shield gap film 104 are first formed on the substrate 101 one by one. Next, the MR element 105 and leads (not shown) connected to the MR element 105 are formed on the bottom shield gap film 104. Next, the MR element 105 and the leads are covered with the top shield gap film 106. Next, the top shield layer 107, the nonmagnetic layer 181, the second top shield layer 182 and the insulating layer 183 are formed one by one on the top shield gap film 106. Next, the coil 109 and the insulating layers 110 and 111 are formed on the insulating layer 183. Next, the top surfaces of the coil 109 and the insulating layers 110 and 111 are flattened by CMP, for example.

FIG. 51A and FIG. 51B illustrate the following step. In the step, first, a nonmagnetic layer 112P is formed on the flattened top surfaces of the coil 109 and the insulating layers 110 and 111. The nonmagnetic layer 112P will be the encasing layer 112 by forming the groove 140 therein later. Next, the metal layer 113 that will be the side shield layers 113A and 113B later is formed on the nonmagnetic layer 112P. The metal layer 113 has a thickness that falls within a range of 40 to 120 nm inclusive, for example.

FIG. 52A and FIG. 52B illustrate the following step. In the step, first, a photoresist layer having a thickness of 1.0 µm, for example, is formed on the metal layer 113. The photoresist layer is then patterned to form a mask 131 for making the groove 140. The mask 131 has an opening having a shape corresponding to the groove 140.

Next, the metal layer 113 is selectively etched using the mask 131. The opening 113a that penetrates is thereby formed in the metal layer 113. The opening 113a has a shape corresponding to the plane geometry of the pole layer 116 to be formed later. Furthermore, a portion of the nonmagnetic layer 112P exposed from the opening 113a of the metal layer 113 is selectively etched. As a result, the groove 140 is formed in the layered structure made up of the nonmagnetic layer 112P and the metal layer 113. The nonmagnetic layer 112P is formed into the encasing layer 112 by forming the groove 140 therein. Next, the mask 131 is removed.

The etching of the metal layer 113 is performed by ion beam etching, for example. The etching of the metal layer 113 is performed such that the sidewalls of the opening 113a formed by the etching are made orthogonal to the top surface of the substrate 101. The etching of the nonmagnetic layer 112P is performed by reactive ion etching, for example. A portion of the groove 140 located in the nonmagnetic layer 112P (the encasing layer 112) is defined as a groove 112a. The etching for forming the groove 112a in the nonmagnetic layer 112P is performed such that the walls of the groove 112a corresponding to both sides of the track width defining portion 116A of the pole layer 116 each form an angle that falls within a range of 5 to 15 degrees inclusive, for example, with respect to the direction orthogonal to the top surface of the substrate 101.

Figures 53A, 53B:
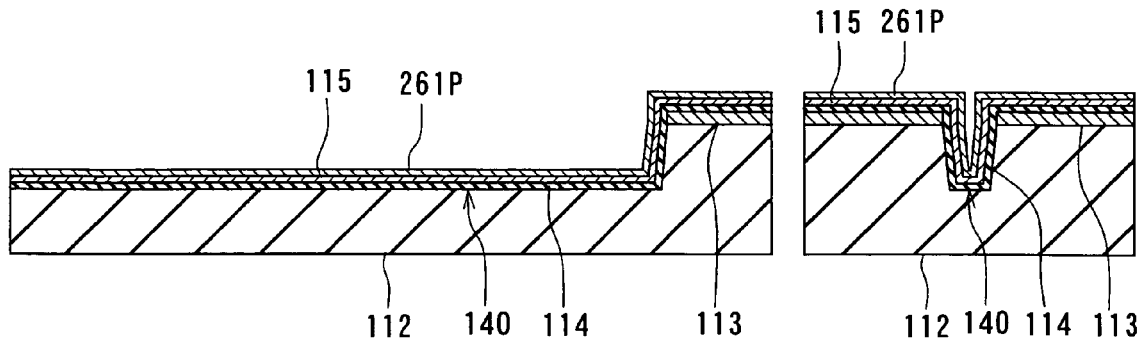
FIG. 53A and FIG. 53B are views for illustrating a step that follows the step shown in FIG. 50A and FIG. 50B.

FIG. 53A and FIG. 53B illustrate the following step. In the step, first, the nonmagnetic film 114 is formed on the entire top surface of the layered structure. The nonmagnetic film 114 is formed in the groove 140, too. The nonmagnetic film 114 may be formed by sputtering or CVD, for example. It is possible to control the thickness of the nonmagnetic film 114 with precision. If the nonmagnetic film 114 is formed by CVD, it is preferred to employ ALCVD. In this case, it is possible to control the thickness of the nonmagnetic film 114 with higher precision. When ALCVD is employed to form the nonmagnetic film 114, it is preferred to use alumina as the material of the nonmagnetic film 114. When a semiconductor material is used as the material of the nonmagnetic film 114, it is preferred to form the nonmagnetic film 114 by ALCVD at a low temperature (around 200° C.) or by low-pressure CVD at a low temperature. The semiconductor material as the material of the nonmagnetic film 114 is preferably undoped polycrystalline silicon or amorphous silicon.

Next, the polishing stopper layer 115 is formed by sputtering or ALCVD, for example, on the entire top surface of the layered structure. The polishing stopper layer 115 is formed in the groove 140, too. The polishing stopper layer 115 indicates the level at which polishing is stopped in the step of polishing that will be performed later.

Next, a first magnetic layer 261P is formed on the entire top surface of the layered structure. The first magnetic layer 261P will be the first layer 261 of the pole layer 116 later. The first magnetic layer 261P is formed by sputtering or IBD, for example. If the first magnetic layer 261P is formed by sputtering, it is preferred to employ collimation sputtering or long throw sputtering. Since the first layer 261 may be omitted as previously described, it is not always necessary to form the first magnetic layer 261P.

Figures 54A, 54B:
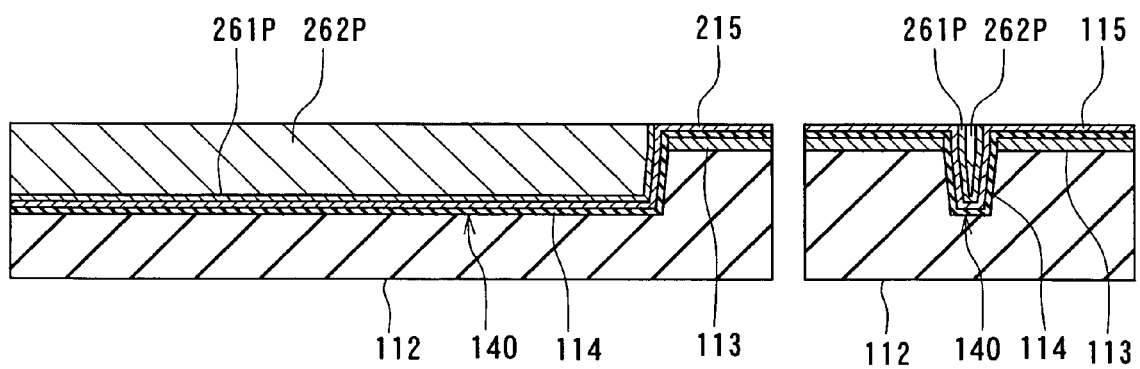
FIG. 54A and FIG. 54B are views for illustrating a step that follows the step shown in FIG. 53A and FIG. 53B.

FIG. 54A and FIG. 54B illustrate the following step. In the step, first, a second magnetic layer 262P is formed on the first magnetic layer 261P. The second magnetic layer 262P will be the second layer 262 of the pole layer 116. The second magnetic layer 262P is formed such that the top surface thereof is located higher than the top surfaces of the metal layer 113, the nonmagnetic film 114 and the polishing stopper layer 115. The second magnetic layer 262P is formed by frame plating, for example. In this case, the first magnetic layer 261P is used as an electrode for plating. If the polishing stopper layer 115 is made of a conductive material, it is used as an electrode for plating, too. The second magnetic layer 262P may be formed by forming an unpatterned plating layer and then patterning this plating layer by etching.

Next, a coating layer not shown that is made of alumina, for example, and having a thickness of 0.5 to 1.2 μm, for example, is formed on the entire top surface of the layered structure. Next, the coating layer, the second magnetic layer 262P and the first magnetic layer 261P are polished by CMP, for example, until the polishing stopper layer 115 is exposed. As a result, the top surfaces of the polishing stopper layer 115, the first magnetic layer 261P and the second magnetic layer 262P are flattened. If the coating layer, the second magnetic layer 262P and the first magnetic layer 261P are polished by CMP, such a slurry is used that polishing is stopped when the polishing stopper layer 115 is exposed, such as an alumina-base slurry.

Figures 55A, 55B:
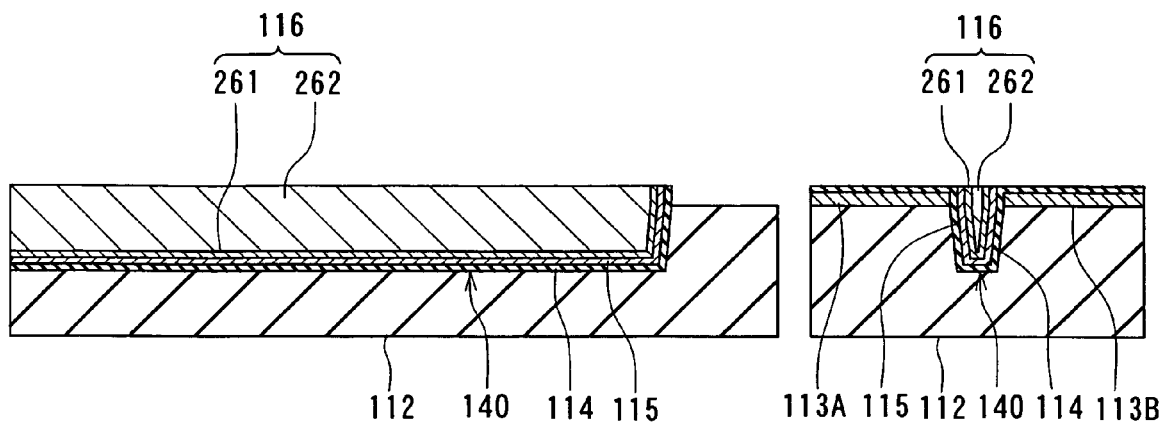
FIG. 55A and FIG. 55B are views for illustrating a step that follows the step shown in FIG. 54A and FIG. 54B.

FIG. 55A and FIG. 55B illustrate the following step. In the step, first, at least portions of the top surfaces of the first and second magnetic layers 261P and 262P that are located near the medium facing surface 130 are etched by ion beam etching, sputter etching or reactive ion etching. Through this step, the first and second magnetic layers 261P and 262P are formed into the first layer 261 and the second layer 262, respectively, and the pole layer 116 is thereby formed. In this step, the polishing stopper layer 115 is etched together with the at least portions of the top surfaces of the first and second magnetic layers 261P and 262P, so that at least a portion of the polishing stopper layer 115 located above the metal layer 113 is removed.

Next, a photoresist layer having a thickness of 1.0 μm, for example, is formed on the entire top surface of the layered structure. The photoresist layer is then patterned to form a mask not shown for patterning the metal layer 113. Next, the nonmagnetic film 114 and the metal layer 113 are selectively etched using the mask. Through this etching, the metal layer 113 is patterned and formed into the two side shield layers 113A and 113B.

Figure 59:
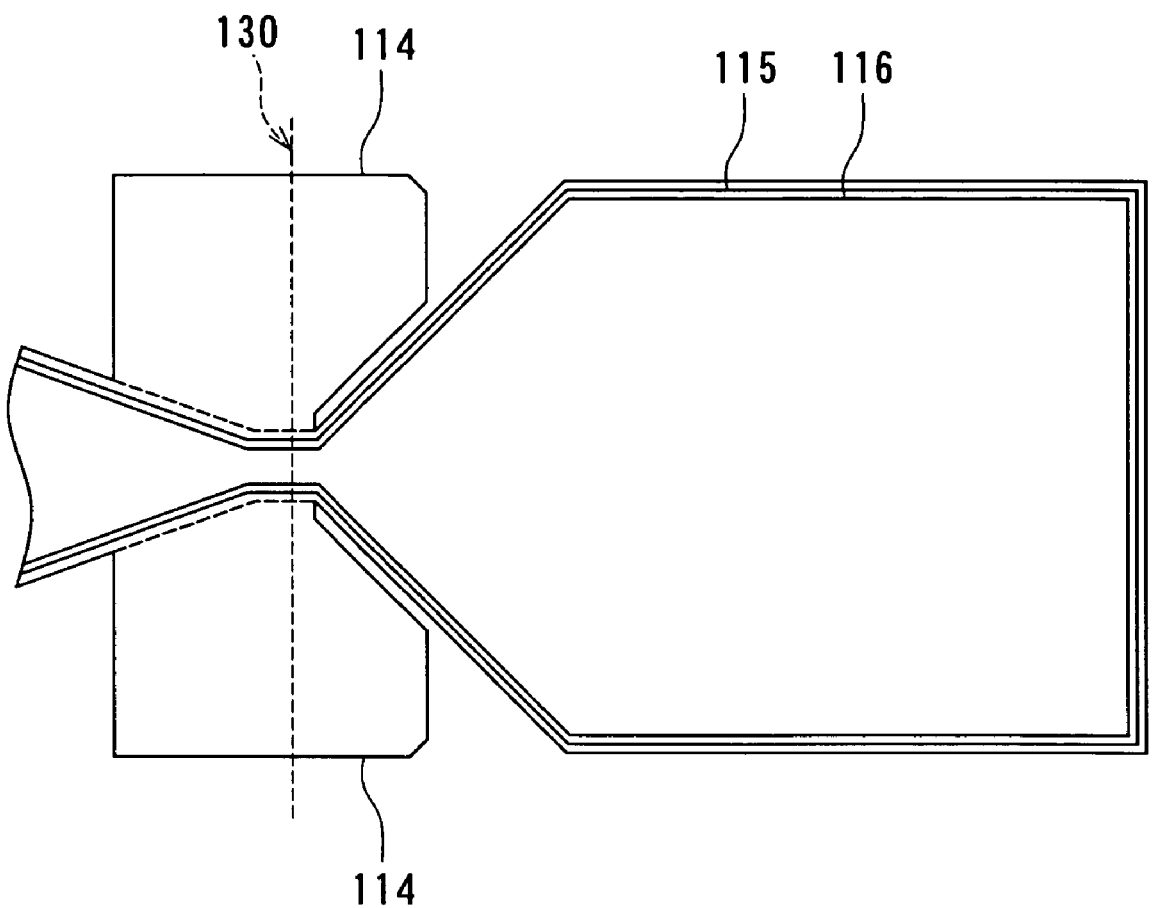
FIG. 59 is a top view illustrating the top surface of the layered structure obtained after the step shown in FIG. 55A and FIG. 55B.
Figure 60:
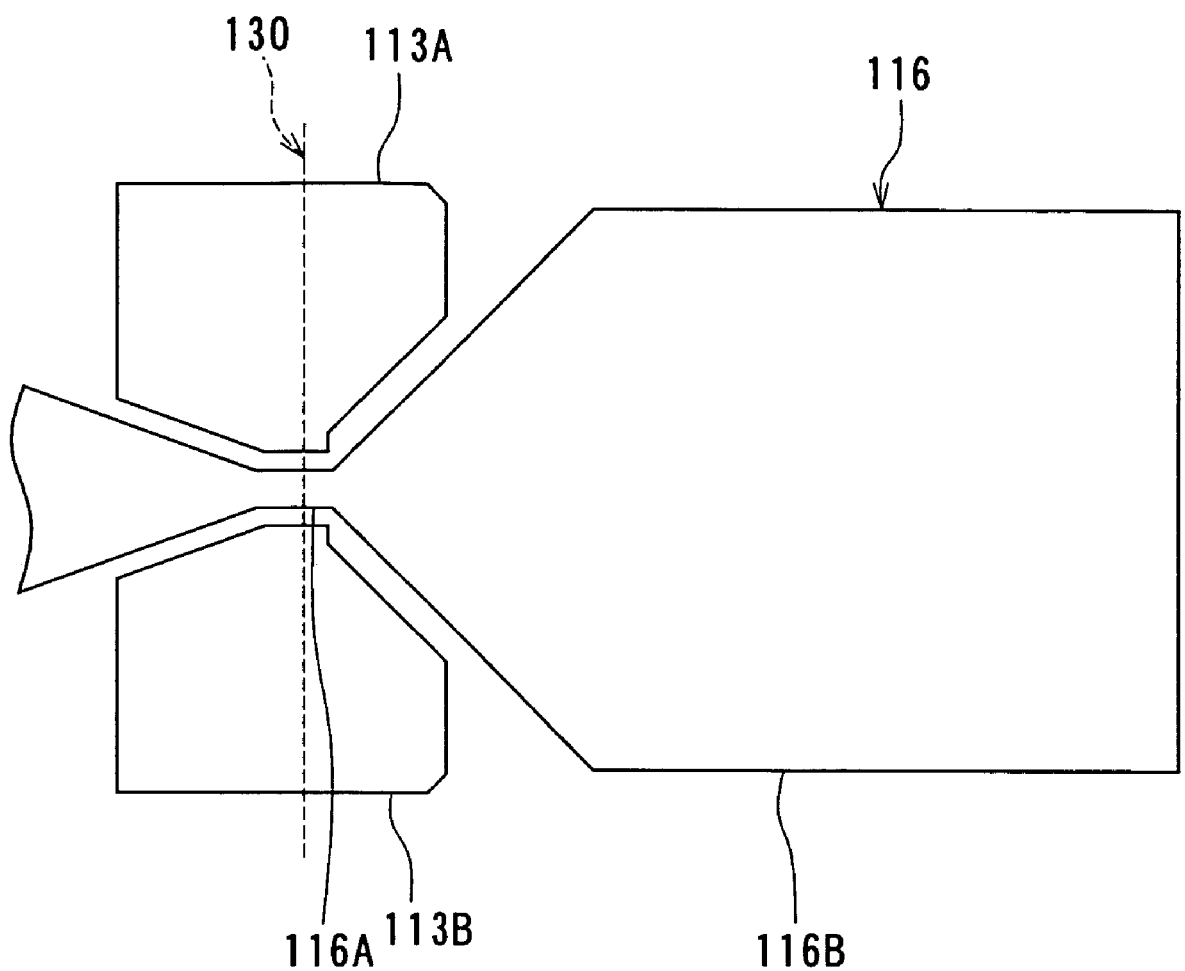
FIG. 60 is a top view illustrating only the pole layer and the side shield layers of the layered structure obtained after the step shown in FIG. 55A and FIG. 55B.

FIG. 59 is a top view of the top surface of the layered structure that has undergone the above-mentioned etching. FIG. 60 is a top view illustrating only the pole layer 116 and the side shield layers 113A and 113B of the layered structure that has undergone the above-mentioned patterning. In the embodiment, as shown in FIG. 60, the side shield layers 113A and 113B are located on sides of the track width defining portion 116A and on sides of a portion of the wide portion 116B.

Figures 56A, 56B:
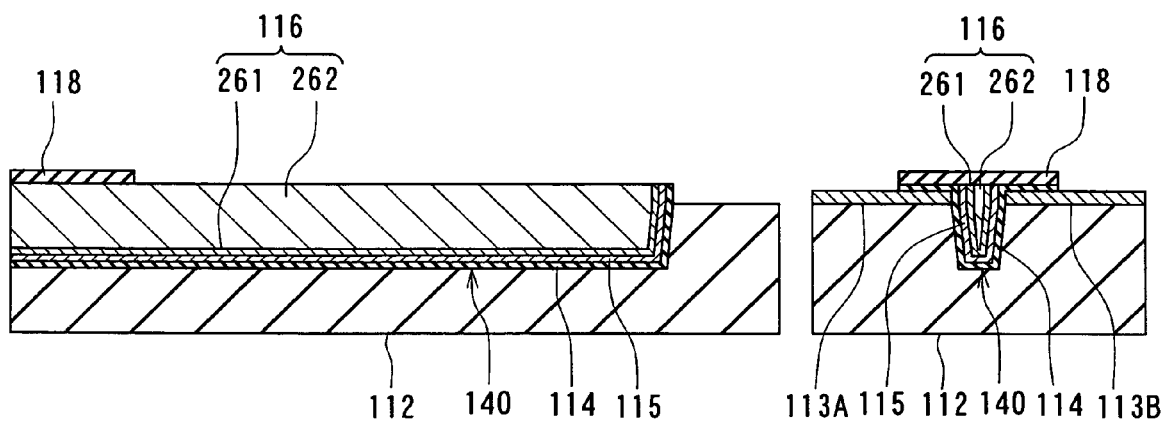
FIG. 56A and FIG. 56B are views for illustrating a step that follows the step shown in FIG. 55A and FIG. 55B.

FIG. 56A and FIG. 56B illustrate the following step. In the step, first, the gap layer 118 is formed on the entire top surface of the layered structure. The gap layer 118 may be formed by sputtering or CVD, for example. If the gap layer 118 is formed by CVD, it is preferred to employ ALCVD. When ALCVD is employed to form the gap layer 118, it is preferred to use alumina as the material of the gap layer 118.

Figure 61:
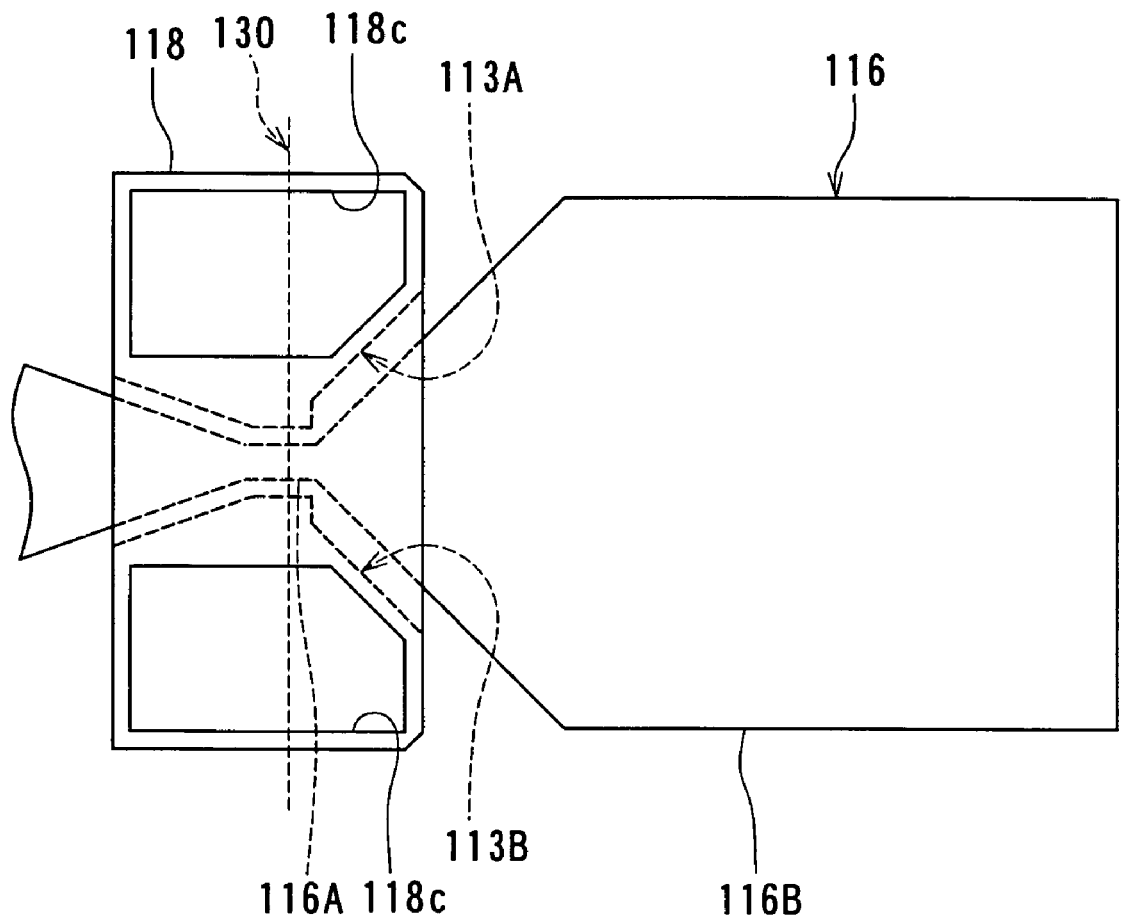
FIG. 61 is a top view illustrating the top surface of the layered structure obtained after the step shown in FIG. 56A and FIG. 56B.

Next, the gap layer 118 is selectively etched to pattern the gap layer 118. FIG. 61 is a top view of the top surface of the layered structure after the step shown in FIG. 56A and FIG. 56B is performed. Two contact holes 118c are formed in the patterned gap layer 118 for exposing the top surfaces of the side shield layers 113A and 113B. The gap layer 118 is patterned so that a region of the top surface of the pole layer 116 away from the medium facing surface 130 is exposed.

Figures 57A, 57B:
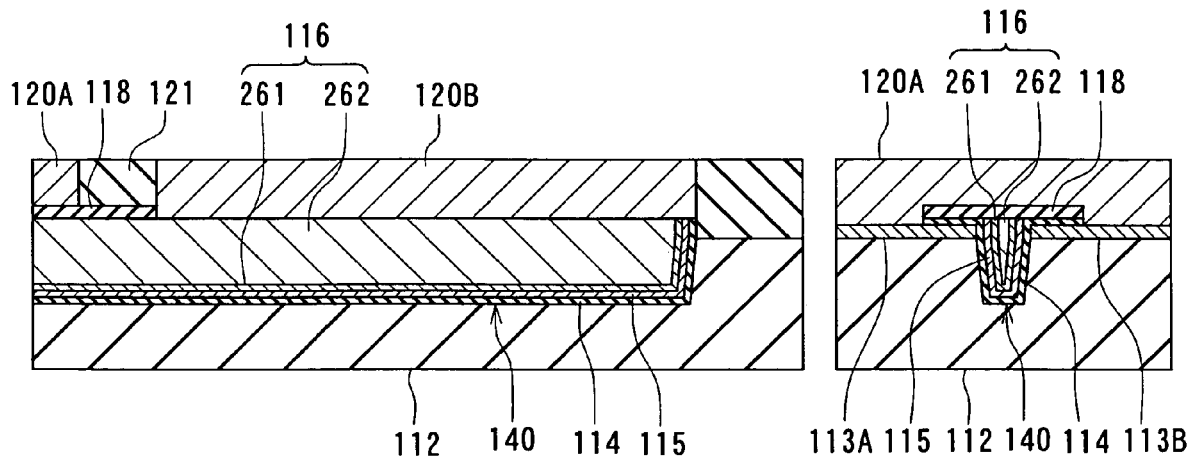
FIG. 57A and FIG. 57B are views for illustrating a step that follows the step shown in FIG. 56A and FIG. 56B.

FIG. 57A and FIG. 57B illustrate the following step. In the step, first, the first layer 120A is formed on the gap layer 118, and the yoke layer 120B is formed on the pole layer 116. The first layer 120A and the yoke layer 120B may be formed by frame plating or by forming a magnetic layer through sputtering and then selectively etching the magnetic layer. Selective etching of the magnetic layer may be performed by, for example, forming an alumina layer on the magnetic layer, forming a mask on the alumina layer by frame plating, and etching the alumina layer and the magnetic layer through the use of the mask. Next, the nonmagnetic layer 121 is formed on the entire top surface of the layered structure. Next, the nonmagnetic layer 121 is polished by CMP, for example, so that the first layer 120A and the yoke layer 120B are exposed, and the top surfaces of the first layer 120A, the yoke layer 120B and the nonmagnetic layer 121 are flattened.

Figures 58A, 58B:
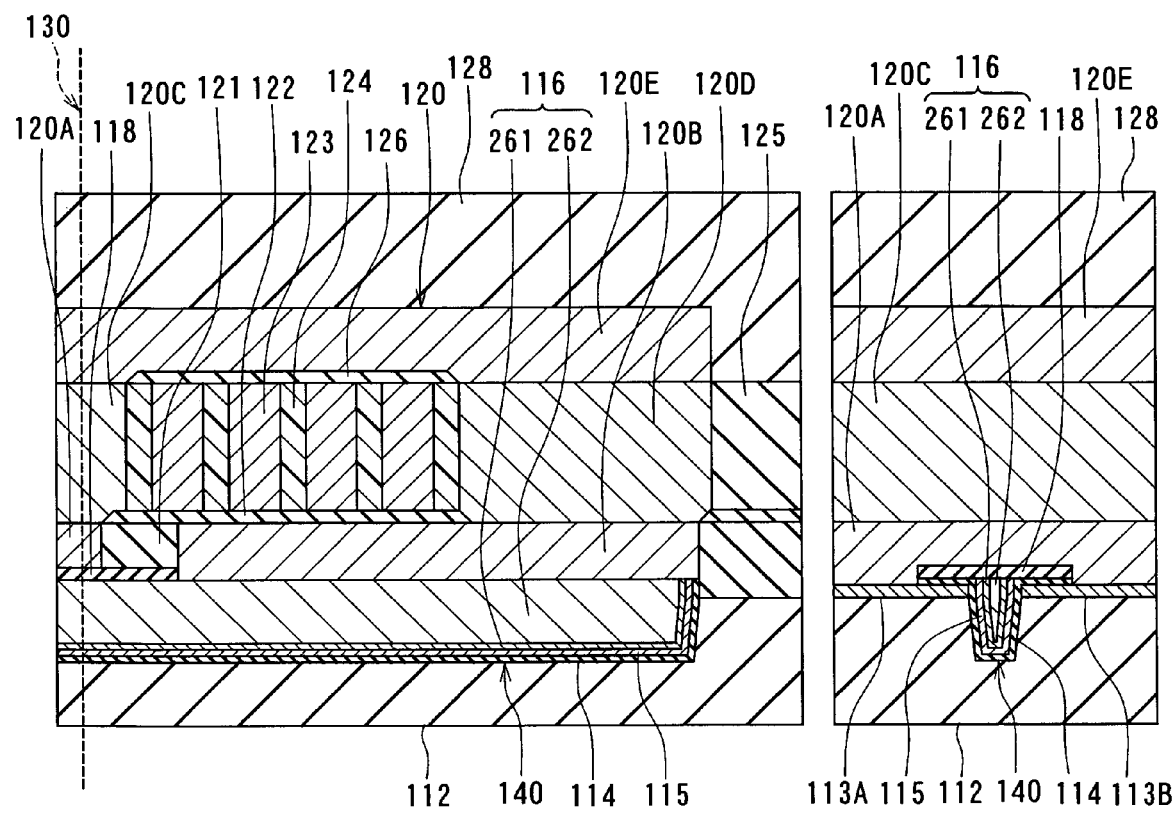
FIG. 58A and FIG. 58B are views for illustrating a step that follows the step shown in FIG. 57A and FIG. 57B.

FIG. 58A and FIG. 58B illustrate the following step. In the step, first, the insulating layer 122 is formed on regions of the top surfaces of the yoke layer 120B and the nonmagnetic layer 121 where the coil 123 is to be disposed. Next, the coil 123 is formed by frame plating, for example, so that at least a portion of the coil 123 is disposed on the insulating layer 122. Next, the second layer 120C and the coupling layer 120D are formed by frame plating, for example. Alternatively, the coil 123 may be formed after the second layer 120C and the coupling layer 120D are formed.

Next, the insulating layer 124 made of photoresist, for example, is selectively formed in the space between the respective adjacent turns of the coil 123 and around the coil 123. Next, the insulating layer 125 having a thickness of 4 to 4.5 μm, for example, is formed on the entire top surface of the layered structure. Next, the insulating layer 125 is polished by CMP, for example, so that the second layer 120C, the coupling layer 120D and the coil 123 are exposed, and the top surfaces of the second layer 120C, the coupling layer 120D, the coil 123, and the insulating layers 124 and 125 are thereby flattened.

Next, the insulating layer 126 is formed on the coil 123 and the insulating layer 124. Next, the third layer 120E is formed by frame plating, for example, to complete the main shield layer 120.

Next, a protection layer not shown is formed on the entire top surface of the layered structure. Next, wiring and terminals and so on are formed on the protection layer, the substrate is divided into sliders, and steps such as polishing of the medium facing surface 130 and fabrication of the flying rails are performed to complete the magnetic head.

The operation and effects of the magnetic head of the embodiment will now be described. The magnetic head writes data on a recording medium by using the write head and reads data written on the recording medium by using the read head. In the write head, the coil 123 generates a magnetic field that corresponds to data to be written on the medium. The pole layer 116 and the main shield layer 120 form a magnetic path through which a magnetic flux corresponding to the magnetic field generated by the coil 123 passes. The pole layer 116 allows the flux corresponding to the field generated by the coil 123 to pass and generates a write magnetic field used for writing the data on the medium through the use of the perpendicular magnetic recording system. The main shield layer 120 takes in a disturbance magnetic field applied from outside the magnetic head to the magnetic head. It is thereby possible to prevent erroneous writing on the recording medium caused by the disturbance magnetic field intensively taken in into the pole layer 116.

According to the embodiment, in the medium facing surface 130, the end face of the main shield layer 120 is disposed forward of the end face of the pole layer 116 along the direction T of travel of the recording medium (that is, disposed closer to the air outflow end of the slider) with a specific small space created by the gap layer 118. The location of an end of the bit pattern written on the recording medium, that is, the location of the magnetization transition region, is determined by the location of the end of the pole layer 116 that is closer to the gap layer 118 and located in the medium facing surface 130. The main shield layer 120 takes in a magnetic flux generated from the end face of the pole layer 116 located in the medium facing surface 130 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

The magnetic head of the embodiment comprises the side shield layers 113A and 113B. The side shield layers 113A and 113B have end faces located on both sides of the end face of the pole layer 116 in the medium facing surface 130, the sides being opposed to each other in the direction of track width. The side shield layers 113A and 113B take in a magnetic flux generated from the end face of the pole layer 116 and extending in the direction of track width. As a result, according to the embodiment, it is possible to more greatly suppress the flux from extending in the direction of track width, the flux starting from the pole layer 116 across the gap layer 118 and reaching the main shield layer 120, compared with a case in which the side shield layers 113A and 113B are not provided. It is therefore possible to reduce the difference between the physical track width and the effective track width.

Figure 62:
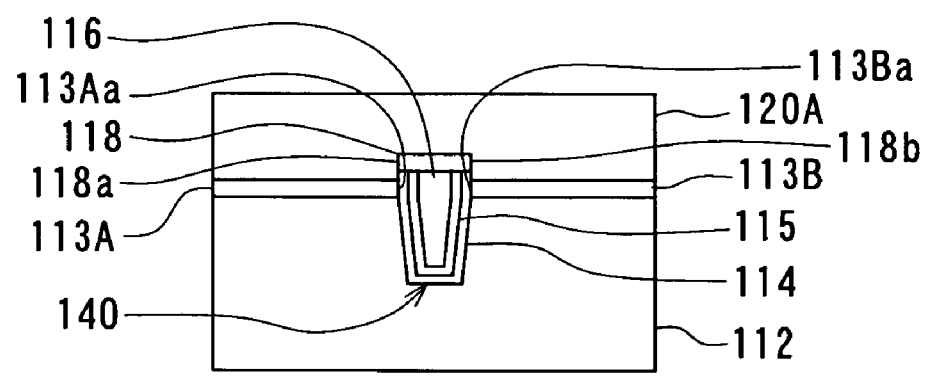
FIG. 62 is a front view of a main part of the medium facing surface of a magnetic head of a reference example.

Reference is now made to FIG. 62 to describe an effect resulting from the arrangement of the end faces of the side shield layers 113A and 113B and the gap layer 118. FIG. 62 is a front view of a main part of the medium facing surface of a magnetic head of a reference example. In the reference example, both ends 118a and 118b of the end face of the gap layer 118 that are opposed to each other in the direction of track width are located at positions along the direction of track width the same as the positions at which the ends 113Aa and 113Ba of the respective end faces of the side shield layers 113A and 113B are located, the ends 113Aa and 113Ba being closer to the pole layer 116. In the reference example, the gap layer 118 does not exist between the first layer 120A of the main shield layer 120 and the side shield layers 113A and 113B. In this case, in the medium facing surface 130, the nonmagnetic layer (including the gap layer 118, the nonmagnetic film 114 and the polishing stopper layer 115) present between the pole layer 116 and the shield layer including the main shield layer 120 and the side shield layers 113A and 113B has a shape bending along the outside shape of the pole layer 116. Consequently, in the reference example, the magnetization transition region tends to have a bending shape, too. As a result, a phenomenon occurs wherein it is impossible to write data correctly on a track having a specific width. In addition, if the magnetization transition region has a bending shape, the nonlinear transition shift (NLTS) is increased. As a result, the high frequency characteristic is degraded and the signal-to-noise ratio is reduced. Therefore, the yield of magnetic read/write apparatuses each incorporating the magnetic head of the reference example is greatly reduced. The foregoing description similarly applies to a case in which both ends 118a and 118b of the end face of the gap layer 118 that are opposed to each other in the direction of track width are located at positions along the direction of track width inside the ends 113Aa and 113Ba of the respective end faces of the side shield layers 113A and 113B, the ends 113Aa and 113Ba being closer to the pole layer 116.

In the embodiment, in contrast, in the medium facing surface 130 both ends 118a and 118b of the end face of the gap layer 118 that are opposed to each other in the direction of track width are located at positions along the direction of track width outside the ends 113Aa and 113Ba of the respective end faces of the side shield layers 113A and 113B, the ends 113Aa and 113Ba being closer to the pole layer 116. In addition, in the medium facing surface 130, the end face of the gap layer 118 has a shape linearly extending along the direction of track width. In this case, the gap layer 118 that linearly extends exists between the pole layer 116 and the first layer 120A in a region greater than the track width. Consequently, in the embodiment, the shape of the magnetization transition region becomes closer to a straight line, compared with the reference example. It is therefore possible to write data correctly on a track having a specific width, according to the embodiment.

According to the embodiment, as shown in FIG. 47, the end face of the pole layer 116 located in the medium facing surface 130 has a width that decreases as the distance from the gap layer 118 increases. It is thereby possible to prevent the problems resulting from the skew.

In the embodiment, the pole layer 116 is disposed in the groove 140 with the nonmagnetic film 114 and the polishing stopper layer 115 disposed between the pole layer 116 and the groove 140. Consequently, the pole layer 116 is smaller than the groove 140 in width. It is therefore possible to easily form the groove 140 and to easily reduce the width of the pole layer 116 and the width of the top surface of the track width defining portion 116A that defines the track width, in particular. As a result, according to the embodiment, it is possible to easily implement a track width that is smaller than the minimum track width that can be formed by photolithography and to control the track width with accuracy.

MODIFICATION EXAMPLES

Figure 63:
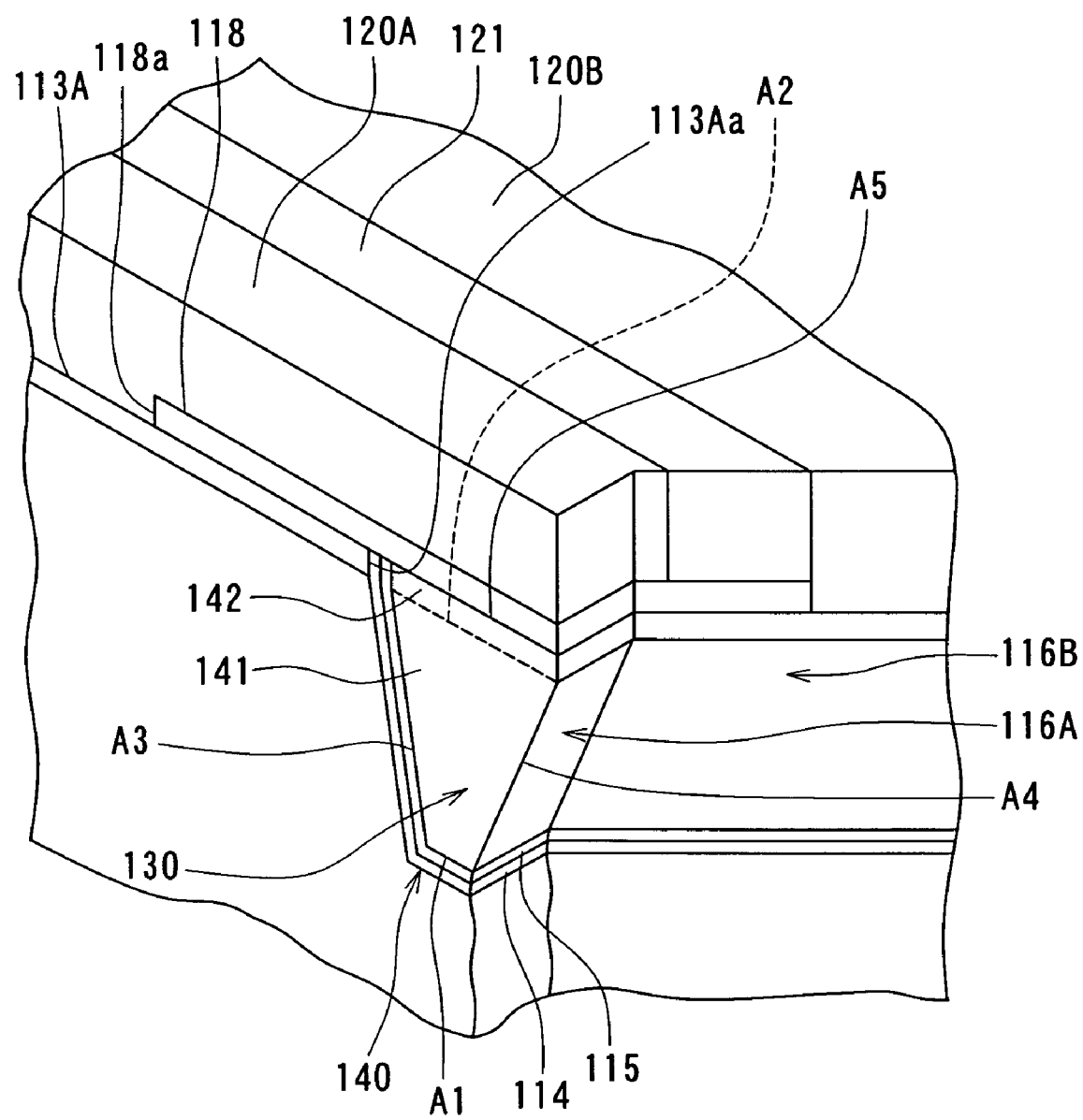
FIG. 63 is a perspective view illustrating a portion of a pole layer near the medium facing surface of a magnetic head of a first modification example of the seventh embodiment of the invention.

First to third modification examples of the embodiment will now be described. FIG. 63 is a perspective view illustrating a portion of the pole layer 116 near the medium facing surface 130 of a magnetic head of the first modification example. In the first modification example, the nonmagnetic film 114 does not exist between the gap layer 118 and the side shield layers 113A and 113B, and the side shield layers 113A and 113B touch the gap layer 118. In the first modification example, in the medium facing surface 130, there is no difference in level between the side A5 of the end face of the pole layer 116 touching the gap layer 118 and the sides of the end faces of the side shield layers 113A and 113B that are closer to the gap layer 118.

In a method of manufacturing the magnetic head of the first modification example, in the step shown in FIG. 55A and FIG. 55B, the polishing stopper layer 115 and the nonmagnetic film 114 are etched together with at least portions of the top surfaces of the first magnetic layer 261P and the second magnetic layer 262P so that portions of the stopper layer 115 and the nonmagnetic film 114 located above the metal layer 113 are removed. The metal layer 113 is then patterned to form the two side shield layers 113A and 113B. The remainder of the steps of the method of manufacturing the magnetic head of the first modification example are the same as those of the method described with reference to FIG. 51A to FIG. 58A and FIG. 51B to FIG. 58B. The remainder of configuration, function and effects of the first modification example are the same as those of the magnetic head shown in FIG. 47 to FIG. 50.

Figure 64:
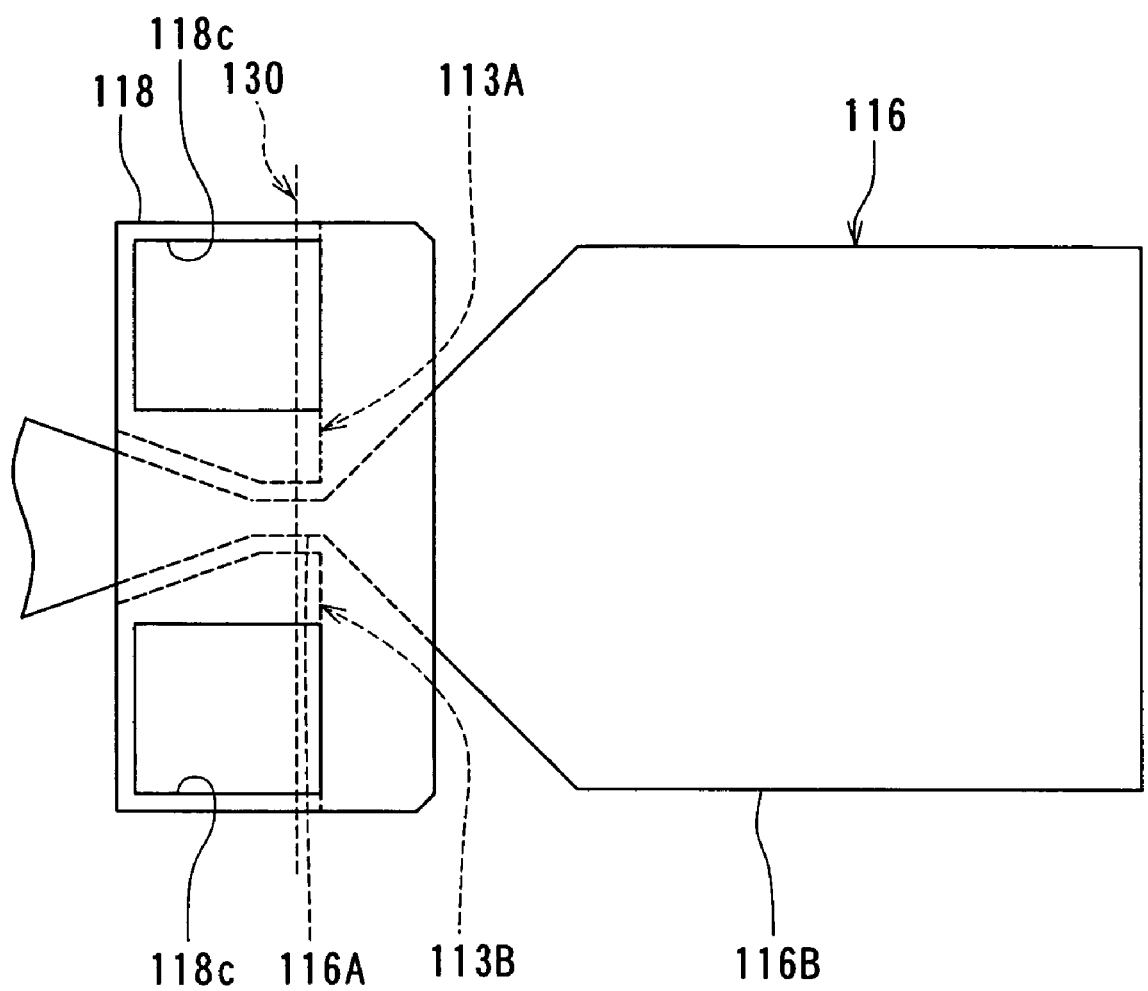
FIG. 64 is a top view illustrating the shapes of side shield layers and a gap layer of a magnetic head of a second modification example of the seventh embodiment of the invention.

FIG. 64 is a top view illustrating shapes of the side shield layers 113A and 113B and the gap layer 118 of a magnetic head of the second modification example. In the second modification example, the shapes of the side shield layers 113A and 113B are different from those of the example shown in FIG. 61. That is, in the second modification example, the side shield layers 113A and 113B are located only on sides of the track width defining portion 116A. The remainder of configuration, function and effects of the second modification example are the same as those of the magnetic head shown in FIG. 47 to FIG. 50.

Figure 65:
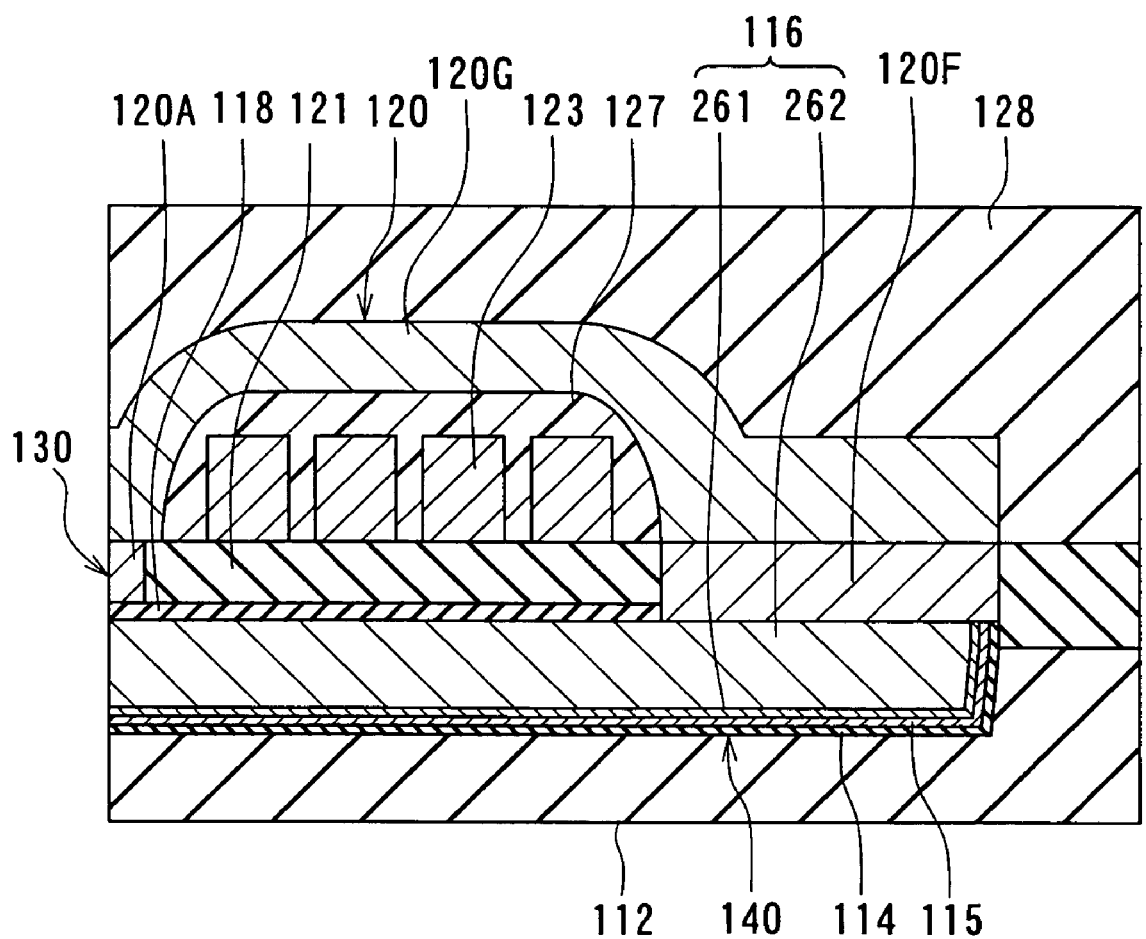
FIG. 65 is a cross-sectional view of a main part of a magnetic head of a third modification example of the seventh embodiment of the invention.

FIG. 65 illustrates the third modification example. FIG. 65 is a cross-sectional view of a main part of a magnetic head of the third modification example wherein the cross section is orthogonal to the medium facing surface and the substrate. In FIG. 65, portions closer to the substrate 101 than the encasing layer 112 are omitted.

In the third modification example, a coupling layer 120F is provided in place of the yoke layer 120B of FIG. 49. The material of the coupling layer 120F is the same as that of the yoke layer 120B. The bottom surface of the coupling layer 120F touches the top surface of the pole layer 116. The nonmagnetic layer 121 is disposed around the coupling layer 120F. In the third modification example, a portion of the nonmagnetic layer 121 is located below the coil 123. In the third modification example, the insulating layer 122 is not provided, and the coil 123 is disposed on the nonmagnetic layer 121. The magnetic head of the third modification example has an insulating layer 127 covering at least a portion of the coil 123 in place of the insulating layers 124, 125 and 126 of FIG. 49. The insulating layer 127 is made of photoresist, for example. In the third modification example, the main shield layer 120 incorporates a second layer 120G in place of the second layer 120C, the coupling layer 120D and the third layer 120E of FIG. 49. The second layer 120G has an end located in the medium facing surface 130, and is disposed to couple the first layer 120A to the coupling layer 120F. The second layer 120G includes a portion located on a side of the at least portion of the coil 123 covered with the insulating layer 127, the side being opposite to the pole layer 116. The second layer 120G includes a portion located between the medium facing surface 130 and the coil 123. The distance between an end of this portion closer to the medium facing surface 130 and the opposite end increases as the distance from the first layer 120A increases. The second layer 120G may be made of any of CoFeN, CoNiFe, NiFe and CoFe, for example. The remainder of configuration, function and effects of the third modification example are the same as those of the magnetic head shown in FIG. 47 to FIG. 50.

Eighth Embodiment

Figure 66:
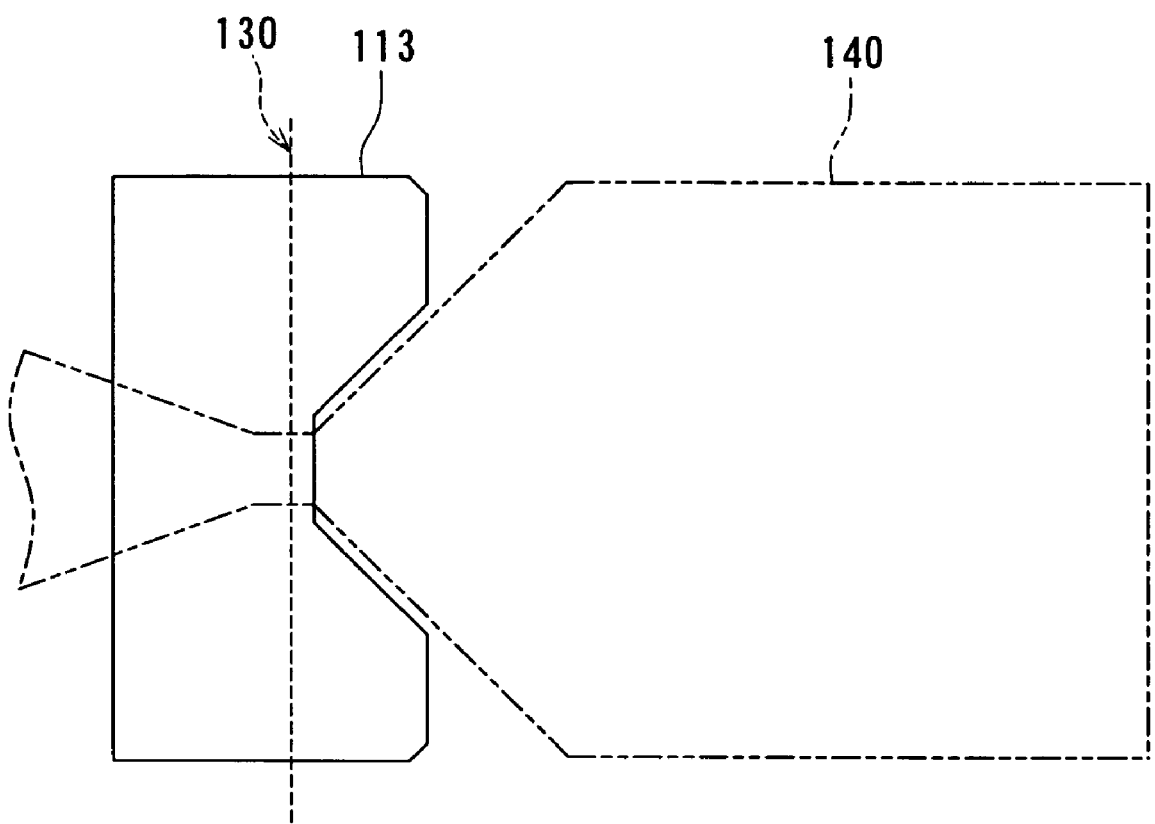
FIG. 66 is a top view illustrating a step of a method of manufacturing a magnetic head of an eighth embodiment of the invention.
Figure 67:
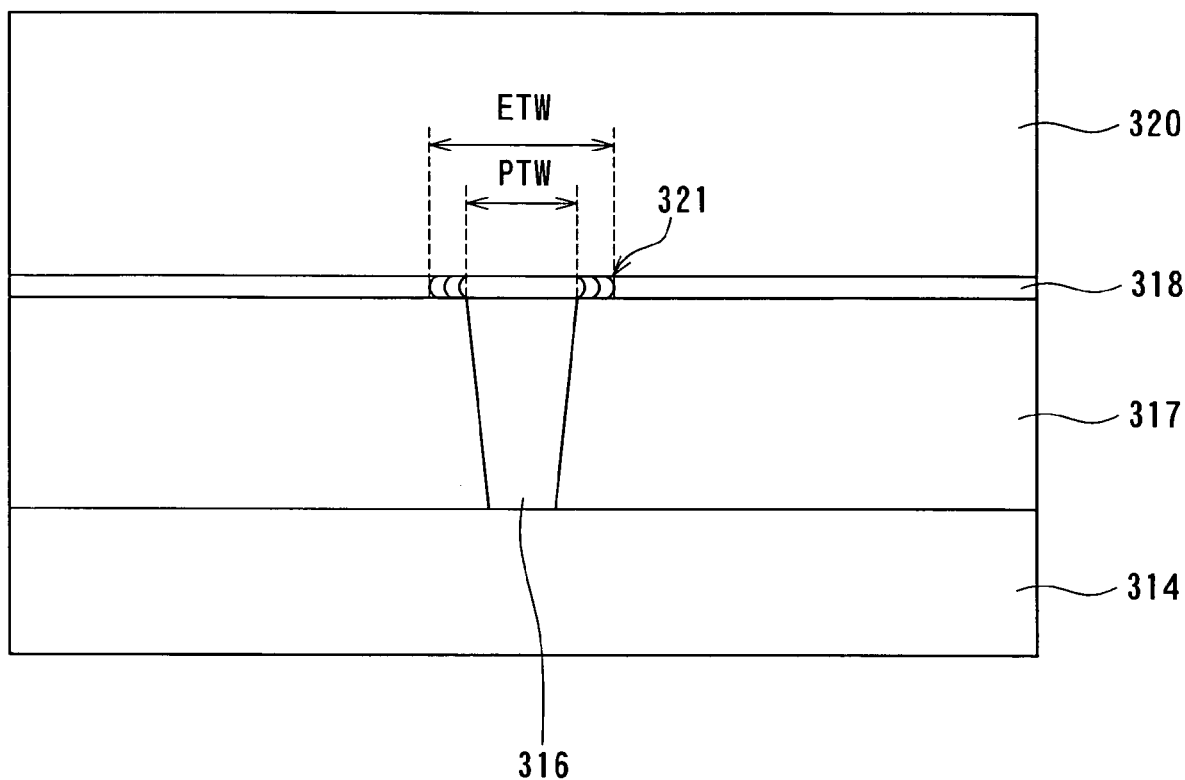
FIG. 67 is a front view of a portion of the medium facing surface of an example of a related shield-type head.

A magnetic head and a method of manufacturing the same of an eighth embodiment of the invention will now be described. FIG. 66 is a top view illustrating a step of the method of manufacturing the magnetic head of the 0eighth embodiment. The method of the embodiment includes the steps up to the step of forming the metal layer 113 on the nonmagnetic layer 112P as shown in FIG. 51A and FIG. 51B that are the same as those of the seventh embodiment. In the following step of the eighth embodiment, a photoresist layer having a thickness of 1.0 μm, for example, is formed on the entire top surface of the layered structure. The photoresist layer is then patterned to form a mask not shown for patterning the metal layer 113. Next, the metal layer 113 is selectively etched using the mask to thereby pattern the metal layer 113. FIG. 66 illustrates the shape of the metal layer 113 patterned. The shape of the metal layer 113 patterned is one in which the two side shield layers 113A and 113B of the seventh embodiment shown in FIG. 60 are joined. The metal layer 113 patterned is formed into the two side shield layers 113A and 113B by forming the groove 140 therein later. In FIG. 66, the groove 140 that will be formed later is shown with an alternate long and two short dashes line.

In the eighth embodiment, as shown in FIG. 52A and FIG. 52B, the groove 140 is formed in the layered structure made up of the nonmagnetic layer 112P and the metal layer 113, as in the seventh embodiment. At this point in the eighth embodiment, the metal layer 113 is divided into two portions by the groove 140, and the two side shield layers 113A and 113B are thereby formed.

The following steps of the eighth embodiment are the same as those of the seventh embodiment except that the step of patterning the metal layer 113 is omitted in the step shown in FIG. 55A and FIG. 55B. The remainder of configuration, function and effects of the eighth embodiment are the same as those of the seventh embodiment including the modification examples.

The present invention is not limited to the foregoing embodiments but may be practiced in still other ways. For example, a coil wound around the pole layer 24 in a helical manner may be provided in any of the first to sixth embodiments in place of the flat-whorl-shaped coils 12 and 31. In the seventh or eighth embodiment, a coil wound around the pole layer 116 in a helical manner may be provided in place of the flat-whorl-shaped coils 109 and 123.

Each of the magnetic heads disclosed in the foregoing embodiments has such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer made of a magnetic metal material, having an end face located in the medium facing surface, allowing a magnetic flux corresponding to the field generated by the coil to pass therethrough, and generating a write magnetic field for writing the data on the recording medium through the use of a perpendicular magnetic recording system;
    an encasing layer made of a nonmagnetic material and having a groove that opens in a top surface of the encasing layer;
    a metal layer made of a metal material, disposed on the top surface of the encasing layer, and having a penetrating opening contiguous to the groove; and
    a substrate on which the encasing layer, the metal layer, the pole layer and the coil are stacked, wherein:
    at least a portion of the pole layer is placed in the groove of the encasing layer and in the opening of the metal layer;
    the end face of the pole layer located in the medium facing surface incorporates a first portion and a second portion that is located farther from the substrate than the first portion and connected to the first portion;

the first portion has a side located away from the substrate;
the first portion has a width that decreases as a distance from the substrate decreases;
the second portion has a uniform width that is equal to a length of the side of the first portion located away from the substrate and that defines a track width; and
in the medium facing surface, the metal layer exists on both sides of the second portion, the sides being opposed to each other in a direction of the track width.

2. The magnetic head according to claim 1, wherein the opening of the metal layer has an inner wall that is orthogonal to a top surface of the substrate.

3. The magnetic head according to claim 1, wherein, in the medium facing surface, a top surface of the pole layer is located at a height that falls within a range between a height at which a top surface of the metal layer is located and a height at which a bottom surface thereof is located.

4. The magnetic head according to claim 1, further comprising a nonmagnetic film made of a nonmagnetic material and disposed between the pole layer and each of the encasing layer and the metal layer in the groove of the encasing layer and in the opening of the metal layer.

5. The magnetic head according to claim 4, wherein a portion of the nonmagnetic film disposed in the opening of the metal layer has an inner wall that is orthogonal to a top surface of the substrate.

6. The magnetic head according to claim 4, wherein the nonmagnetic film has a portion located above a top surface of the metal layer, and, in the medium facing surface, a top surface of the nonmagnetic film is located at a height the same as a height at which a top surface of the pole layer is located.

7. The magnetic head according to claim 4, further comprising a seed layer made of a nonmagnetic conductive material and disposed between the nonmagnetic film and the pole layer in the groove of the encasing layer and in the opening of the metal layer.

8. The magnetic head according to claim 7, wherein a portion of the seed layer disposed in the opening of the metal layer has an inner wall that is orthogonal to a top surface of the substrate.

9. The magnetic head according to claim 7, wherein the seed layer has a portion located above a top surface of the metal layer, and, in the medium facing surface, a top surface of the seed layer is located at a height the same as a height at which a top surface of the pole layer is located.

10. The magnetic head according to claim 7, further comprising a joining film that is disposed between the nonmagnetic film and the seed layer in the groove of the encasing layer and in the opening of the metal layer and that joins the nonmagnetic film to the seed layer.

11. The magnetic head according to claim 1, wherein the metal layer is made of a nonmagnetic metal material.

12. The magnetic head according to claim 1, further comprising:
a main shield layer made of a magnetic material, having an end face located in the medium facing surface, and having a portion located away from the medium facing surface and coupled to the pole layer; and
a gap layer made of a nonmagnetic material, having an end face located in the medium facing surface, and provided between the pole layer and the main shield layer, wherein:
the end face of the main shield layer is located forward of the end face of the pole layer along a direction of travel of the recording medium with a specific space created by a thickness of the gap layer; and
the metal layer is made of a magnetic metal material and coupled to the main shield layer, and has two end faces located in the medium facing surface on both sides of the end face of the pole layer, the sides being opposed to each other in the direction of the track width,
the magnetic head further comprising a nonmagnetic film made of a nonmagnetic material and disposed between the pole layer and the metal layer.

13. The magnetic head according to claim 12, wherein both ends of the end face of the gap layer that are opposed to each other in the direction of the track width are located at positions along the direction of the track width outside ends of the end faces of the metal layer, the ends being closer to the pole layer.

14. The magnetic head according to claim 12, wherein the metal layer has a thickness that is 15 to 70% of that of the pole layer.

15. The magnetic head according to claim 12, wherein the metal layer has a saturation flux density that is lower than that of the pole layer.

16. The magnetic head according to claim 12, wherein the nonmagnetic film is also located between the metal layer and the gap layer.

17. The magnetic head according to claim 12, wherein the metal layer touches the gap layer.

* * * * *